United States Patent
Sasanuma et al.

(10) Patent No.: US 6,201,616 B1
(45) Date of Patent: *Mar. 13, 2001

(54) METHOD AND APPARATUS FOR DETERMINING A PREDETERMINED PATTERN ON AN ORIGINAL BASED ON VISIBLE AND INVISIBLE INFORMATION ON THE ORIGINAL

(75) Inventors: Nobuatsu Sasanuma; Hiroshi Tanioka; Shinobu Arimoto, all of Yokohama; Kazuo Yoshinaga, Machida; Toshio Hayashi, Kawasaki; Takehiko Nakai, Tokyo; Tsutomu Utagawa, Yokohama; Tetsuya Nagase; Yoshiki Uchida, both of Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/848,389

(22) Filed: May 8, 1997

Related U.S. Application Data

(63) Continuation of application No. 08/175,252, filed on Dec. 28, 1993, now abandoned.

(30) Foreign Application Priority Data

| Jan. 1, 1993 | (JP) | ................................................. | 5-015092 |
| Jan. 19, 1993 | (JP) | ................................................. | 5-006928 |
| Jan. 19, 1993 | (JP) | ................................................. | 5-006977 |
| Jan. 19, 1993 | (JP) | ................................................. | 5-006979 |
| Jun. 2, 1993 | (JP) | ................................................. | 5-132013 |

(51) Int. Cl.[7] ................................................. H04N 1/40
(52) U.S. Cl. .......................................... 358/450; 355/201
(58) Field of Search ................................. 358/402, 450, 358/501; 355/201; 382/135, 161, 165, 181

(56) References Cited

U.S. PATENT DOCUMENTS

| 4,698,690 |   | 10/1987 | Tanioka ................................. | 358/283 |
| 4,709,274 |   | 11/1987 | Tanioka ................................. | 358/283 |
| 4,723,173 |   | 2/1988 | Tanioka ................................. | 358/282 |
| 4,729,035 |   | 3/1988 | Tanioka ................................. | 358/260 |
| 4,739,377 | * | 4/1988 | Allen ................................... | 355/201 |
| 4,748,480 | * | 5/1988 | Jacobs et al. ......................... | 355/133 |
| 4,821,334 |   | 4/1989 | Ogino et al. .......................... | 382/50 |
| 4,860,118 |   | 8/1989 | Arimito ............................... | 358/451 |
| 4,985,760 |   | 1/1991 | Maeshima et al. .................... | 358/80 |
| 5,121,446 |   | 6/1992 | Yamada et al. ....................... | 382/50 |
| 5,121,447 |   | 6/1992 | Tanioka et al. ....................... | 382/50 |
| 5,153,925 |   | 10/1992 | Tanioka et al. ....................... | 382/52 |
| 5,189,521 | * | 2/1993 | Ohtsubo et al. ....................... | 358/296 |
| 5,208,630 | * | 5/1993 | Goodbrand et al. .................. | 355/201 |
| 5,216,724 |   | 6/1993 | Suzuki et al. .......................... | 382/7 |
| 5,258,783 |   | 11/1993 | Sasanuma et al. .................... | 346/157 |
| 5,291,243 | * | 3/1994 | Heckman et al. ..................... | 355/201 |
| 5,392,100 | * | 2/1995 | Yoshida ............................... | 355/235 |

FOREIGN PATENT DOCUMENTS

| 111597 |   | 6/1984 | (EP) | ............................. | G03G/21/00 |
| 0111597 | * | 6/1984 | (EP) | . | |
| 0382549 | * | 8/1990 | (EP) | . | |
| 382549 |   | 8/1990 | (EP) | ............................. | G03G/21/00 |
| 1534403 | * | 12/1978 | (GB) | . | |

* cited by examiner

Primary Examiner—Thomas D. Lee
Assistant Examiner—Stephen Brinich
(74) Attorney, Agent, or Firm—Fitzpatrick, Cella, Harper & Scinto

(57) ABSTRACT

An image processor includes a first reader which obtains a first signal corresponding to visible information read on an original, and a second reader which obtains a second signal corresponding to invisible information on the original. A comparator compares the first and second signals to discriminate a predetermined pattern on the original.

87 Claims, 43 Drawing Sheets

FIG. 12
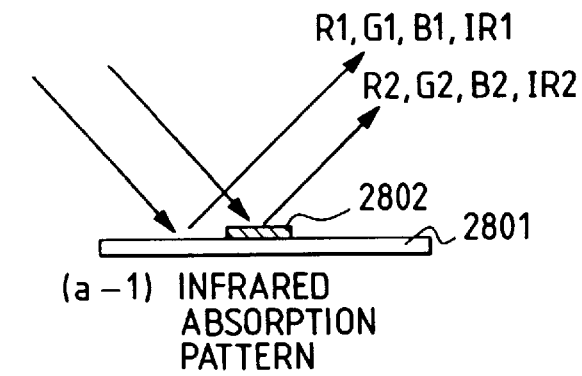
(a-1) INFRARED ABSORPTION PATTERN
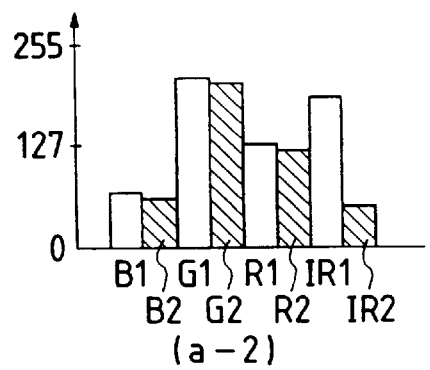
(a-2)
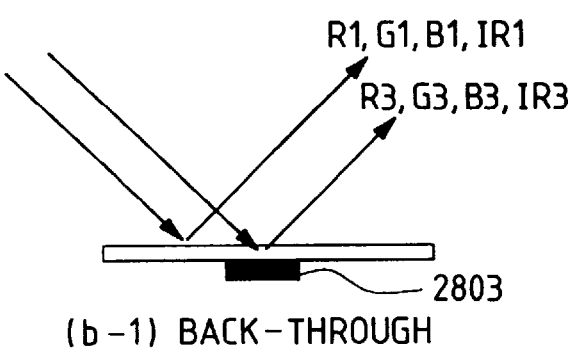
(b-1) BACK-THROUGH
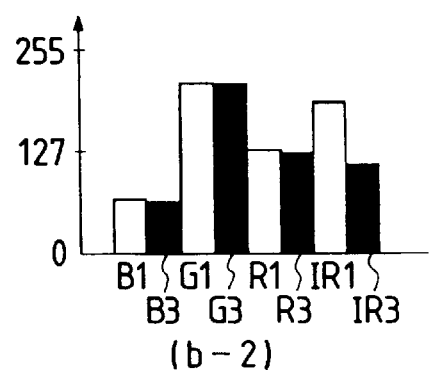
(b-2)
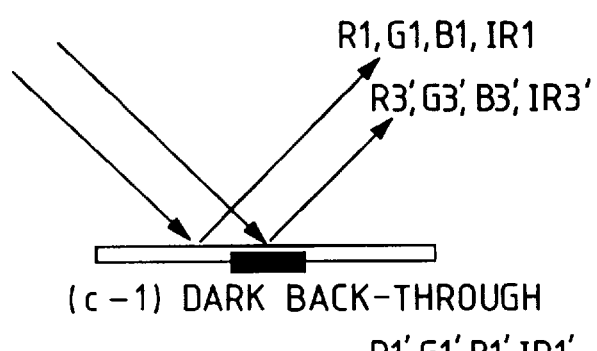
(c-1) DARK BACK-THROUGH
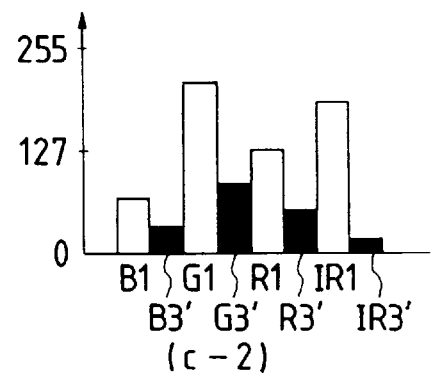
(c-2)
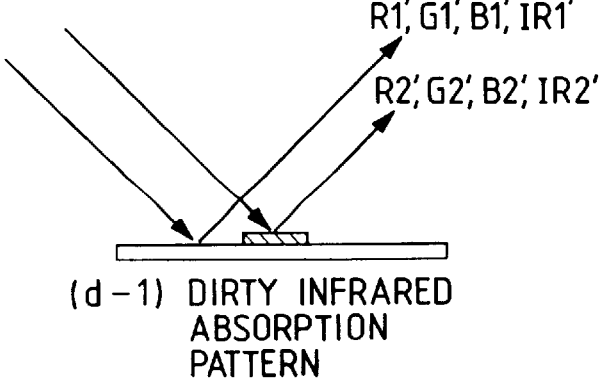
(d-1) DIRTY INFRARED ABSORPTION PATTERN
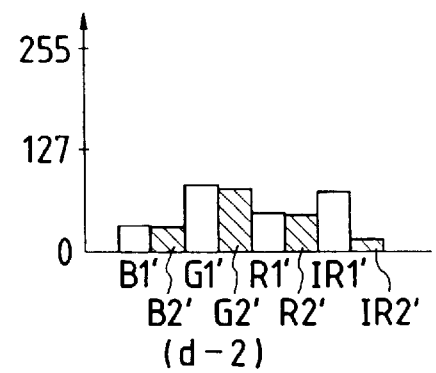
(d-2)

FIG. 13

| ORIGINAL PORTION | VISIBLE INFORMATION | INFRARED INFORMATION |
|---|---|---|
| (a) INFRARED ABSORPTION PATTERN | R2≅R1, G2≅G1, B2≅B1 | IR2<IR1<br>IR2≦min (R2, G2, B2) |
| (b) BACK-THROUGH PORTION | R3≅R1, G3≅G1, B3≅B1 | IR3<IR1<br>IR3≦min (R2, G2, B2) |
| (c) DARK BACK-THROUGH PORTION | R'3<R1, G'3<G1, B'3<B1 | IR3'<IR1<br>IR3≦min (R2, G2, B2) |
| (d) DIRTY INFRARED ABSORPTION PATTERN | R2'≅R1', G2'≅G1', B2'≅B1' | IR2'<IR1'<br>IR2≦min (R2, G2, B2) |

PATTERN PERIPHERAL PORTION     R1, G1, B1, IR1
INFRARED ABSORPTION PORTION     R2, G2, B2, IR2
BACK-THROUGH PORTION     R3, G3, B3, IR3
DARK BACK-THROUGH PORTION     R3', G3', B3', IR3'
DIRTY PATTERN PERIPHERAL PORTION     R1', G1', B1', IR1'
DIRTY INFRARED ABSORPTION PORTION     R2', G2', B2', IR2'

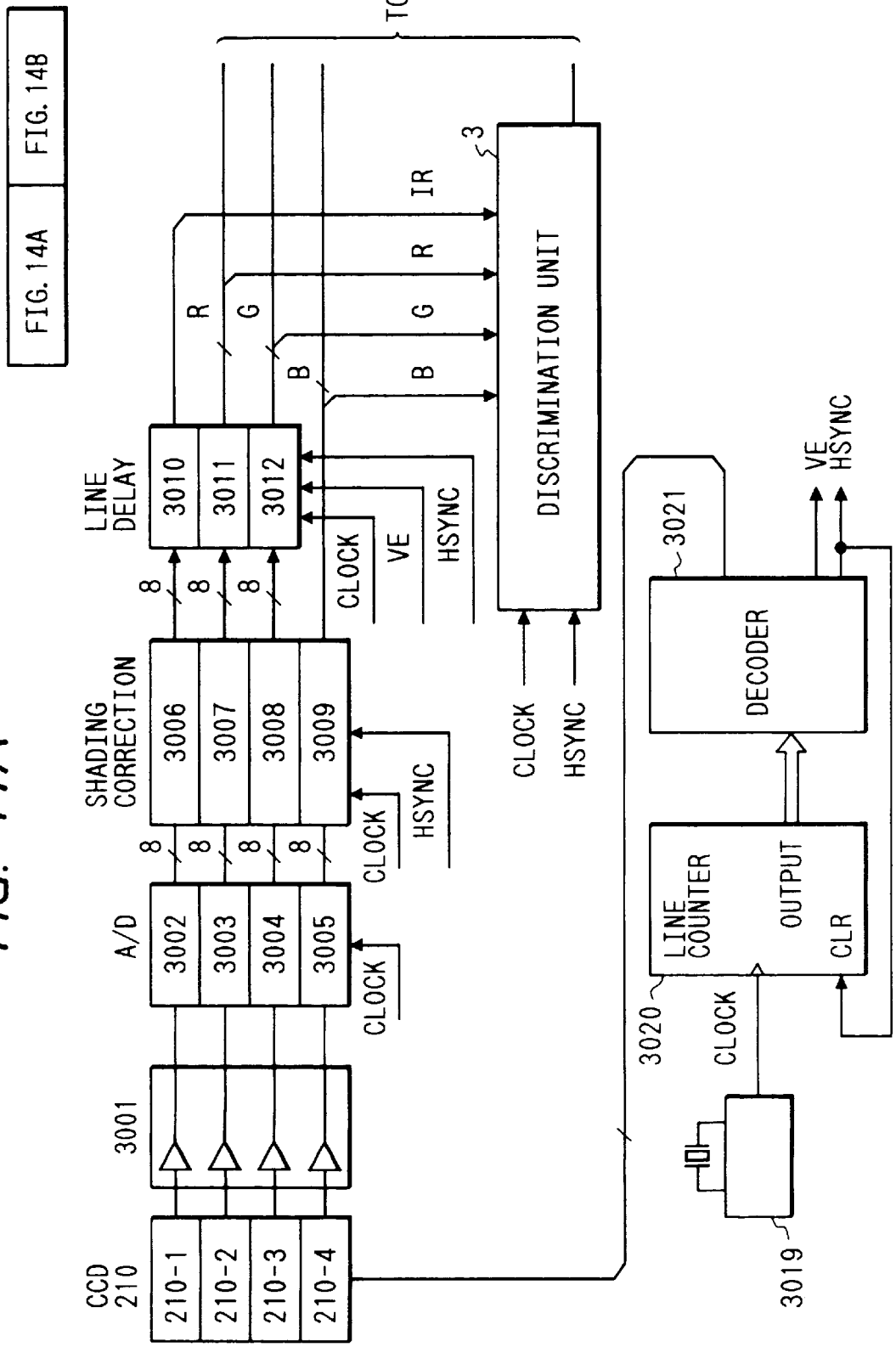

FIG. 26
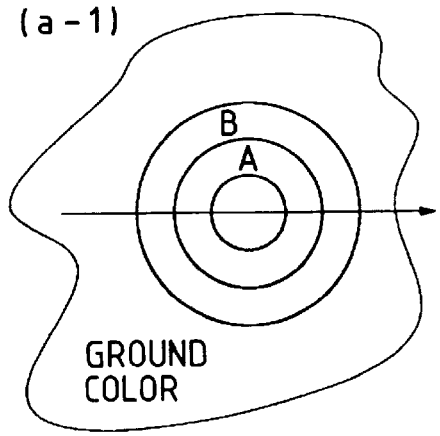
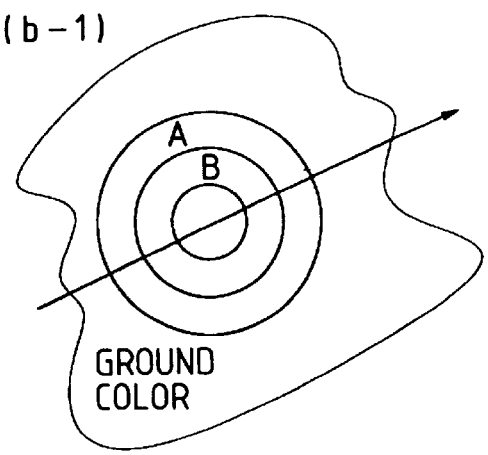
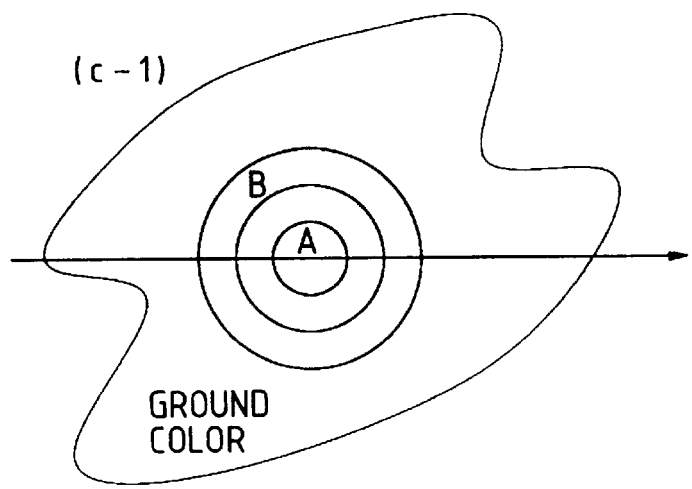
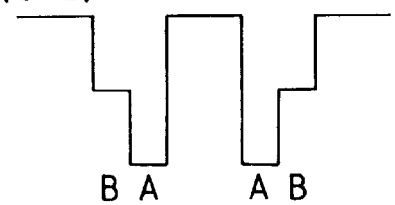
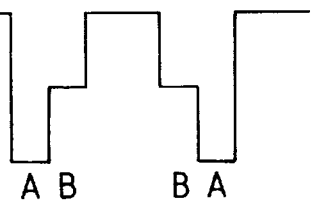
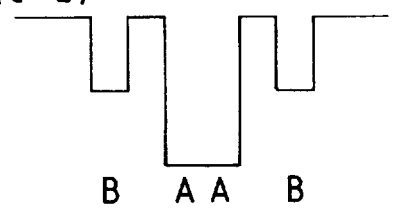

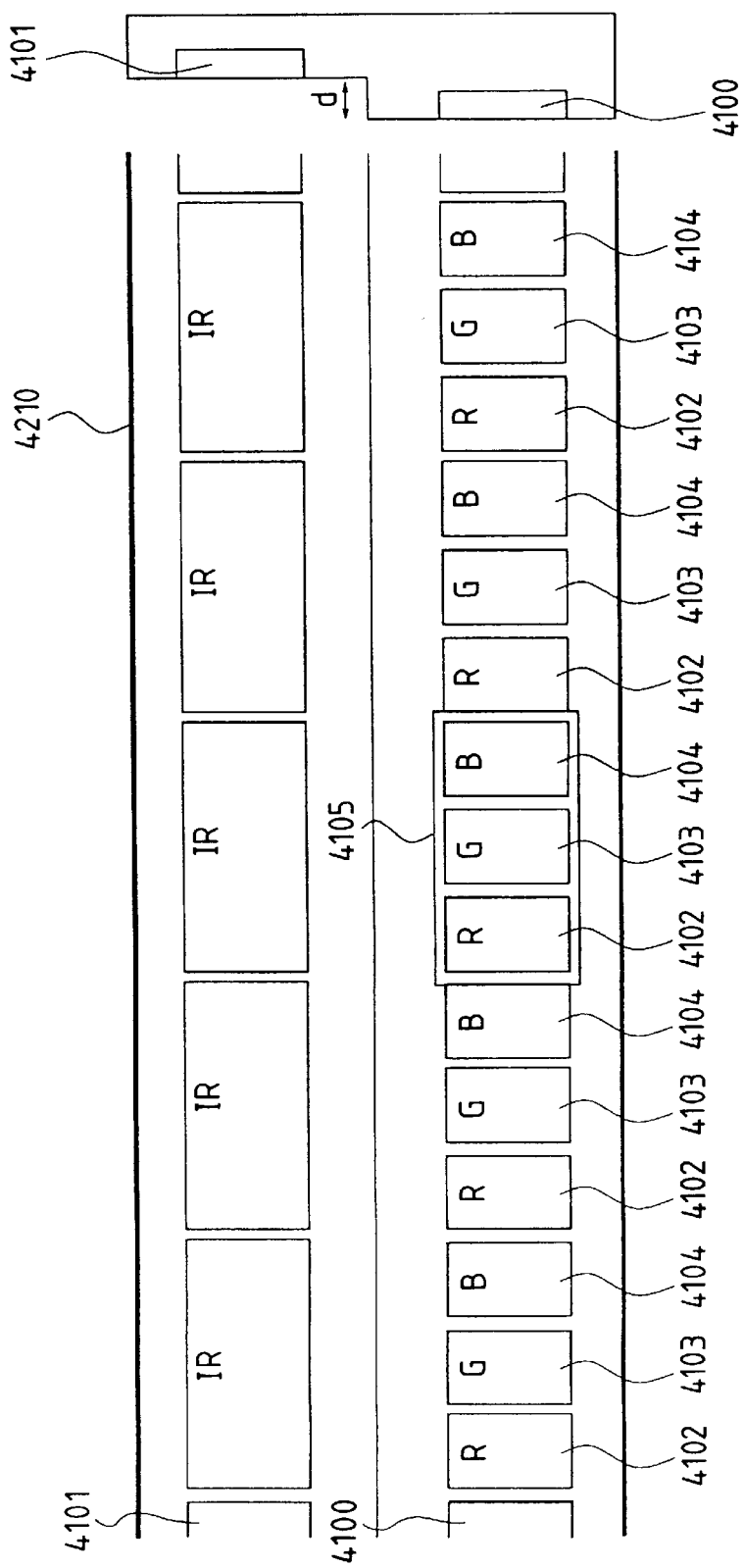

FIG. 44
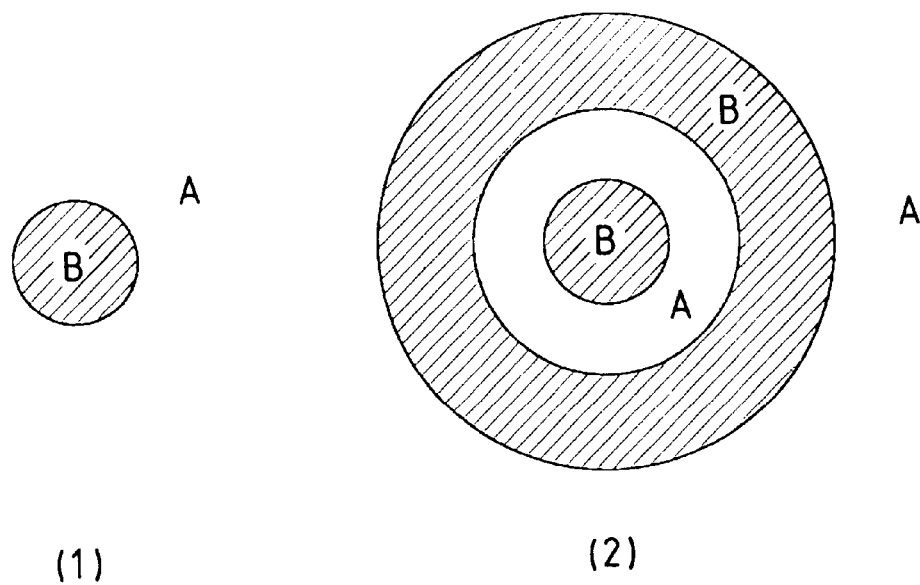
(1)  (2)
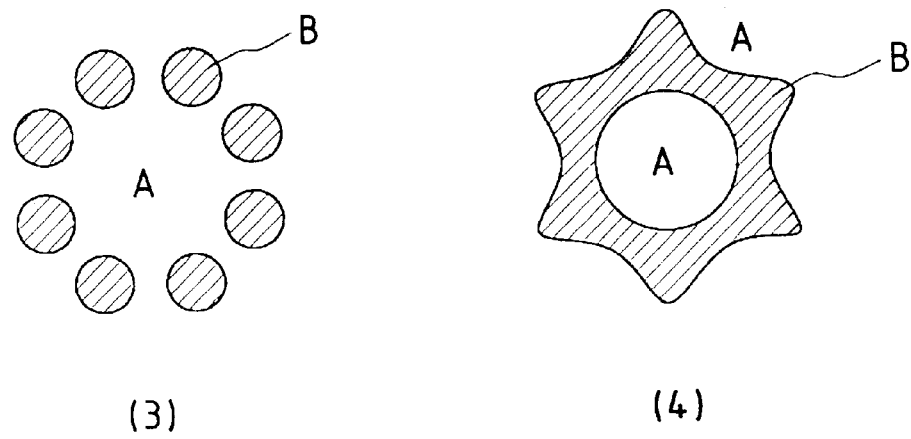
(3)  (4)

AREA A : IR NON-ABSORBING INK     AREA B : IR ABSORBING INK (SECURITY INK)

Ba, Ga, Ra, IRa                     Bb, Gb, Rb, IRb

PRINT IR ABSORBING INK ON AREA A $\Delta IR = IR_A \times ABSORBANCE$ $ABSORBANCE = \Delta IR / IR_A$

FIG. 48

| CONDITION | |
|---|---|
| 1 | max (Ra, Ga, Ba) > 84 |
| 2 | $\Delta IR / IRa > 0.33$ |
| 3 | IN CASE OF Ra > 84<br>$\quad \Delta R/Ra \times 2 < \Delta IR/IRa$<br>OR<br>IN CASE OF Ra $\leq$ 84<br>$\quad \Delta R \leq 8$ |
| 4 | IN CASE OF Ga > 84<br>$\quad \Delta G/Ga \times 2 < \Delta IR/IRa$<br>OR<br>IN CASE OF Ga $\leq$ 84<br>$\quad \Delta G \leq 8$ |
| 5 | IN CASE OF Ba > 84<br>$\quad \Delta B/Ba \times 2 < \Delta IR/IRa$<br>OR<br>IN CASE OF Ba $\leq$ 84<br>$\quad \Delta B \leq 8$ |

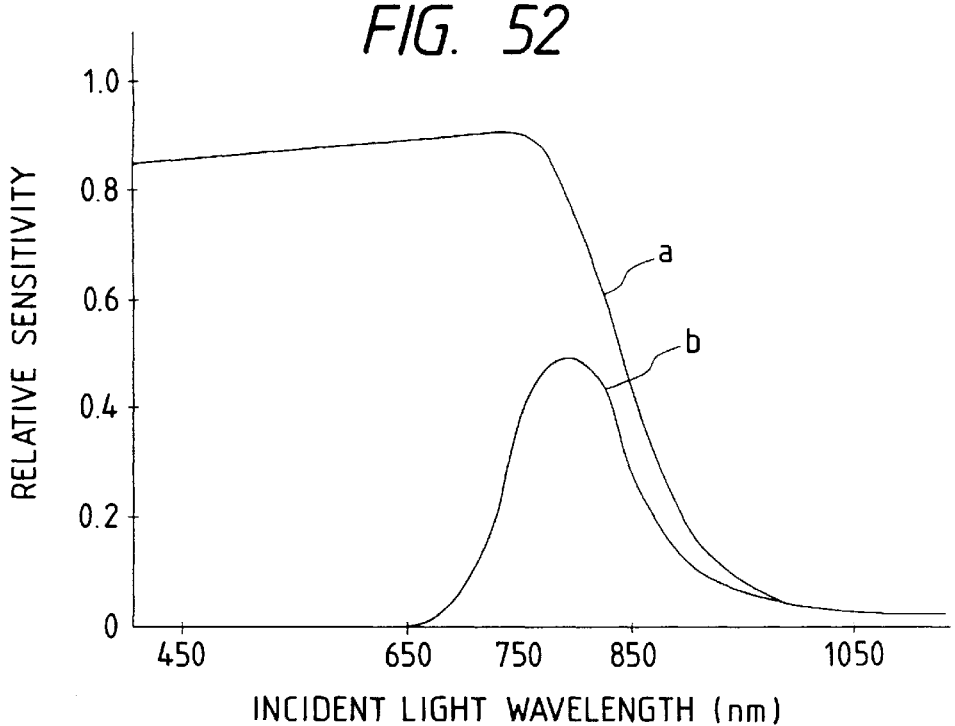
FIG. 52
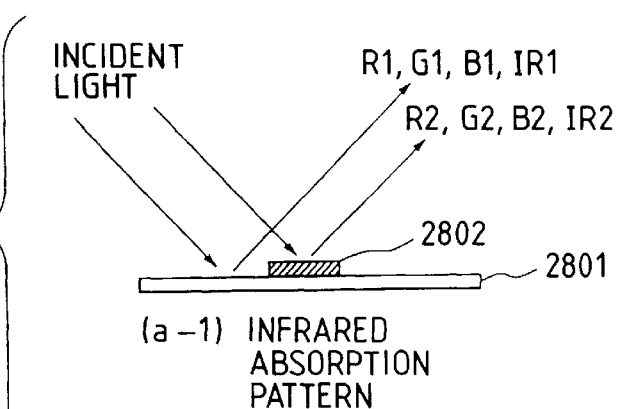
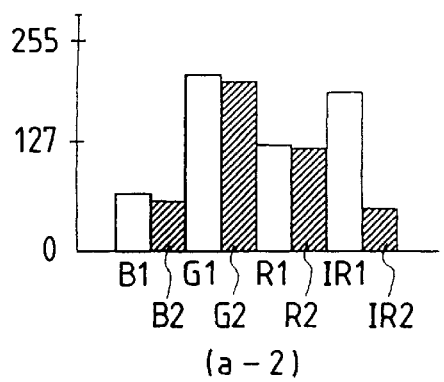
FIG. 53

| FIG. 54A | FIG. 54B |

METHOD AND APPARATUS FOR DETERMINING A PREDETERMINED PATTERN ON AN ORIGINAL BASED ON VISIBLE AND INVISIBLE INFORMATION ON THE ORIGINAL

This application is a continuation of application Ser. No. 08/175,252 filed Dec. 28, 1993, now abandoned.

BACKGROUND OF THE INVENTION

1. Field of the Invention

This invention relates to a method and an apparatus for image processing that is applicable to devices such as a copying machine and an image scanner.

2. Related Background Art

Copying machines have been improved to reproduce a color image of higher quality as close as an original one. Such improvement results in an increased chance for the copying machine of being abused to counterfeit banknotes or valuable securities. With respect to this, various systems have been developed that are capable of discriminating banknotes or the like.

For example, U.S. patent application Ser. No. 715,922 discloses a system for recognizing line drawing of a pattern on the original image. Another system is disclosed in U.S. Pat. No. 5,216,724 where color components are recognized on the original image.

In addition, U.S. patent application Ser. No. 139,173 disclosed to print a particular stamp on a banknote itself with an ink containing fluorescent dye, allowing discrimination between the genuine and counterfeit banknotes. The Application also suggests to use other types of ink such as the one having an infrared absorption characteristic.

A device designed to detect such infrared comprises a reading sensor for infrared detection along with a reading sensor that is similar to those provided in typical devices for reproducing color images. The device of the type described is capable of detecting specific information involved in the original image according to the information about visible color components and luminous energy of the infrared.

When the infrared is used as a basis for discriminating a specific stamp, an erroneous detection may be made due to the presence of some infrared absorbing materials on the back of the original. More specifically, the infrared reaches the deep inside of a paper as well as being reflected from the face of the paper because it involves wavelengths longer than those of visible light. A portion of the infrared reached to the deep inside is reflected therefrom in an amount depending on the infrared absorbing materials, if any, present there. Carbon black, which is often contained in inks and pigments for printing, is one of the infrared absorbing materials. Thus, if the carbon black is present on the back of the original, the infrared reached to there is absorbed by this carbon black. However, less or no visible information is obtained from the back of the original. Thus, the visible information is obtained from the face of the original though the infrared information is obtained from the back of it. As a result, there is a disadvantage of erroneously detecting the infrared absorbing materials on the back of the original as the specific stamp.

Alternatively, the ultraviolet light may also be used for detecting a specific stamp on the original. A fluorescent dye contained in the ink is, however, more likely to be detected as the specific stamp causing incorrect discrimination of the original.

In addition, the device for reading the color image (e.g., a color copying machine and an image reader) should be modified to some degree if the invisible pattern is used as an identifier for a specific original. This means that the device should be capable of focusing visible regions as well as invisible regions, which is difficult for the existing devices.

Another challenge to the security is to use a glazing color having specific reflecting characteristics to the infrared region and thereby detecting the latter. The glazing color can be printed independently of the visible colors, so that this technique is applicable to make any valuable securities. However, this optical characteristics specific to the infrared region is disadvantageous in that it is affected by various factors including the color material such as the carbon black, oil and dirt of fingers. Thus, incorrect discrimination may sometimes be caused.

SUMMARY OF THE INVENTION

The present invention is directed to overcome the above mentioned problems.

More specifically, an object of the present invention is to provide an image processing apparatus capable of discriminating a specific pattern in high accuracy by using visible and invisible information.

In particular, the object is to avoid incorrect or erroneous discrimination due to the information involved in the back of the original.

To achieve the above mentioned objects, there is disclosed an image processing apparatus comprising reading means for obtaining a first signal corresponding to visible information of an original and a second signal corresponding to invisible information of the original; and comparing means for performing a comparison by using first and a second signals in order to discriminate a predetermined pattern.

In addition, another object of the present invention is to design a simple apparatus for such discrimination that is operated at a high speed.

Yet another object of the present invention is to provide a method of forming a pattern advantageously discriminated by the discrimination apparatus of the type described.

Still another object of the present invention is to form a pattern that is less notable to human eyes and is detected by a predetermined apparatus.

A further object of the present invention is to avoid counterfeit of a predetermined original.

It is another object of the present invention to improve a copying apparatus.

These and other objects and features of the present invention will become more fully apparent from the following description and appended claims taken in conjunction with the accompanying drawings.

BRIEF DESCRIPTION OF THE DRAWINGS

FIG. 12 is a view showing geometry of radiation reflected from various originals and corresponding states of infrared reading signals;

FIG. 13 illustrates relations between infrared reading signals and visible reading signals for various originals;

FIG. 26 is a view showing examples of printing of specific patterns according to the present invention;

FIGS. 29A and 29B show structures of color sensors applied to the embodiment of the present invention;

FIG. 44 shows exemplified specific patterns in various shapes;

FIG. 48 is a table indicating judgment conditions for a specific mark;

FIG. 52 shows spectral response of a far infrared cutoff filter;

FIG. 53 is a view showing states of infrared reading signals for an original.

DETAILED DESCRIPTION OF THE PREFERRED EMBODIMENTS

In the following embodiments an exemplified copying machine is described and illustrated to which the present invention is applied. However, the present invention is not limited to those illustrative embodiments and may be applicable to various other devices including a single image scanner and a sensor.

<First Embodiment>

One of the above mentioned problems is solved in the following first embodiment of the present invention by means of comparing, upon reading a invisible specific mark to be detected, a signal level of invisible read information with that of visible read information, thereby judging whether the invisible information in question is associated with the specific mark.

Figure 2:
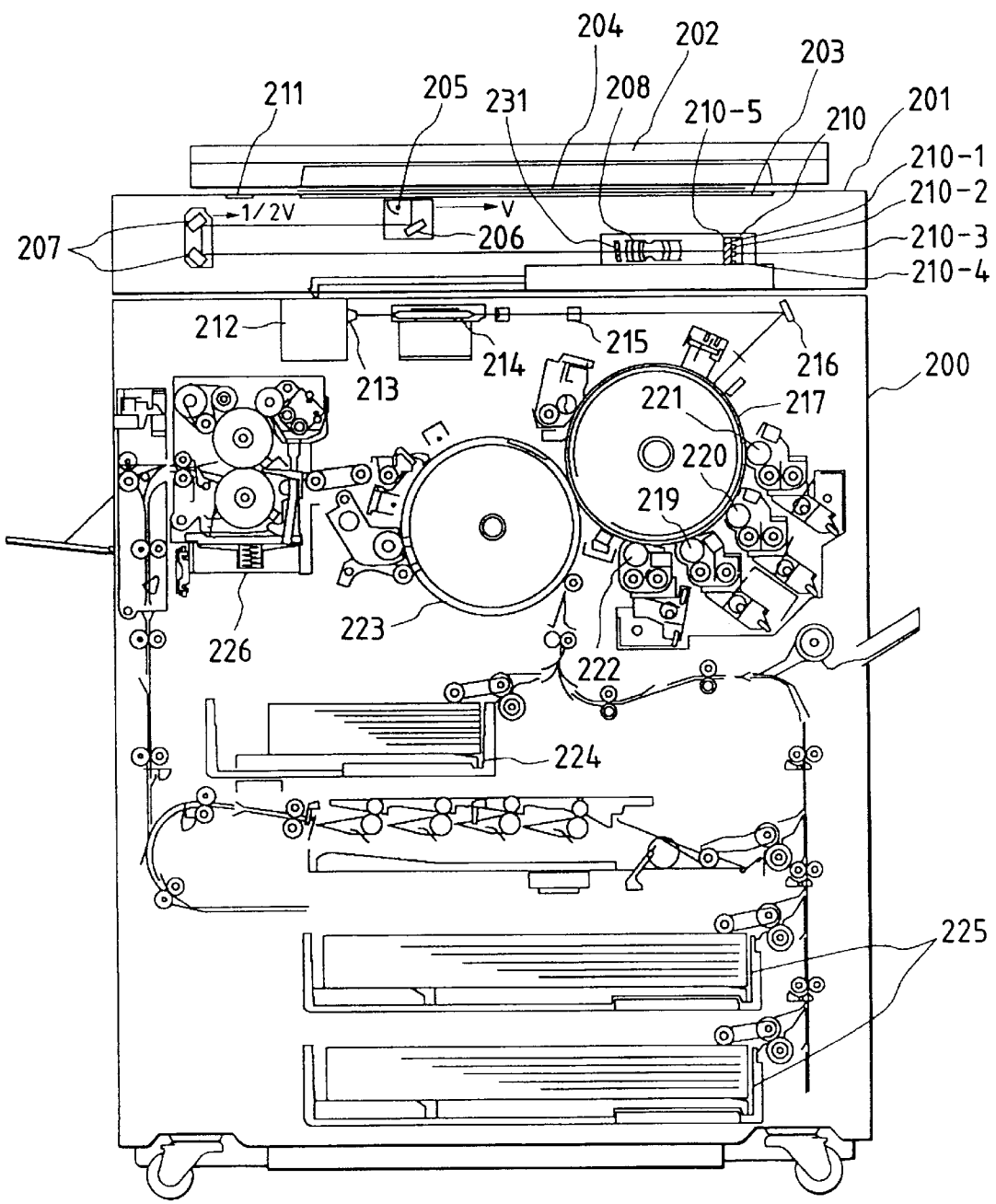
FIG. 2 is a schematic view showing a structure of a color copying machine to which the present invention is applied.

FIG. 2 is an outside view of an apparatus according to the first embodiment of the present invention.

In FIG. 2, the apparatus comprises an image scanner unit 201 and a printer unit 200. The image scanner unit 201 is for picking up an original image and digitizes it into an electrical signal. The printer unit 200 is for printing on a paper a full-color image corresponding to the original image picked up by the image scanner unit 201.

The image scanner unit 201 comprises a pressing plate 202. An original 204 carried on an original carrier glass plate (hereinafter, referred to as a platen) 203 is illuminated with light produced by a halogen lamp 205. The halogen lamp 205, which serves as a light source, produces light beams involving wavelengths corresponding to the infrared region. The light reflected from the surface of the original is guided to mirrors 206 and 207 and is focused by a lens 209 on a four-line sensor (hereinafter, referred to as a CCD) 210. The CCD 210 separates colors of the optical information obtained from the original. The separated colors are supplied to a signal processing unit 209 as full-color information consisting of red (R), green (G) and blue (B) components and an infrared (IR) component. The entire area of the original is scanned by mechanical movement of the lamp 205 and the mirror 206 at a velocity v, and of the mirrors 207 at a velocity v/2, in a direction perpendicular (hereinafter, referred to as a sub scan direction) to the electrical scanning direction (hereinafter, referred to as a main scan direction) of the four-line sensor 210.

Figure 7:
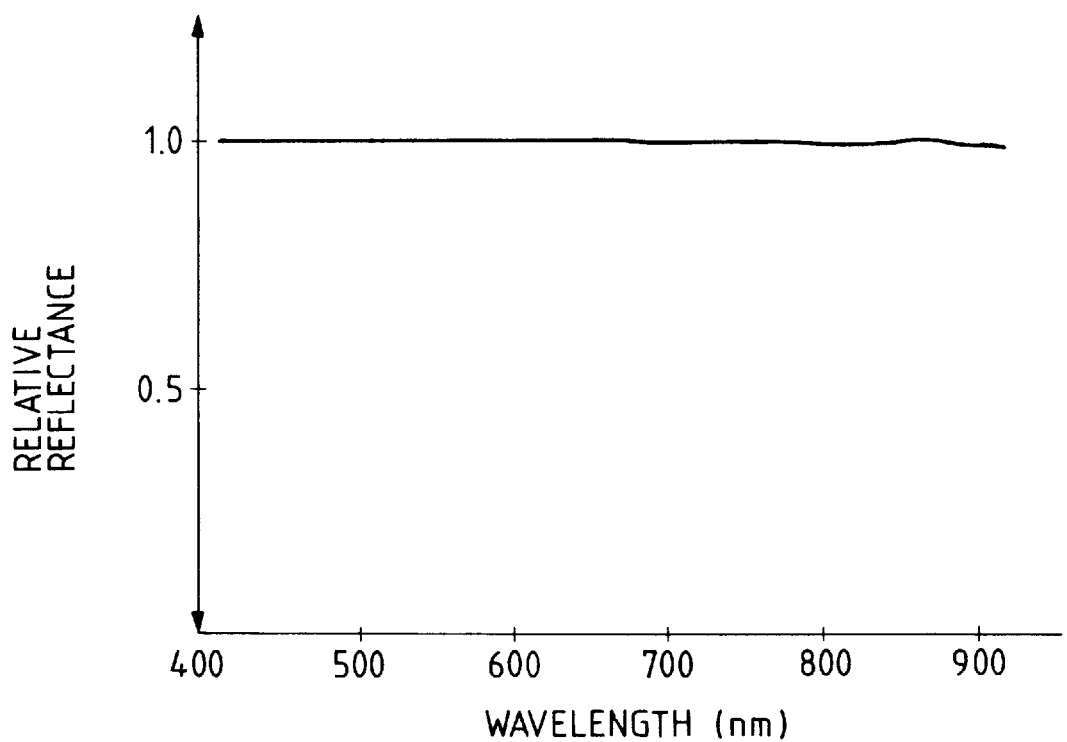
FIG. 7 shows spectral reflectance of a standard white plate.

A standard white plate 211 generates a correction data for correcting shading of read data 210-1 through 210-4 (correction of characteristics of an individual element of each line sensor) corresponding to the line sensors IR, R, G and B, respectively. The standard white plate 211 reflects light that is relatively balanced in all visible and infrared wavelengths. In other words, the standard white plate 211 reflects light at substantially uniform reflectance, as shown in FIG. 7, and appears white to the eyes. This standard white plate 211 is adapted to generate data used for shading correction on the output data of the IR sensor 210-1 and of the visible sensor 210-2 through 210-4.

The signal processing unit 209 electrically processes the signals obtained by the scanning operation to separate it into components of magenta (M), cyan (C), yellow (Y) and black (BK), which are sent to the printer unit 200. Either one of the components M, C, Y, and BK is supplied to the printer unit 200 at every one scanning operation of the image scanner unit 201, so that a complete color image corresponding to one original is obtained through four-time scanning operation.

The image signals representing the respective components M, C, Y and BK supplied from the image scanner unit 201 are sent to a laser driver 212. The laser driver 212 drives a semiconductor laser 213 in response to the image signal supplied from the image scanner unit 201. The semiconductor laser 213 emits a laser beam and the emitted beam scans a photosensitive drum 217 through a polygon mirror 214, an f-θ lens 215, and a mirror 216.

A developing unit is composed of a magenta developing station 219, a cyan developing station 220, a yellow developing station 221 and a black developing station 222. These four developing stations are successively brought into contact with the photosensitive drum 217, thereby developing electrostatic latent images of M, C, Y and BK formed on the photosensitive drum 217 with toners corresponding to the respective colors.

A sheet fed from a sheet cassette 224 or 225 is wound on a transfer drum 223, and receives the transfer of the image developed on the photosensitive drum 217.

After completion of transferring each of four color images of M, C, Y and BK, the sheet is discharged through a fixing unit 226.

The halogen lamp 205 is commonly used for visible and infrared information readings. It produces light composed of a band of frequencies required for these readings. Such common source of light contributes to effective illumination of light with different wavelengths to the original which are required for visible and infrared information readings.

Figure 6A:
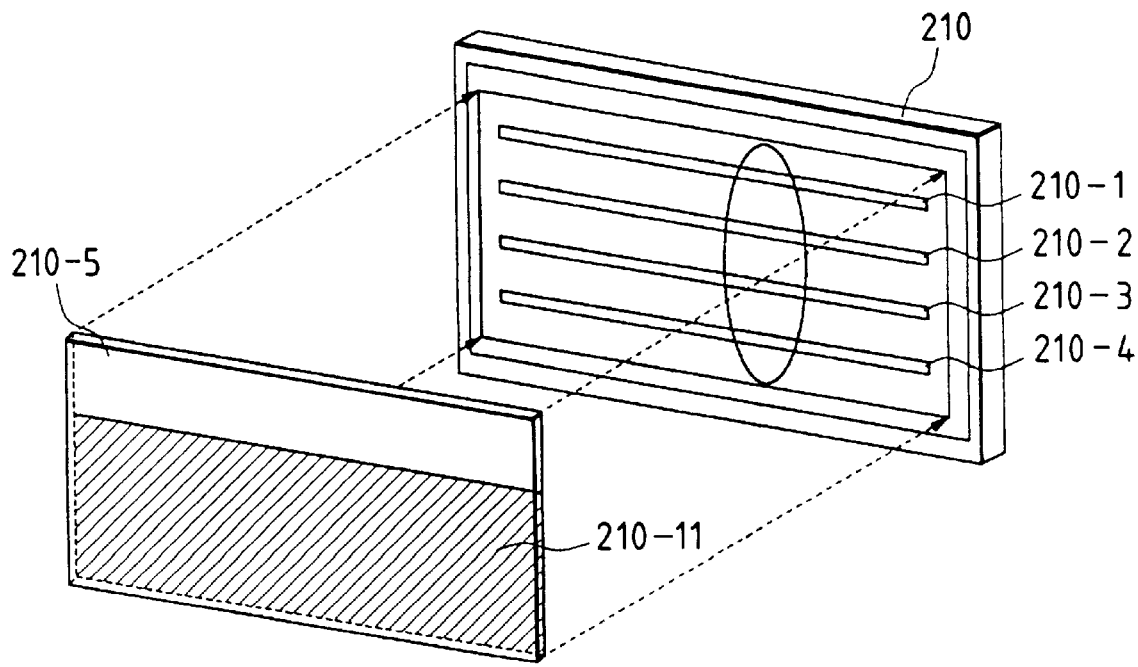
FIG. 6A is a schematic perspective view showing a charged coupled device (CCD)
Figure 6B:
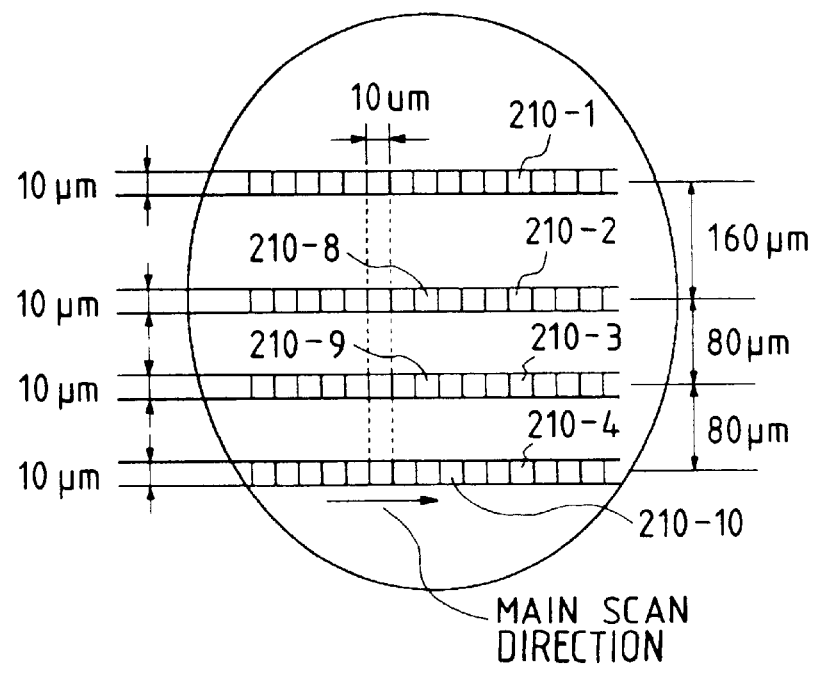
FIG. 6B is a view showing CCD line sensors implemented in the CCD device of FIG. 6A.

FIGS. 6A and 6B illustrate the CCD 210 applied to the present embodiment.

The infrared sensor 210-1 is a photosensitive element line (CCD line sensor) used for sensing infrared radiation. The photosensitive element lines 210-2, 210-3, and 210-4 are for sensing R, G, and B waveform components (visible spectra), respectively. Each of the IR, R, G and B sensors 210-1 through 210-4 has openings of 10 μm in width and in length along the main and sub scan directions, respectively. These photosensitive element lines are different in optical characteristics from each other and are arranged monolithically on a single silicon chip such that the IR, R, G and B sensors are arranged in parallel to each other to sense the same line on the original.

The above mentioned structure of the CCD allows common usage of optical system such as a lens for visible and infrared readings.

This makes it possible to improve the accuracy of optical adjustment or the like and facilitate the adjustment as well.

Figure 10:
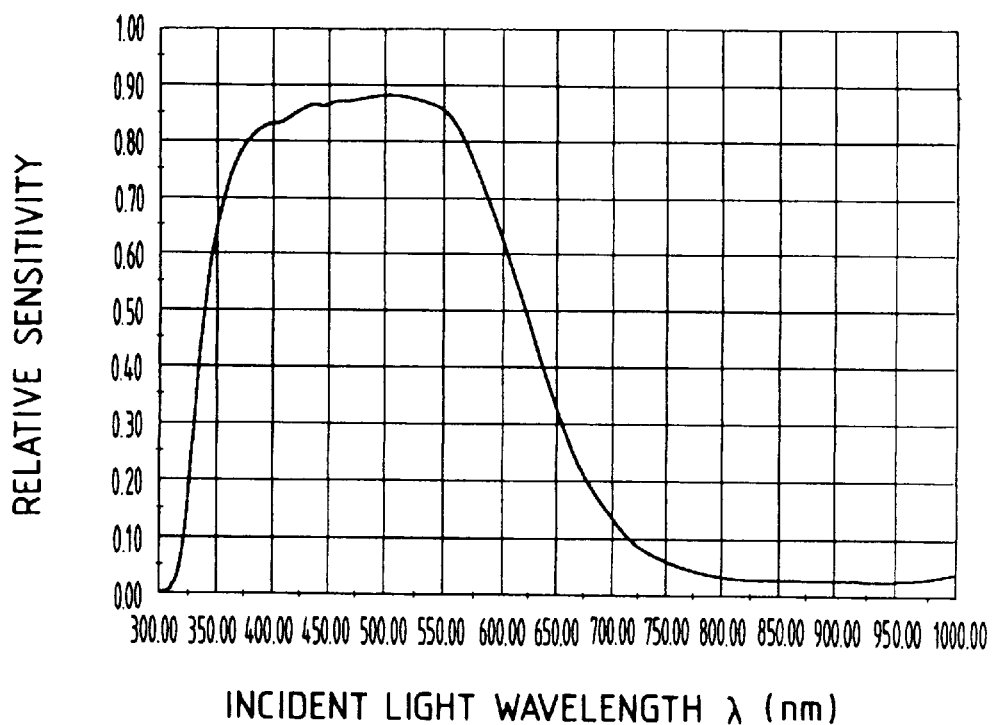
FIG. 10 shows spectral response of an infrared cutoff filter.

A reference numeral 210-5 represents a glass plate of approximately 300 μm in thick. The hatched portion of the glass is treated to have an infrared cutoff characteristic. For this purpose, the glass plate 210-5 is provided with a dichroic mirror 210-11 formed of a deposition film. The characteristic of this infrared cutoff region is shown in FIG. 10. In this event, the glass plate 210-5 is adhered to the surface of the chip with the deposited region facing to the sensors.

Figure 9:
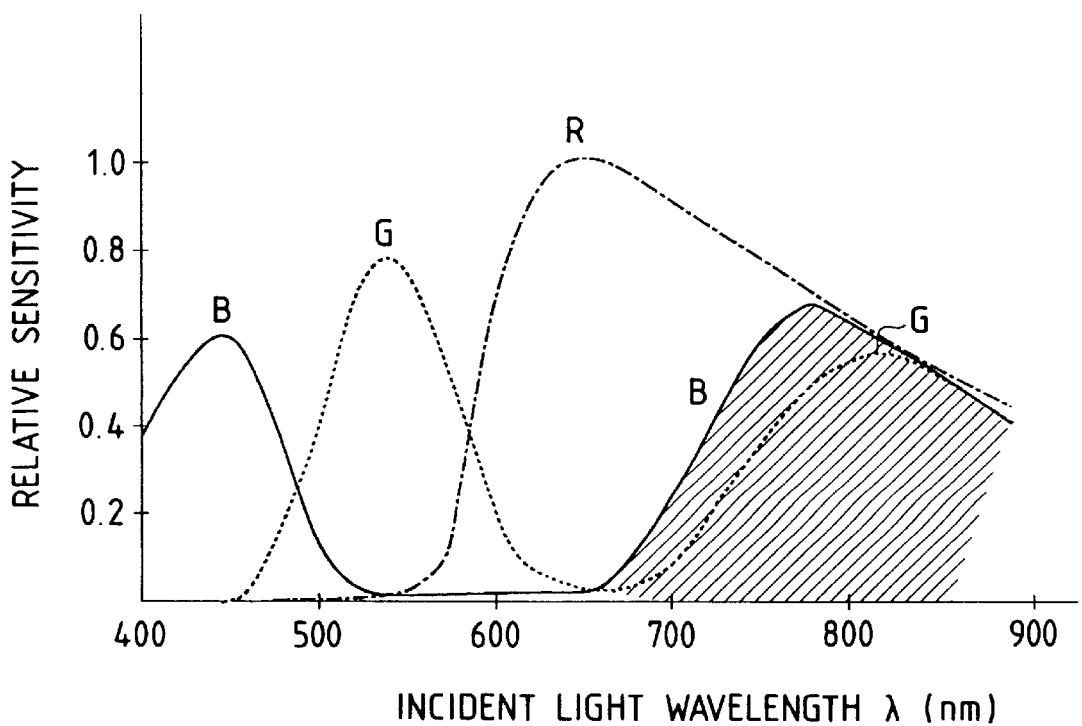
FIG. 9 shows spectral response of a visible line sensor and that of a filter for an infrared reading sensor, both in accordance with the present embodiment.

Referring to FIG. 9, described is a filter spectral characteristic of each of the line sensors IR, R, G and B in the CCD 210.

The sensor 210-2 is provided with a filter 210-8 having a characteristic indicated by R in FIG. 9 that has sensitivity to light of red and infrared spectra. Likewise, the sensor 210-3 is provided with a filter 210-9 having a characteristic indicated by G in FIG. 9 that has sensitivity to light of green and infrared spectra. The sensor 210-4 is provided with a filter 210-10 having a characteristic indicated by B in FIG. 9 that has sensitivity to light of blue and infrared spectra. The IR sensor 210-1 is sensitive only to the infrared radiation corresponding to the region represented by cross-hatched portion in FIG. 9.

As apparent from the figure, the filters 210-8 through 210-10 are sensitive to the infrared radiation having a wavelength of 700 nm or more. With this respect, the infrared cutoff filter 210-11 used is so selected that it has the characteristic illustrated in FIG. 10.

FIG. 6B is an enlarged illustration of the photosensitive elements. Each sensor is 10 μm in length for every one pixel along the main scan direction. Five thousand sensors are aligned along the main scan direction for each CCD line sensor to read the width (297 mm) of an A3-paper at a resolution of 400 dpi. In addition, the R, G and B line sensors are away from each other at a distance of 80 μm, which corresponds to an eight-line distance relative to a sub scan resolution of 400 lpi (line per inch). The IR sensor 210-1 is away from the R sensor 210-2 at a distance of 160 μm (16 lines), a double of other line distance.

Figure 8:
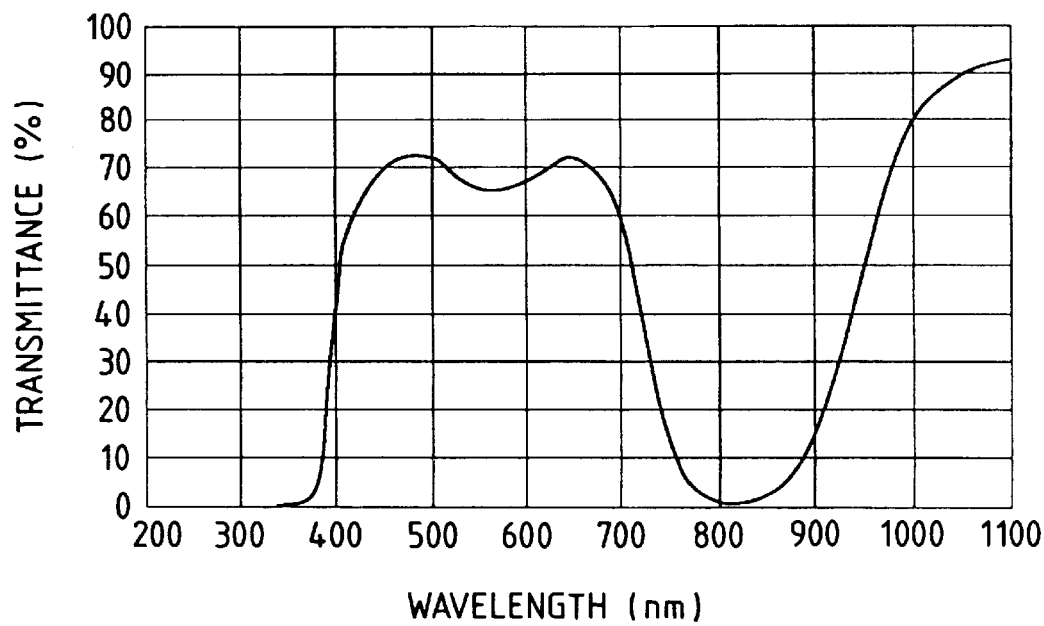
FIG. 8 shows spectral transmittance of a specific pattern.

FIG. 8 shows spectral response of an infrared absorber SIR-159 (sold by Mitsui Toatsu Chemicals Inc., Chiyoda-ku, Tokyo, Japan) used in this embodiment as a detected mark on a specific original. In this embodiment, the IR sensor 210-1 is directed to sense the infrared with wavelength ranging between 750 and 850 nm to detect presence of this infrared absorber.

Figure 11:
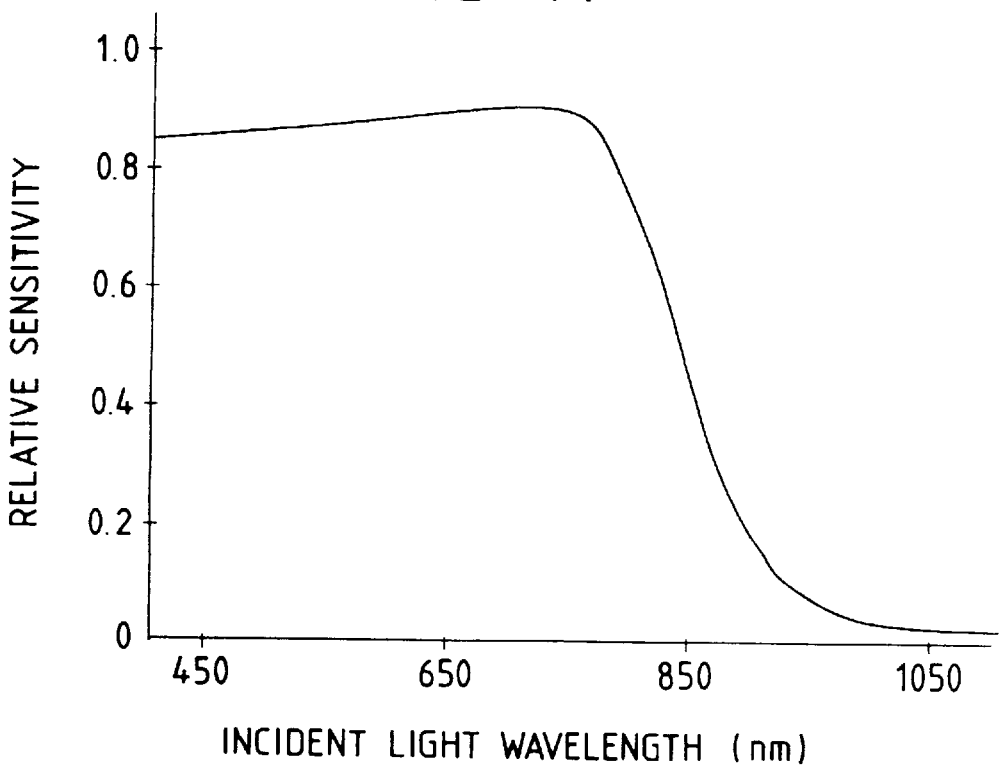
FIG. 11 shows spectral response of a far infrared-cutoff filter.

To this end, the lens 208 is provided with a far infrared cutoff filter formed of a dichroic mirror having spectral response as illustrated in FIG. 11. This filter is harmless for the R, G and B sensors 210-2 through 210-4 as well as for the IR sensor 210-1, so that it is provided with a common lens unit, the lens 208. This allows a design for the filter provided for the lens 209 to be determined only by the consideration of the far infrared cutoff characteristic. As a result, superior far infrared cutoff characteristic can be achieved with a simple interference fringe structure.

FIG. 14 is a block diagram for use in describing flow of the image signals in the image scanner unit 201. Each of the image signals is supplied from the CCD 210 to an analog signal processing unit 3001. The analog signal processing unit 3001 changes the magnitude of the image signal with a gain constant. The offset is also adjusted in the analog signal processing unit 3001. The image signals for the respective colors (including IR) are then supplied from the analog signal processing unit 3001 to respective A/D converters 3002 through 3005. Each of the A/D converters 3002 through 3005 converts the analog image signal into a digital image signal of 8 bits. The digital image signal is supplied to corresponding one of shading correction units 3006 through 3009 where it is subjected to known shading correction using a reading signal obtained for the standard white plate 211.

A clock generator 3019 generates a clock signal at a speed corresponding to data of one pixel carried by the digital image signal. The clock signal is supplied to a line counter (a main scan address counter) 3020 that counts the number of clock signals to produce a pixel address output for one line. A decoder 3021 decodes a main scan address supplied from the main scan address counter 3020 to generate a CCD driving signal, a VE signal and a line synchronization signal HSYNC. The CCD driving signal may be shift pulses or reset pulses for every one line while the VE signal indicates a valid section in a one line reading signal supplied from the CCD.

As shown in FIGS. 6A and 6B, the line sensors 210-1, 210-2, 210-3 and 210-4 in the CCD 210 are spaced from each other at a predetermined distance. Line delay elements 3010, 3011 and 3012 are provided for correcting the spatial displacement. More specifically, the image signals obtained from the IR, R and G sensors 210-1, 210-2 and 210-3 proceed the image signal out of the B sensor 210-4 in the sub scan direction. With this respect, the line delay elements 3010, 3011 and 3012 line-delay the IR, R and G signal in the sub scan direction relative to the B signal.

Light-to-density conversion (logarithmic) units 3013, 3014, 3015 are composed of look-up table ROMs and convert luminance signals of R, G and B into density signals of C, M and Y. A known masking and undercolor removal (UCR) circuit 3016 generates, from input signals Y, M and C representing three primary colors, output signals of Y, M, C, and Bk with a predetermined number of bits (for example, 8 bits), at each scanning operation carried out by the image scanner unit 201.

A discrimination unit 3 detects a specific pattern on the original, which is a feature of the present invention. A CPU 3018 carries out sequence control involving, for example, control to the original reading optical systems and ON/OFF control of the original illumination lamp 205. The CPU 3018 produces a pixel section signal VSYNC in the sub scan direction. The CPU 3018 also serves to control a selector 3017 in response to a result of judgment supplied from the discrimination unit 3 such that a port output rather than the reading signal is supplied to the printer, thereby effectively prohibiting copying operation for a specific original.

Figure 15:
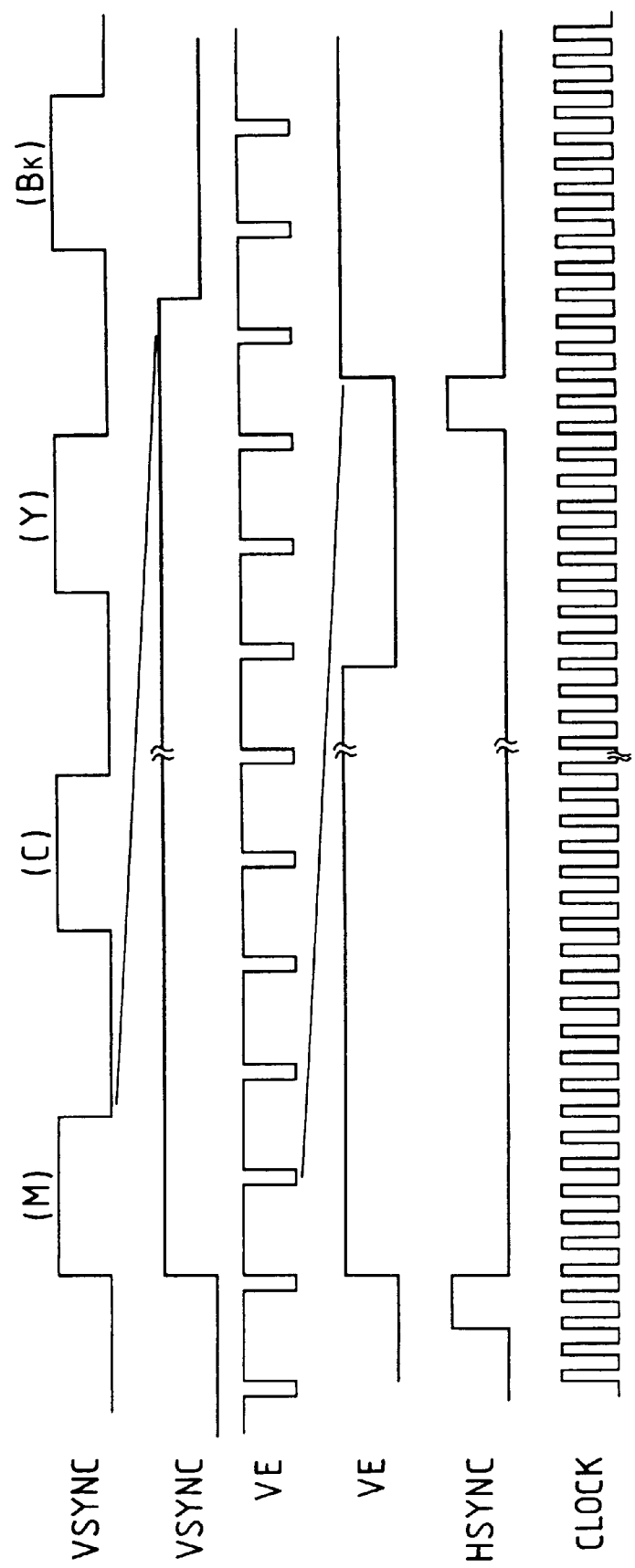
FIG. 15 is a timing chart of image control signals.

FIG. 15 is a timing chart for each control signal.

The VSYNC signal indicates the image valid section in the sub scan direction and assumes a level "1" in the entries for scanning the image to successively produce the output signals of (M), (C), (Y) and (Bk). VE is a signal indicating the image valid section in the main scan direction and takes, in the section of level "1", timing at the start position of the main scanning operation. A CLOCK signal is a pixel synchronization signal which causes the transfer of the image data at the leading edge from "0" to "1".

Figure 3:
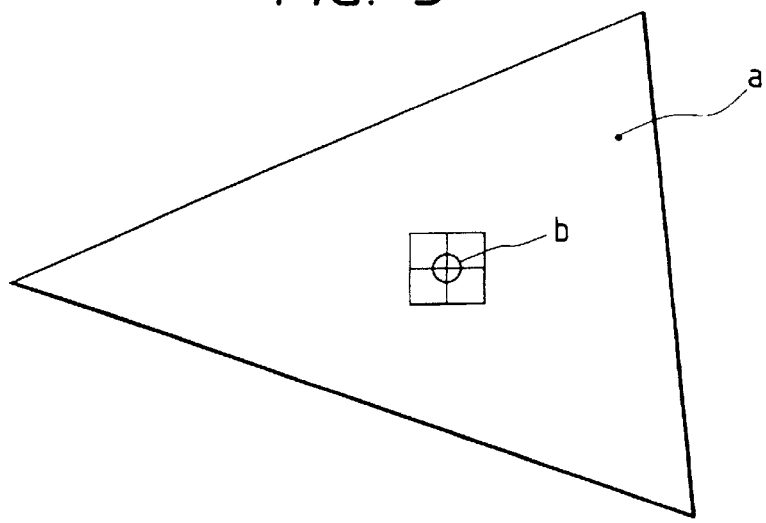
FIG. 3 is a view illustrating a specific pattern for discriminating an original.

Next, an image pattern to be detected in the present invention is described referring to FIG. 3.

FIG. 3 is a view illustrating an example of a pattern formed with a transparent ink containing a glazing dye having the spectral response as shown in FIG. 8. A triangular pattern a is printed with an ink excluding the infrared with a certain range of wavelength. A small square pattern b having sides of 120 $\mu$m in length is overlapped with the triangle and printed thereon with the above mentioned transparent ink.

This pattern appears substantially same to the human eye, as shown in FIG. 8, in the visible spectrum. However, it can be detected in the infrared region by means of determining the infrared absorption characteristics of the pattern. While the square pattern having the sides of approximately 120 $\mu$m is illustrated here for the later description, the region corresponding to this pattern b requires four pixels as shown in the figure when being read at 400 lpi (line per inch). It is noted that a method of forming the pattern in not limited to that described here.

Figure 4:
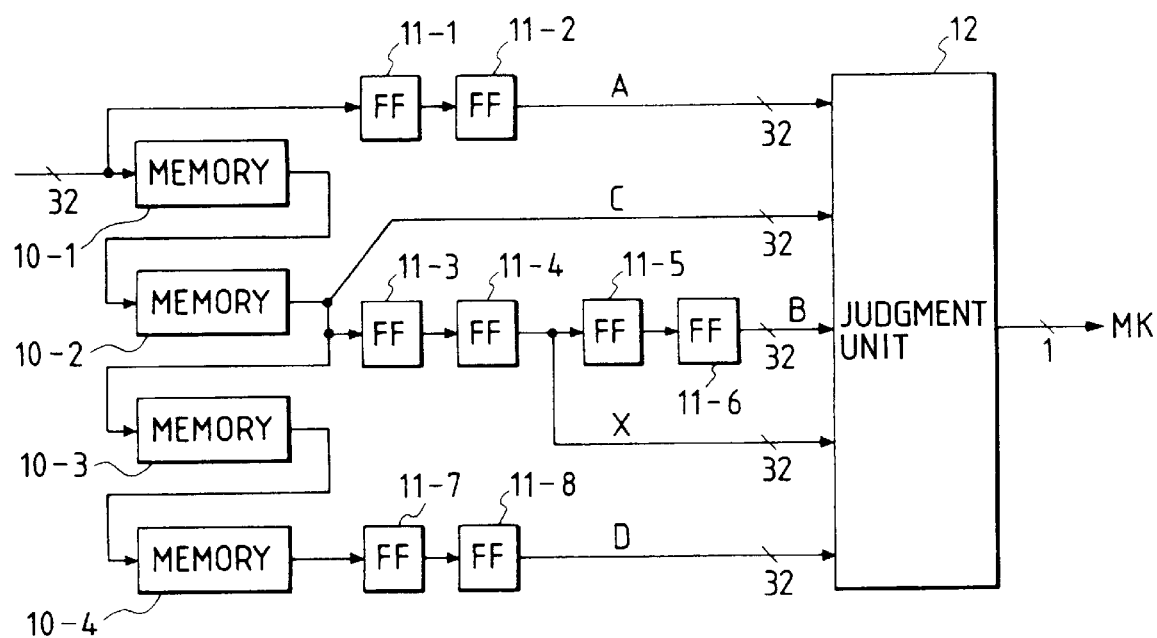
FIG. 4 is a block diagram of a secondary area signal generating unit for use in detecting a specific pattern.

Details of the discrimination unit is described with reference to FIG. 4 in which 10-1 through 10-4 represent image data line delay units. Each of the image data line delay units 10-1 through 10-4 is composed of a first-in-first-out (FIFO) memory. An address pointer thereof is initialized with a line synchronization signal HSYNC, which is not shown in this figure. The CLOCK signal is used for writing data into the FIFO memory for every one pixel and reading the same out of the memory. The image data line delay units 10-1 through 10-4 delay a 32-bit data (eight for each IR, R, G and B) by one line.

More specifically, the input signal is delayed and latched by 2 pixels at flip-flops 11-1 and 11-2 to produce a pixel data A. The line memories 10-1 and 10-2 delay this signal by two lines to produce a pixel data C. This pixel data C is delayed by four pixels to produce a notable pixel data X and a pixel data B. All of these signals A, C and X are supplied to a judgment unit 12. Likewise, a pixel data D is produced and supplied to the judgment unit 12.

Figure 5:
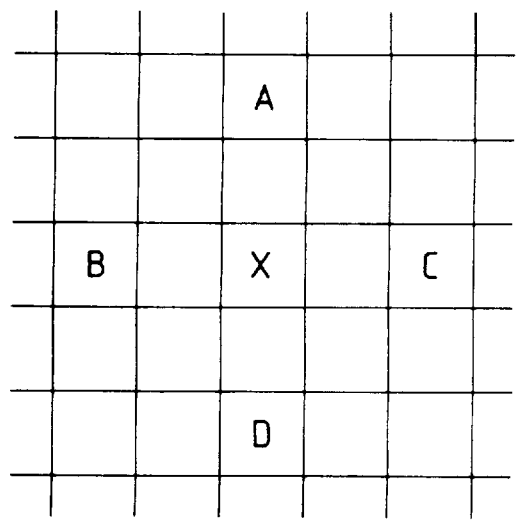
FIG. 5 shows reference pixels for use in detecting a specific pattern.

FIG. 5 shows the positional relation between the notable pixel data X and other four pixels A, B, C and D therearound. As apparent from the figure, when the notable pixel X corresponds to the pattern b (FIG. 3), then the pixels A, B, C and D all correspond to the peripheral area, the image of the pattern a.

FIG. 12 is a view showing geometry of visible and infrared radiation reflected from various originals and corresponding states of infrared reading signals. In FIG. 12, (a-1) is a cross-section of the specific original identification pattern shown in FIG. 3. An infrared absorbing ink 2802 is on the face of a paper 2801. The incident light from the halogen lamp 205 is reflected from the infrared absorption pattern and its peripheral portion. In this figure, R1, G1, B1, IRI1, R1', G1', B1', IRI1', R2, G2, B2, IRI2, R2', G2', B2', IRI2', R3, G3, B3, IRI3, R3', G3', B3' and IRI3' are values obtained by means of sensing the reflected light by the R, G, B and IR sensors and converting these analog signal to the digital ones, following which the shading correction and line delay processings are made.

These read values are given, for the R, G and B visible information, as the spectral characteristics corresponding to a combination of characteristics of the R, G and B sensors in FIG. 9 and the infrared cutoff filter in FIG. 10.

In this event, R represents the light with wavelengths primarily in the 590 to 620 nm range, G represents the light with wavelengths primarily in the 500 to 580 nm range and B represents the light with wavelengths primarily in the 400 to 480 nm range.

The infrared information, IR, is given as the spectral characteristic obtained by combining or multiplying the characteristics of R, B (the cross-hatched range in FIG. 9) and the far infrared cutoff characteristics shown in FIG. 11. More specifically, IR represents the light with wavelengths primarily in the 710 to 850 nm.

The light in each of the wavelength ranges R, G, B and IR is corrected independently, during the shading correction, in sensitivity by using the standard white plate having a uniform reflectance to each wavelength in FIG. 7. In this embodiment, the light is corrected in sensitivity such that the R, G, B and IR reading values are equal to each other to the original having a relatively uniform spectral characteristic as the standard white plate as shown in FIG. 7.

In FIG. 12, (a-2) is a graphical representation of the reading signal values obtained for the infrared absorption pattern and the peripheral portion thereof after the shading correction of the R, G, B and IR.

The specific pattern in this embodiment has substantially same color in the visible region as shown (a) in FIG. 13 and the signal values of the visible R, G, and B become equal accordingly.

The concentration of the infrared absorbing substances contained in the infrared absorbing ink is so adjusted that the infrared reading signal IR 2 obtained from the infrared absorption pattern is smaller than the minimum values of the visible information R2, G2 and B2 for the same infrared absorption pattern. The visible color of the specific original identification pattern consists of colors which are relatively high in saturation. This means that the minimum values of the visible color separation signals R, G and B for the identification pattern become relatively small.

When the infrared absorbing ink does not satisfy the above mentioned conditions, the gain constant used for the shading correction on the above mentioned IR reading signal may be decreased, ensuring that the IR2 signal obtained from the infrared identification pattern to be detected is smaller than the minimum values of R2, G2 and B2.

Described now is a case where the original is read under this reading conditions. An original (b-1) in FIG. 12 has a back on which a carbon black (having the infrared absorption characteristics) 2803 is printed.

The visible reading signals for this original are similar to those obtained in (a-1). The infrared radiation is absorbed by the carbon black 2803 and, as a result, the infrared read value IR3 becomes smaller than the read value IRI obtained from around the carbon black. Thus, the reading signal (b-2) exhibits similar characteristics to the reading signal (a-2) obtained from the infrared absorption pattern b.

In this embodiment, the IR reading signal IR1 obtained from the infrared absorbing ink is smaller than any one of the visible reading signals R1, G1 and B1. On the contrary, the infrared back-through component IR2 obtained from the typical carbon black is not smaller than the minimum values of the visible read values R3, G3 and B3 in most cases. This is because the identification pattern a has the visible colors of high saturation and the minimum values of R2, G2 and B2 are relatively small while the infrared back-through component is not sufficiently absorbed by the carbon black on the back of the original and thus the infrared information has a relatively large value.

By detecting this characteristic, it becomes possible in this embodiment to discriminate the identification pattern printed with the infrared absorbing ink from the back through due to the carbon black.

Described in conjunction with (c-1) and (c-2) in FIG. 12 is a case where the infrared back-through component IR3' is smaller than any one of the visible back-through components R3', G3' and B3'. This corresponds to a case where the carbon black is soaked into the original or where the original itself is a thin paper. The visible colors are different from the peripheral portions, according to which it is possible to discriminate the back-through from the identification mark in the form of the infrared absorption pattern in (a-1). This is because the identification pattern a has, as mentioned above, the visible colors of high saturation; the minimum values of R2, G2 and B2 are relatively small; the identification pattern is so determined that the IR2 is read with its value being smaller than any one of the minimum values of R2, G2 and B2; and the sensitivity is set relative to the color separation reading for R, G, B and IR, so that if the infrared back-through component is smaller than the visible components or R3', G3' and B3' as in (c-1) and (c-2), the back-through also affects on the visible signals.

The R, G, B and IR reading signals obtained from a dirt identification pattern is shown in (d-1) and (d-2) in FIG. 12. A banknote on which a specific pattern is printed is contaminated during circulation in the market for a long time. Such contamination or dirt affects on each of the R, G, B and IR signals as a uniform attenuation factor. Consequently, the infrared reading signal IR2' for the infrared absorbing pattern is smaller in value than the visible information R2', G2' and B2' even when the original is dirt.

FIG. 13 shows the relation between the reading signals of the visible and infrared information for each of the above mentioned case.

Now, described below is a judgment algorithm carried out by the judgment unit 12 of this embodiment.

Let the R, G, B and IR components of the reading signal composing the pixel signal A be $A_R$, $A_G$, $A_B$ and $A_{IR}$, respectively, then average values $Y_R$, $Y_G$, $Y_B$ and $Y_{IR}$ of the reading signals of the corresponding color components R, G, B and IR in each of the pixel signals B, C and D are given as follows:

$$Y_R = \tfrac{1}{4}(A_R + B_R + C_R + D_R),$$

$$Y_G = \tfrac{1}{4}(A_G + B_G + C_G + D_G),$$

$$Y_B = \tfrac{1}{4}(A_B + B_B + C_B + D_B)$$

and $$Y_{IR} = \tfrac{1}{4}(A_{IR} + B_{IR} + C_{IR} + D_{IR}).$$

Judgment of the target pattern is made according to the difference between the notable pixel X and the average value Y obtained from the above equation.

More specifically, let the R, G, B and IR components of X be $X_R$, $X_G$, $X_B$ and $X_{IR}$, then $$\Delta R = |Y_R - X_R|,$$

$$\Delta G = |Y_G - X_G|,$$

$$\Delta B = |Y_B - X_B|,$$

and $$\Delta IR = Y_{IR} - X_{IR}.$$

In this event, the original is judged as the specific pattern when the following equations are satisfied:

$$\Delta R < K$$

and $$\Delta G < K$$

and $$\Delta B < K$$

and $$\Delta(\Delta IR > L1 \text{ or } Y_{IR}/X_{IR} > L2 \text{ and } X_{IR} < \min(X_R, X_G, X_B)),$$

where K, L1 and L2 are constants.

More specifically, the pattern is judged to be present when the difference in color is small (smaller than K) between the notable pixel X and any one of the peripheral portions A, B, C and D in the visible region; when the difference is equal to or larger than the constant L1 in the infrared region; when the ratio of the level of the notable pixel X to that of the periphery is equal to or larger than the constant L2 in the infrared region; and when the signal value of the infrared notable pixel X is smaller than the visible color separation signal of the same notable pixel.

In this event, the ratio is taken into consideration along with the difference in judging the infrared region in view of the reduction of the signal level of the infrared signal due to dirt on the original. In this embodiment, any affects of the dirt is eliminated by means of detecting the ratio, provided that the infrared reading signal is entirely attenuated due to the dirt.

Figure 1:
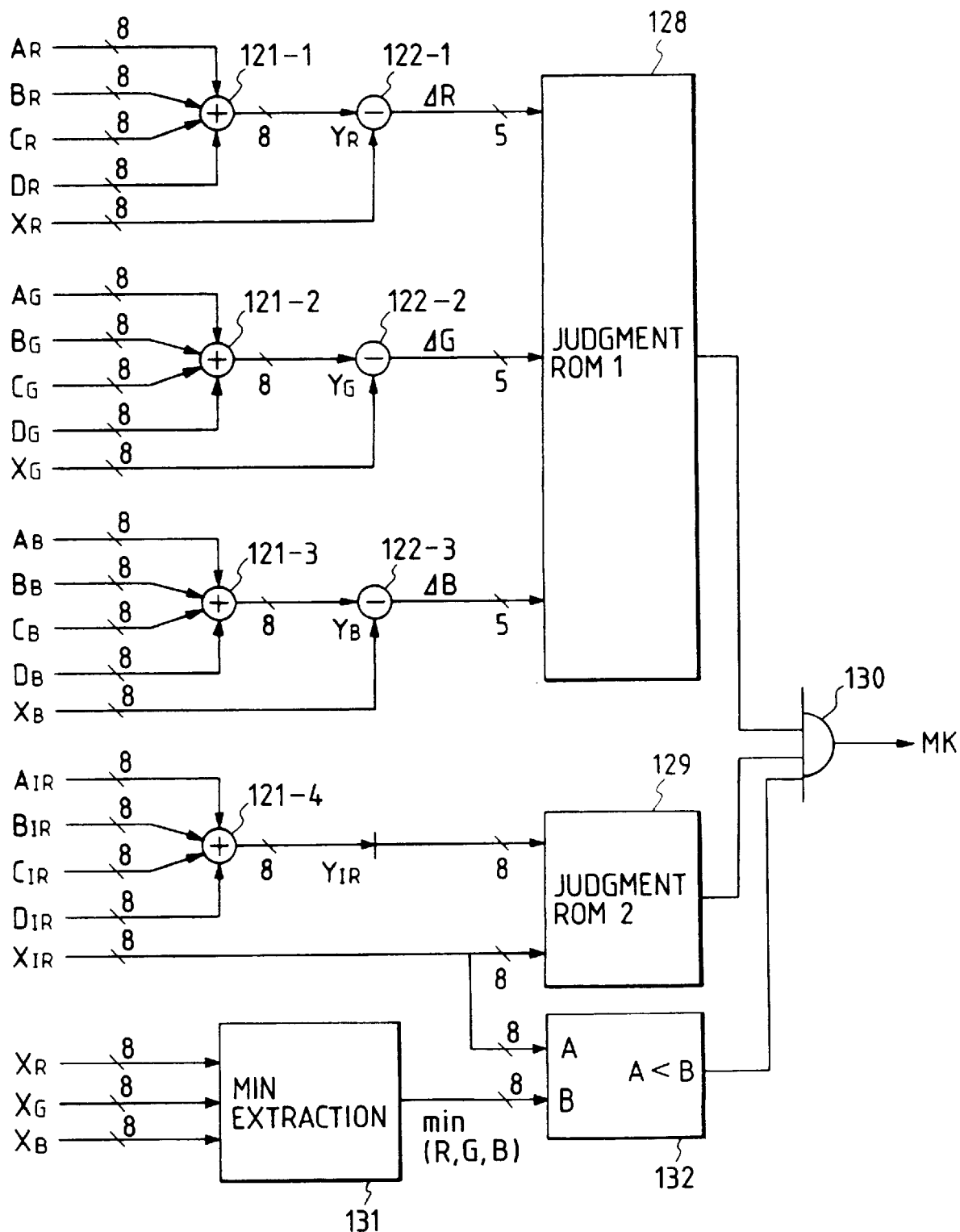
FIG. 1 is a block diagram of a specific pattern judging unit in a first embodiment of the present invention.

FIG. 1 shows the structure of the judgment unit 12 for use in realizing the above mentioned algorithm.

An adder 121 merely adds the color components of four pixels and produces the eight high-order bits of the sum to obtain $Y_R$, $Y_G$, $Y_B$ and $Y_{IR}$. A subtractor 122 calculates a difference between the output of the adder 121 and corresponding component of the notable pixel signal to obtain $\Delta R$, $\Delta G$ and $\Delta B$ components. The subtractor 122 supplies five high-order bits of the subtraction results to a judgment LUT 128 consisting of ROMs. The LUT 128 produces "1" when each of the $\Delta R$, $\Delta G$ and $\Delta B$ components is smaller than a constant K (in this embodiment, the constant K is set at eight levels). Likewise, for the infrared reading signal, $Y_{IR}$ and $X_{IR}$ of eight bits each are supplied to address terminals of a judgment LUT 129 consisting of ROMs. The LUT 129 produces "1" when the above mentioned judgment result holds, that is, $\Delta IR > L1$ or $Y_{IR}/X_{IR} > L2$ holds as well as $\Delta IR = Y_{IR} - X_{IR}$.

Simultaneously, a min extraction unit 131 extracts the minimum value min (R, G, B) of the R, G, and B color separation signals $X_R$, $X_G$ and $X_B$, respectively for the notable pixel. A comparator 132 compares the min (R, G, B) with the infrared reading signal for the notable pixel. The comparator 132 produces "1" when $Y_{IR} < \min(R, G, B)$ holds. The outputs of the LUTs and the comparator are supplied to an AND gate 130 to obtain a logical product thereof. The AND gate 130 produces an output signal MK. The output signal MK indicating "1" corresponds to the condition where presence of the specific pattern is detected.

Figure 14B:
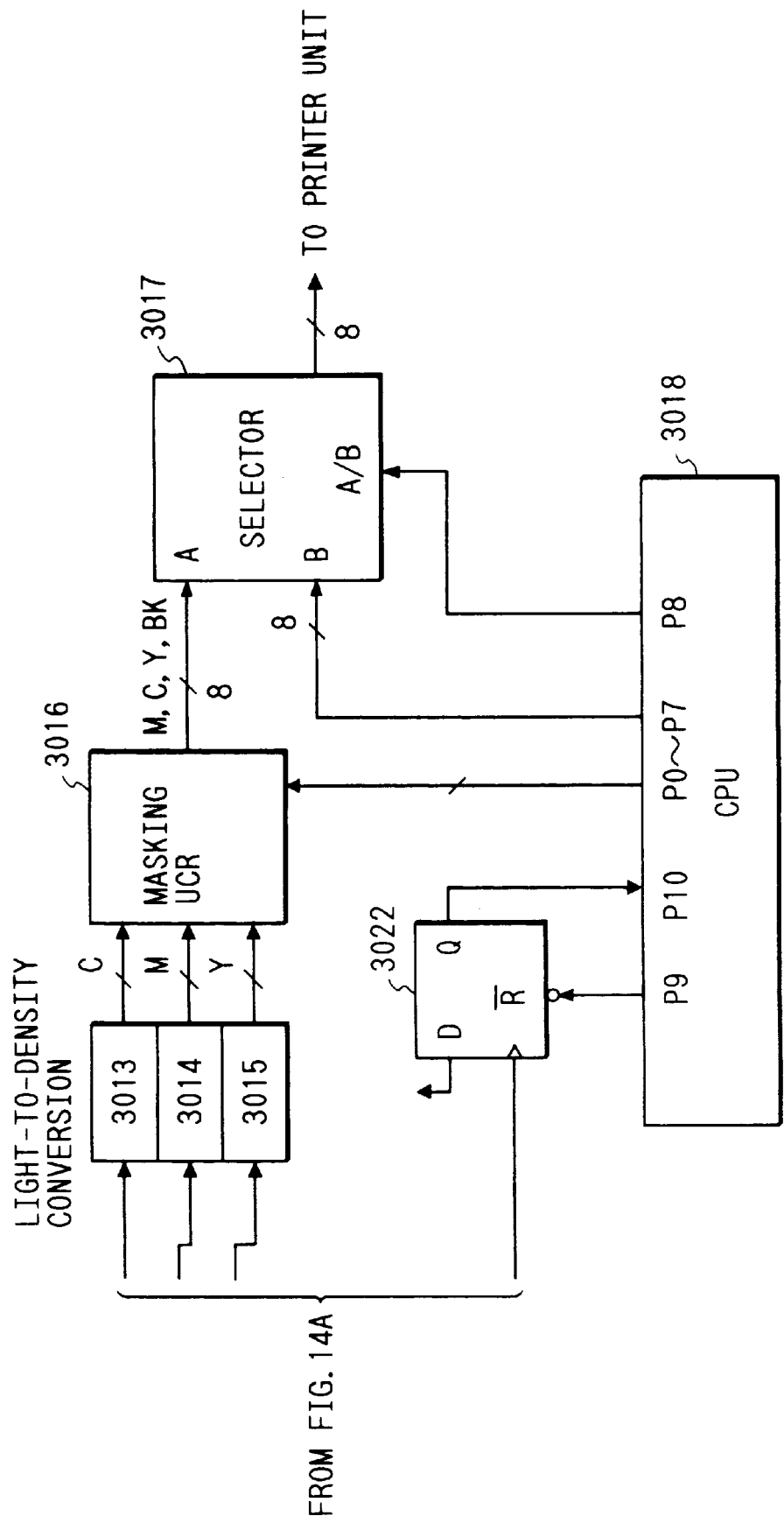
FIG. 14 is comprised of FIGS. 14A and 14B showing a block diagram showing an image signal controlling unit.

The judgment result is supplied to a latch 3022 in FIGS. 14A and 14B. An output of the latch 3022 is supplied to an input port P10 of the CPU 3018. The CPU 3018 confirms that the specific mark is detected. The CPU 3018 clears the latch 3022 by an output port P9 signal before initiation of a copy sequence. The CPU 3018 is thus ready for the subsequent pattern detection.

Figure 16:
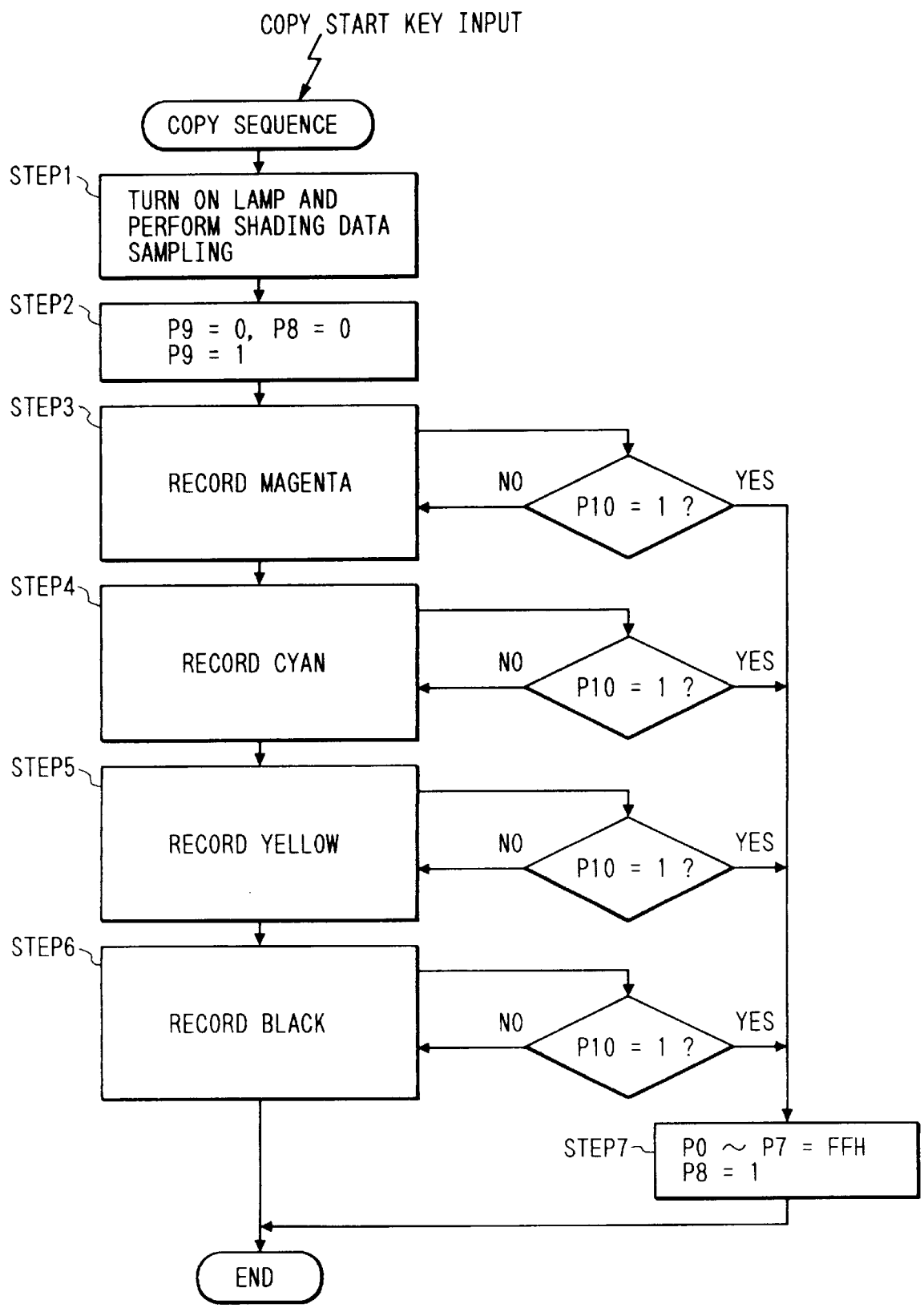
FIG. 16 is a control flow carried out by a CPU.

Referring to FIG. 16, description will be made in conjunction with a normal copying operation and an identification mark judging operation accompanying thereto carried out under control by the CPU 3018.

When an operator put the original 204 on the platen 203 and initiates the copying operation through an operation unit (not shown), the CPU 3018 controls a motor (not shown) to move the reflection mirror 206 beneath the standard white plate 211. The halogen lamp 205 is turned on to illuminate the standard white plate 211. The shading correction units 3006 through 3009 sample the shading data for the IR, R, G and B signals (Step 1).

Subsequently, the port output P is set into "0" to clear the output of the latch 3022 into "0" and, in turn, clear the P8 output into "0". The input A of the selector 3017 is selected such that the image signals masked and subjected to the undercolor removal (UCR) are supplied to the printer. The output P9 is set to "1" to stop the clear operation of the latch 3022 (Step 2).

Next, the scanning operation is repeated four times as the printer unit 200 records four colors of M, C, Y and BK to complete one copy of the original. At the same time, presence of the identification mark is detected and the recording operation is controlled in accordance with the detection result.

The CPU 3018 sets, for recording magenta, processing conditions for magenta into the masking UCR processing unit 3016. Subsequently, the CPU operates the optical system to supply a signal indicating magenta to the printer 200. After completion of the scanning operation, the optical system is turned back to an initial position of scanning (Step 3).

The CPU periodically reads the input signal supplied to the port 10 during the scanning operation to determine whether the input signal indicates "1". If the P10 is "1", outputs of P0 through P7 are set into FFH at step 7 based on the decision that the predetermined original is to be copied. In addition, an output of P8 is set into "1" to supply the printer 200 a set-solid signal of FFH, whereby prohibiting further copying operation to avoid counterfeit of the specific original.

Likewise, the recording control is also made for cyan, yellow and black through steps 4 to 6, during which the CPU periodically checks the P10. If the P10 is "1" the CPU supplies the set-solid FFH data to the printer 200 at step 7.

For example, when P10=1 is detected during cyan recording, only magenta is recorded through a normal or proper copying operation. The remainders, cyan, yellow and black are recorded as solid of FFH.

A way for prohibiting a normal copying operation may be, other than a set-solid, a batching processing, interruption of image forming means, turning off the power or the like.

<Second Embodiment>

Typical infrared absorbing inks are slightly colored in the visible region and sufficient level of the infrared absorbing characteristic may be achieved causing a difference in color between the infrared absorbing and non absorbing portions in the visible region. With such the infrared absorbing ink, it is difficult to lower the signal level of the infrared reading signal than the color separation signal in the visible region, though it is achieved in the first embodiment. This embodiment is directed to avoid incorrect or erroneous identification of the back-through on a normal original by means of using the visible information to a mark printed with the ink of the type described.

The infrared absorbing mark to be detected in the second embodiment is so formed that the infrared reading signal value is lower than the luminosity level obtained by the values of the visible color separation signals of R, G and B.

In addition, as in the first embodiment, the infrared reading signal is compared with luminosity signals generated from the visible color separation signals, thereby determining whether the read pixel is associated with a predetermined mark.

Now, described below is a judgment algorithm carried out by the judgment unit 12 of this embodiment.

In this embodiment, a luminosity signal L is obtained from the visible color separation signals of R, G and B according to the following equation:

$$L=(R+2G+B)/4.$$

Let the R, G, B and IR components of the reading signal composing the pixel signal A be $A_R$, $A_G$, $A_B$ and $A_{IR}$, respectively, then average values $Y_R$, $Y_G$, $Y_B$ and $Y_{IR}$ of the reading signals of the corresponding color components R, G, B and IR in each of the pixel signals B, C and D are given as follows:

$$Y_R=\frac{1}{4}(A_R+B_R+C_R+D_R),$$

$$Y_G=\frac{1}{4}(A_G+B_G+C_G+D_G),$$

$$Y_B=\frac{1}{4}(A_B+B_B+C_B+D_B),$$

and $$Y_{IR}=\frac{1}{4}(A_{IR}+B_{IR}+C_{IR}+D_{IR}).$$

Judgment of the target pattern is made according to the difference between the notable pixel X and the average value Y obtained from the above equation.

More specifically, let the R, G, B and IR components of X be $X_R$, $X_G$, $X_B$ and $X_{IR}$, then $$\Delta R=|Y_R-X_R|,$$

$$\Delta G=|Y_G-X_G|,$$

$$\Delta B=|Y_B-X_B|,$$

$$\Delta IR=Y_{IR}-X_{IR},$$

and $$XL=(X_R+2X_G+X_B)/4.$$

In this event, the original is judged as the specific pattern when the following equations are satisfied:

$$\Delta R<K$$

and $$\Delta G<K$$

and $$\Delta B<K$$

and $$\Delta(\Delta IR>L1 \text{ or } Y_{IR}/X_{IR}>L2 \text{ and } X_{IR}<XL,$$

where K, L1 and L2 are constants.

More specifically, the pattern is judged to be present when the difference in color is small (smaller than K) between the notable pixel X and any one of the peripheral portions A, B, C and D in the visible region; when the difference is equal to or larger than the constant L1 in the infrared region; when the ratio of the level of the notable pixel X to that of the periphery is equal to or larger than the constant L2 in the infrared region; and when the signal value of the infrared notable pixel X is smaller than the visible color separation signal of the same notable pixel.

Figure 17:
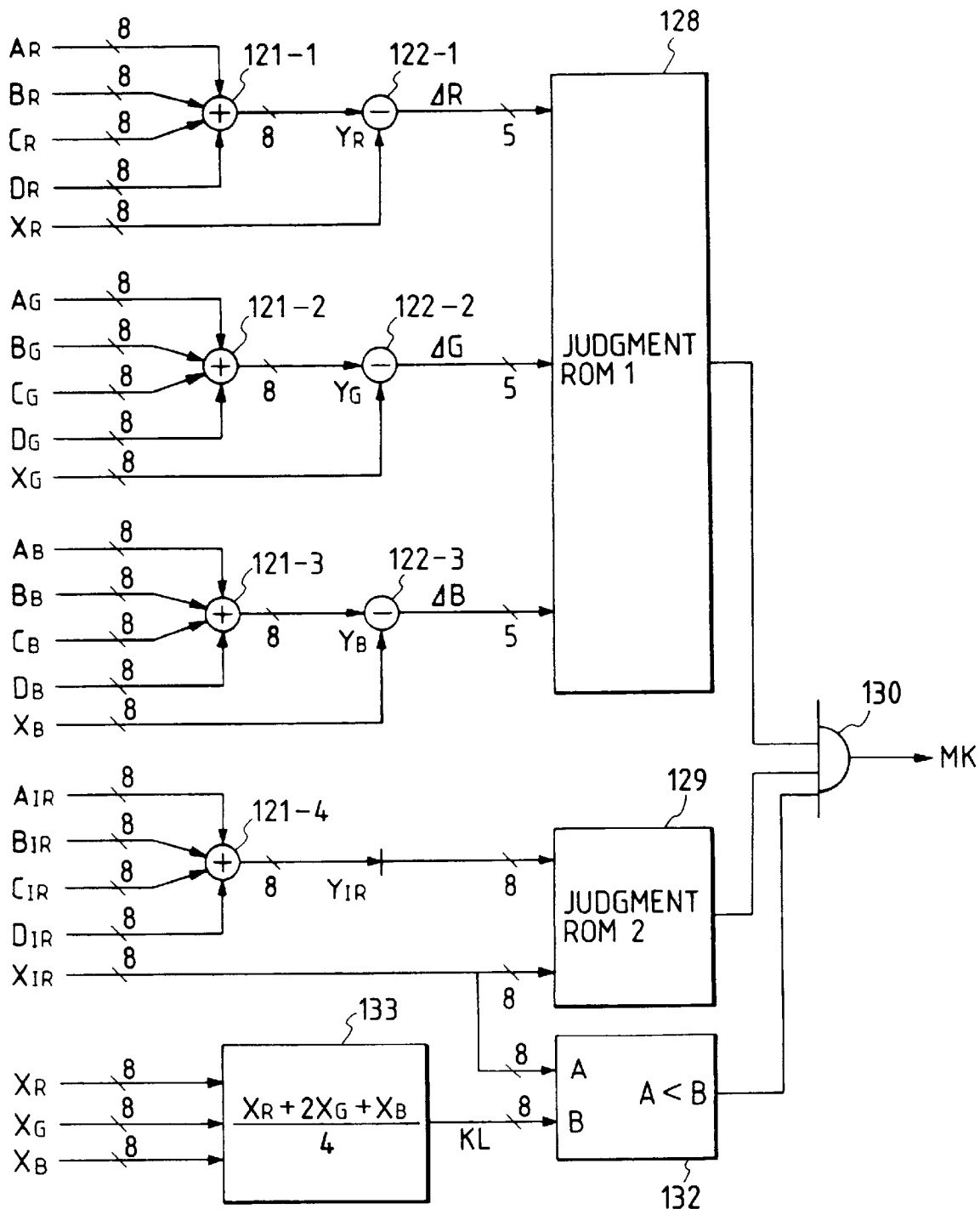
FIG. 17 is a block diagram of a specific pattern judging unit in a second embodiment of the present invention.

FIG. 17 shows the structure of the judgment unit 12 for use in realizing the above mentioned algorithm.

The adder 121 merely adds the color components of four pixels and produces the eight high-order bits of the sum to obtain $Y_R$, $Y_G$, $Y_B$ and $Y_{IR}$. The subtractor 122 calculates a difference between the output of the adder 121 and corresponding component of the notable pixel signal to obtain $\Delta R$, $\Delta G$ and $\Delta B$ components. The subtractor 122 supplies five high-order bits of the subtraction results to the judgment LUT 128 consisting of ROMs. The LUT 128 produces "1" when each of the $\Delta R$, $\Delta G$ and $\Delta B$ components is smaller than a constant K (in this embodiment, the constant K is set at eight levels). Likewise, for the infrared reading signal, $Y_{IR}$ and $X_{IR}$ of eight bits each are supplied to address terminals of the judgment LUT 129 consisting of ROMs. The LUT 129 produces "1" when the above mentioned judgment result holds, that is, $\Delta IR>L1$ or $Y_{IR}/X_{IR}>L2$ holds as well as $\Delta IR=Y_{IR}-X_{IR}$.

Simultaneously, an AND calculation unit 131 extracts a luminosity signal KL of the R, G, and B color separation signals $X_R$, $X_G$ and $X_B$, respectively for the notable pixel. The comparator 132 compares the luminosity signal KL with the infrared reading signal for the notable pixel. The comparator 132 produces "1" when $Y_{IR}<KL$ holds. The outputs of the LUTs and the comparator are supplied to the AND gate 130 to obtain a logical product thereof. The AND gate 130 produces an output signal MK. The output signal MK indicating "1" corresponds to the condition where presence of the specific pattern is detected.

The result of judgment is processed by the CPU 3018 in the same manner as in the first embodiment. The similar processing to that in the first embodiment is performed for detection a specific original and avoiding counterfeit of it.

<Third Embodiment>

In this embodiment, to further improve the accuracy of detection on the specific mark, the signal level of the infrared reading signal at the infrared reflecting portion around the infrared absorbing ink portion of the mark is higher than the maximum value of the visible color separation signals.

More particularly, possibility of the incorrect judgment of the back-through on the normal original is reduced by means of setting the infrared reading signal value at the infrared absorption portion is smaller than the minimum values of the visible color separation values. In addition, the infrared reading signal value at the infrared reflecting portion is larger than the maximum values of the visible color separation values. As a result, a feature less found in a normal original can be provided.

In addition, as in the first embodiment, the infrared reading signal is compared with luminosity signals generated from the visible color separation signals, thereby determining whether the read pixel is associated with a predetermined mark.

Now, described below is a judgment algorithm carried out by the judgment unit 12 of this embodiment.

Let the R, G, B and IR components of the reading signal composing the pixel signal A be $A_R$, $A_G$, $A_B$ and $A_{IR}$, respectively, then average values $Y_R$, $Y_G$, $Y_B$ and $Y_{IR}$ of the reading signals of the corresponding color components R, G, B and IR in each of the pixel signals B, C and D are given as follows:

$$Y_R = \frac{1}{4}(A_R + B_R + C_R + D_R),$$

$$Y_G = \frac{1}{4}(A_G + B_G + C_G + D_G),$$

$$Y_B = \frac{1}{4}(A_B + B_B + C_B + D_B),$$

and $$Y_{IR} = \frac{1}{4}(A_{IR} + B_{IR} + C_{IR} + D_{IR}).$$

Judgment of the target pattern is made according to the difference between the notable pixel X and the average value Y obtained from the above equation.

More specifically, let the R, G, B and IR components of X be $X_R$, $X_G$, $X_B$ and $X_{IR}$, then $$\Delta R = |Y_R - X_R|,$$

$$\Delta G = |Y_G - X_G|,$$

$$\Delta B = |Y_B - X_B|,$$

$$\Delta IR = |Y_{IR} - X_{IR}|,$$

and $$XL = (X_R + 2X_G + X_B)/4.$$

In this event, the original is judged as the specific pattern when the following equations are satisfied:

$$\Delta R < K$$

and $$\Delta G < K$$

and $$\Delta B < K$$

and $$\Delta(\Delta IR > L1 \text{ or } Y_{IR}/X_{IR} > L2$$

and $$X_{IR} < \min(X_R, X_G, X_B)$$

and $$Y_{IR} < \min(Y_R, Y_G, Y_B)$$

where K, L1 and L2 are constants.

More specifically, the pattern is judged to be present when the difference in color is small (smaller than K) between the notable pixel X and any one of the peripheral portions A, B, C and D in the visible region; when the difference is equal to or larger than the constant L1 in the infrared region; when the ratio of the level of the notable pixel X to that of the periphery is equal to or larger than the constant L2 in the infrared region; when the signal value of the infrared notable pixel X is smaller than the visible color separation signal of the same notable pixel; and when the average value of the infrared signal values of the peripheral pixels is larger than the maximum value of the average values of the visible color separation signals.

Figure 18:
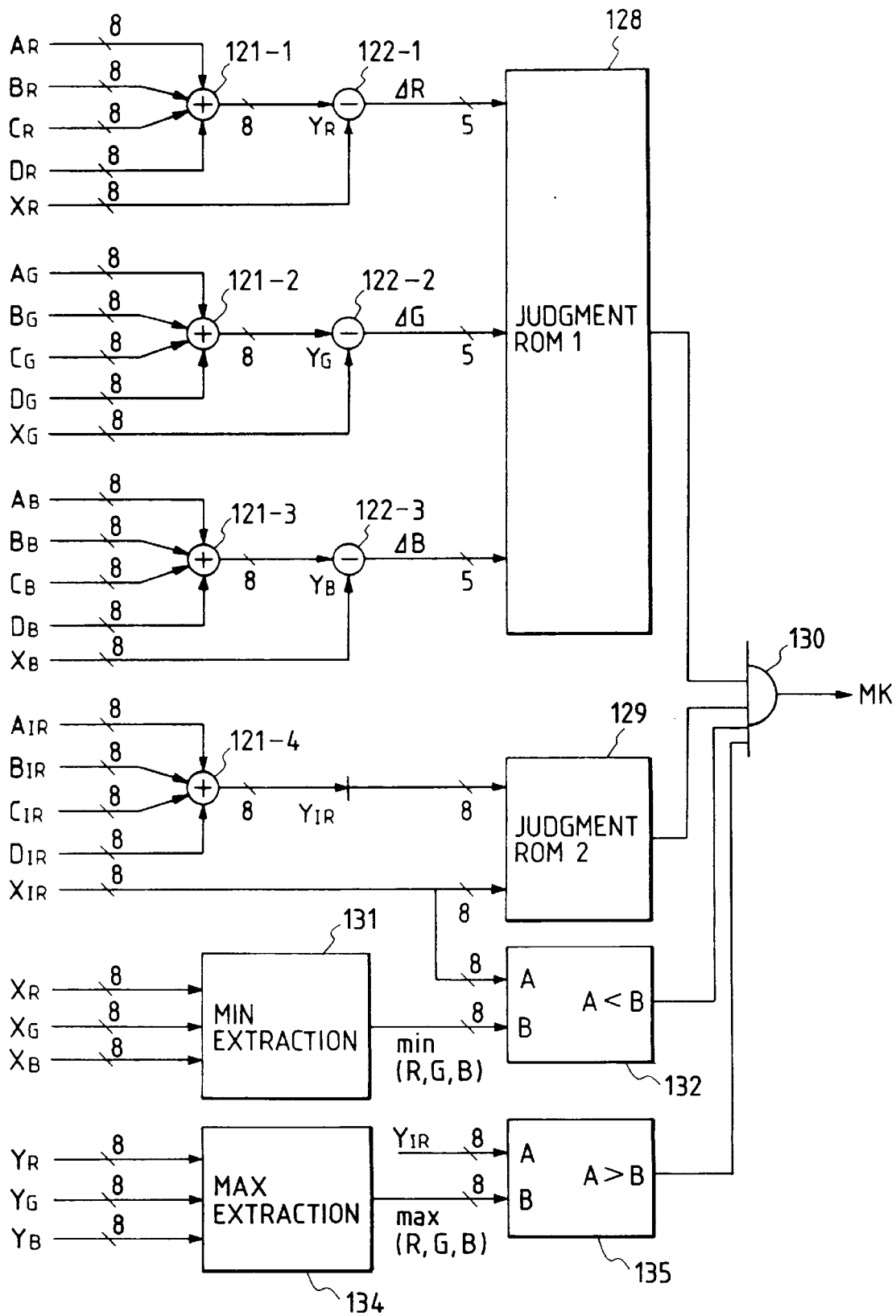
FIG. 18 is a block diagram of a specific pattern judging unit in a third embodiment of the present invention.

FIG. 18 shows the structure of the judgment unit 12 for use in realizing the above mentioned algorithm.

The adder 121 merely adds the color components of four pixels and produces the eight high-order bits of the sum to obtain $Y_R$, $Y_G$, $Y_B$ and $Y_{IR}$. The subtractor 122 calculates a difference between the output of the adder 121 and corresponding component of the notable pixel signal to obtain $\Delta R$, $\Delta G$ and $\Delta B$ components. The subtractor 122 supplies five high-order bits of the subtraction results to the judgment LUT 128 consisting of ROMs. The LUT 128 produces "1" when each of the $\Delta R$, $\Delta G$ and $\Delta B$ components is smaller than a constant K (in this embodiment, the constant K is set at eight levels). Likewise, for the infrared reading signal, $Y_{IR}$ and $X_{IR}$ of eight bits each are supplied to address terminals of the judgment LUT 129 consisting of ROMs. The LUT 129 produces "1" when the above mentioned judgment result holds, that is, $\Delta IR > L1$ or $Y_{IR}/X_{IR} > L2$ holds as well as $\Delta IR = Y_{IR} - X_{IR}$.

Simultaneously, the min extraction unit 131 extracts the minimum value min (R, G, B) of the R, G, and B color separation signals $X_R$, $X_G$ and $X_B$, respectively for the notable pixel. The comparator 132 compares the min (R, G, B) with the infrared reading signal for the notable pixel. The comparator 132 produces "1" when $Y_{IR} < \min$ (R, G, B) holds. The outputs of the LUTs and the comparator are supplied to an AND gate 130 to obtain a logical product thereof. The AND gate 130 produces an output signal MK. The output signal MK indicating "1" corresponds to the condition where presence of the specific pattern is detected.

Simultaneously, a Max extraction unit 134 extracts the maximum value max (R, G, B) of the R, G, and B color separation signals $Y_R$, $Y_G$ and $Y_B$, respectively for the notable pixel. A comparator 135 compares the max (R, G, B) with the average value of the infrared reading signals for the peripheral pixel. The comparator 135 produces "1" when $Y_{IR} > \max$ (R, G, B) holds. The outputs of the LUTs and the comparator are supplied to the AND gate 130 to obtain a logical product thereof. The AND gate 130 produces an output signal MK. The output signal MK indicating "1" corresponds to the condition where presence of the specific pattern is detected.

The result of judgment is processed by the CPU 3018 in the same manner as in the first embodiment. The similar processing to that in the first embodiment is performed for detection a specific original and avoiding counterfeit of it.

<Modifications>

While the above embodiments 1 through 3 have thus been described in conjunction with detection of a specific mark, the present invention is also applicable to detection of a mark having an infrared reflecting characteristic provided on a base having an infrared absorbing characteristic.

In addition, the present invention is not limited to discrimination of a particular infrared mark. It can also be applied to detect a mark having an absorbing or reflecting characteristic to the ultraviolet radiation.

Further, a mark having a fluorescent characteristic to other wavelength regions other than the visible region may also used instead of using the one having the absorbing or reflecting characteristic. In such a case, the invisible reading signal may be compared with the visible reading signal.

As mentioned above, according to the embodiments 1 through 3 of the present invention, it is possible to detect the mark in a higher accuracy by means of comparing, upon detecting a specific mark using invisible information, the signal level of the reading signal thereof with the signal level of the visible reading signal. In addition, is possible to reduce significantly the incorrect or erroneous judgment to the normal original.

<Fourth Embodiment>

Figure 19:
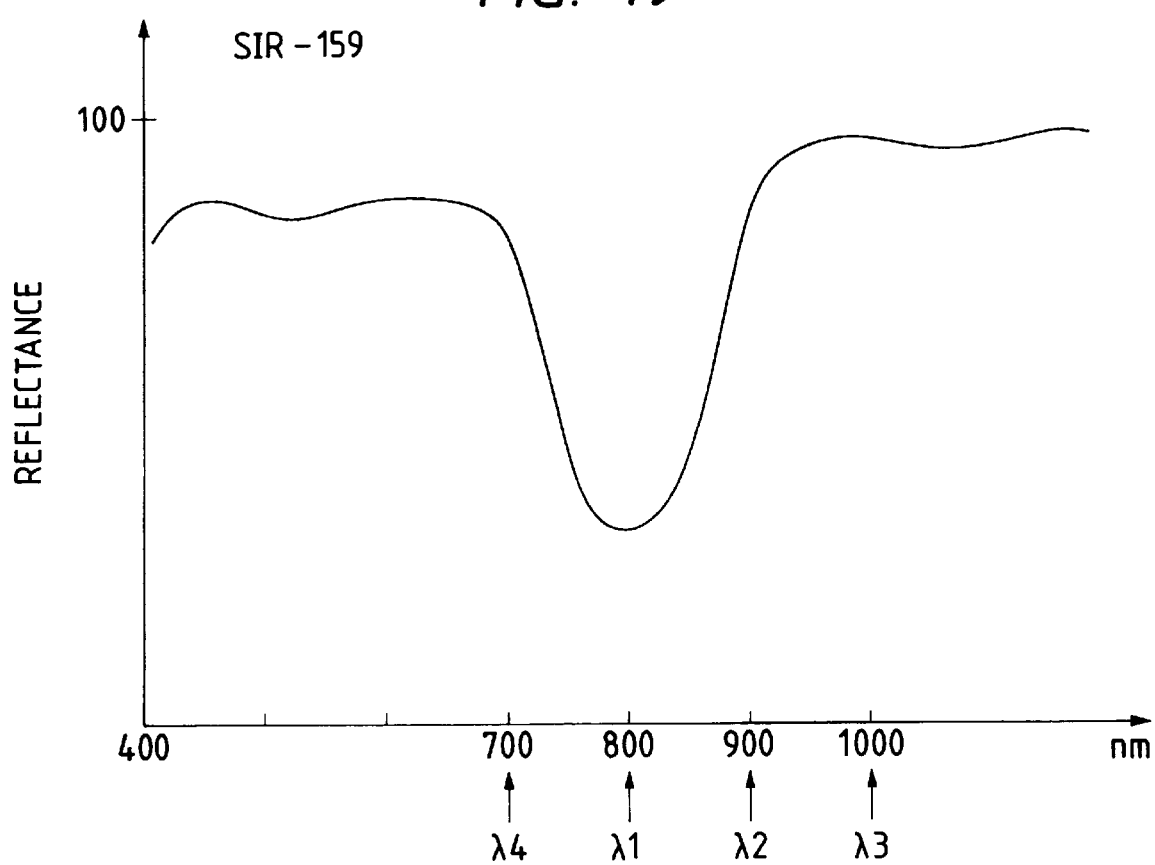
FIG. 19 shows reflectance of a transparent ink used in the embodiment of the present invention.

It is known that typical printing inks are reflective to the light of the infrared region. However, some color materials exhibit significant absorbing characteristic in the infrared region though appeared transparent in the visible region. An example of such color material is SIR-159 available from Mitsui Toatsu Chemicals Inc., of which spectrum response is shown in FIG. 19. It is a challenge to use such a color material for the security purpose that is transparent in the visible region while is absorbent or reflective in the infrared region. The visible effect of it depends on refraction of light, back reflection and the color reflected light radiation from the substance.

Figure 20:
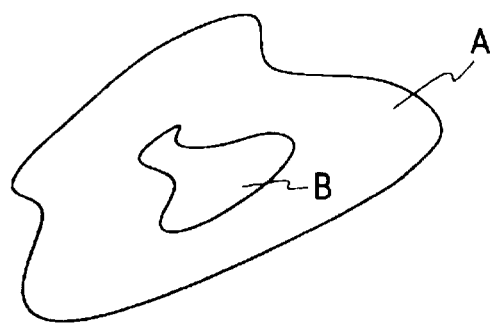
FIG. 20 is a view showing a pattern printed with the transparent ink used in the embodiment of the present invention.

More particularly, in a pattern shown in FIG. 20, areas A and B appear same color (visible) in the visible region while invisible pattern recognition can be made when infrared absorbance is detected in the area B. For example, the area A may be a ground color (nothing is printed thereon) of the valuable securities of the like and the area B may be printed with the transparent ink having the spectrum response shown in FIG. 19, thereby allowing the areas A and B to be used as a common pattern for all valuable securities.

However, considering by the wavelength characteristic shown in FIG. 19, it is impossible to extract or detect a particular one waveform to discriminate it from the infrared absorption of the specific pattern. This is because some color materials such as carbon black commonly used are absorbent to the light with relatively wide range including the wavelengths absorbed by the above mentioned transparent ink. As a result, determination of the absorbing characteristic on a single wavelength is not sufficient for positively discriminate the transparent ink from the carbon black.

With respect to this, the present invention overcomes the above mentioned problem by the following.

Figure 21:
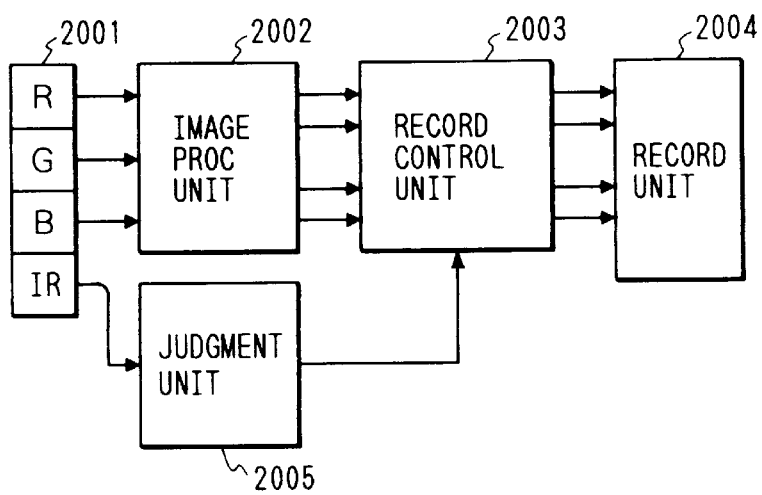
FIG. 21 is a block diagram showing an entire structure according to the embodiment of the present invention.

The fourth embodiment of the present invention is now described with reference to a block diagram shown in FIG. 21. FIG. 21 is a structural block diagram of a color copying machine. An image reading sensor 2001 consists of sensor cells provided with red (R), green (G) and blue (B) color separation filters, respectively, and a sensor cell provided with an infrared filter. The color separation filters are for reading the corresponding visible information from the original while the infrared filter is for reading the specific pattern as infrared information. The output of the IR cell is supplied to a judgment unit 2005, a feature of the present invention, to determine whether the original is the valuable securities. On the other hand, RGB visible image information is converted into a record signal by a general color image processing unit 2002. The record signal is composed of cyan (C), magenta (M), yellow (Y) and black (BL) and is supplied to a record control unit 2003. The record control unit 2003 controls the image processing when the judgment unit 2005 judges that the original is the specific one such as the valuable securities. In this event, the record control unit 2003 controls the image processing by means of, for example, pasting black ink on the entire area under processing or ceasing the recording operation.

Figure 22:
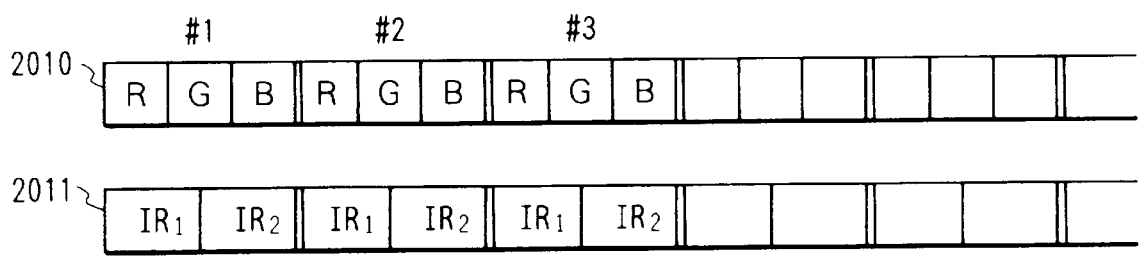
FIG. 22 is a view showing sensor structures according to the embodiment of the present invention.

The image reading sensor 2001 is composed of two cell groups as shown in FIG. 22. A line 2010 is formed of filters of R, G and B alternatively arranged with each other to produce serial visible information.

On the other hand, a line 2011 produces an infrared component obtained by means of dividing a single pixel into two different wavelength components $IR_1$ and $IR_2$. More specifically, the $IR_1$ component is centered on $\lambda 1=800$ nm at which the absorbing characteristic of the ink arrives peak while the $IR_2$ component is centered on $\lambda 2=900$ nm at which the reflecting characteristic is exhibited again.

One of the features of the present invention is to detect the infrared characteristic according to at least two wavelength components to specify the infrared characteristic of the ink to be discriminated.

To determine the infrared absorption only on the basis of $IR_1$ does not make it possible to discriminate the infrared ink from the carbon black or the like. In this event, detection of the infrared reflection at $IR_2$ assures the presence of the transparent ink for avoiding counterfeit.

In other words, the original is judged as the specific one, the valuable securities in this embodiment, when $$IR_1 < K_1 \text{ and } IR_2/IR_1 > K_2$$

is satisfied.

In this event, the ration or $IR_2/IR_1$ is used as a criteria for judgment in view of the entire reduction of the reflectance due to dirt or the like.

Figure 23:
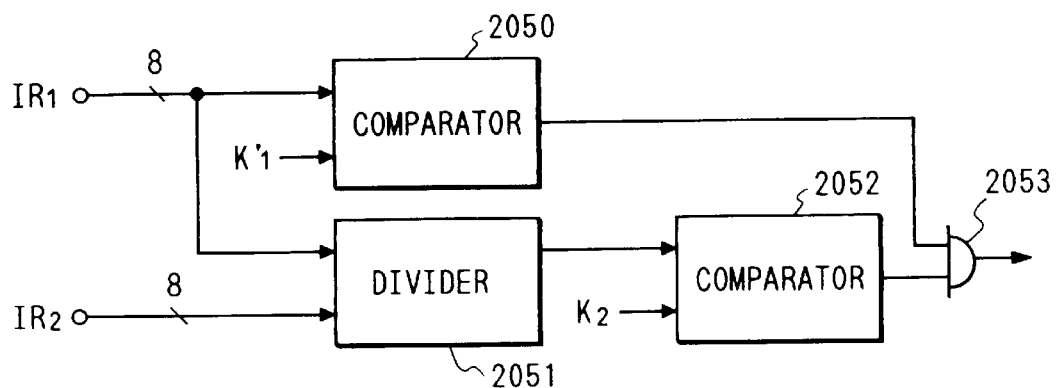
FIG. 23 is a block diagram showing an exemplified structure of a judgment unit 2005 according to the embodiment of the present invention.

FIG. 23 shows an exemplified structure of the judgment unit 2005 applied to the present invention. A comparator 2050 compares a predetermined constant $K_1$ with an output $IR_1$ of the IR sensor at the wavelength of 800 nm. The comparator 2050 supplies "1" to an AND circuit 2053 when the reflected light is smaller in amount than the constant $K_1$, i.e., when the ink absorbs the light. A divider 2051 calculates a ratio of $IR_2/IR_1$. A comparator 2052 compares the ratio with a constant $K_2$ ($K_2>1$) and supplies "1" to the AND circuit 2053 when the ratio is equal to or larger than $K_2$.

The output of the AND circuit is the final result of judgment and the logical value "1" of the output indicates that the ink characteristic shown in FIG. 19 is detected.

<Fifth Embodiment>

To further positively detect the infrared characteristic of the ink, an spectral output $IR_3$ may be obtained at, for example, $\lambda 3=1000$ nm. In this event, the specific pattern of the transparent ink is judged to be present when a condition ($K_3>1$ $K_3>K_2$) in $$IR_1 < K_1 \text{ and } IR_2/IR_1 > K_2 \text{ and } IR_3/IR_1 > K_3$$

is satisfied.

<Sixth Embodiment>

In this embodiment, $\lambda 4=700$, $\lambda 1=800$ and $\lambda 2=900$ are defined to detect the specific pattern in a higher accuracy. Besides, each output value is subjected to so-called masking processing with the respective values to correct profiles of filters for detecting $IR_4$, $IR_1$ and $IR_2$.

$$IR'_4 = a_{11}IR_4 + a_{12}IR_1 + a_{13}IR_2,$$

$$IR'_1 = a_{21}IR_4 + a_{22}IR_1 + a_{23}IR_2,$$

and $$IR'_2 = a_{31}IR_4 + a_{32}IR_1 + a_{33}IR_2,$$

where $a_{11}$ through $a_{33}$ are coefficients. In addition, $IR'_4$ and $IR'_2$ are normalized with $IR'_1$, then $$I\tilde{R}_4 = \frac{IR'_4}{IR'_1}$$

$$I\tilde{R}_2 = \frac{IR'_2}{IR'_1},$$

when $1_1 < I\tilde{R}_4 < 1_2$ and $1_3 < I\tilde{R}_2 < 1_4$ it is judged that the specific pattern is present.

Figure 24:
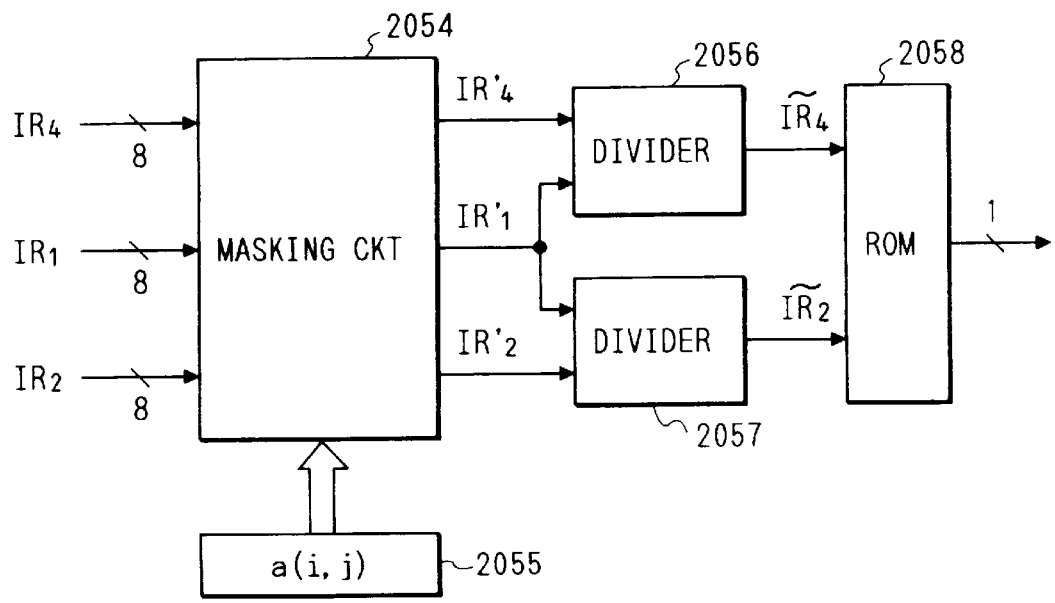
FIG. 24 is a block diagram showing another exemplified structure of the judgment unit 2005 according to the embodiment of the present invention.

FIG. 24 shows an exemplified structure for use in carrying out the above mentioned judgment algorithm. A masking circuit 2054 composed of a multiplier and an adder supplies the sensor output divided through the filters into three spectra with central wavelengths of 700 nm, 800 nm and 900 nm, respectively. The masking circuit 2054 carries out the above mentioned correction calculation using data supplied from a coefficient memory 2055.

$IR'_4$ and $IR'_2$ are normalized with $IR'_1$ by dividers 2056 and 2057, respectively, to provide an output given by the following equation:

$$I\tilde{R}_4 \text{ and } I\tilde{R}_2,$$

which are supplied to a judgment ROM 2058. The ROM 2058 is so-called LUT (look-up table) where judgment results are written previously according to $1_1$ through $1_4$ in the above equation.

By normalizing with $IR'_1$, it becomes possible to determine the infrared absorbing characteristic without being affected by dirt or contamination.

<Modification>

While this embodiment has thus been described in conjunction with judgment as one point for every one pixel, the input infrared image data may be calculated as an average of a plurality of pixel values. Alternatively, the final judgment may be made in response to completion of accumulation of a predetermined number of the judgment results.

According to the above mentioned embodiments 3 through 6, (1) it is possible to judge the original without requiring any focus relative to the infrared region because the judgment is not based on a pattern matching;

(2) a cost saving apparatus can be achieved with less cycle of calculation;

(3) the sensor cells are not necessarily assigned to the same pixel at IR, $IR_2$ and $IR_3$ because no pattern matching is used. Consequently, it is not required to correct shift or displacement of reading position of the sensor, allowing cost saving design of the apparatus. In addition, it is not necessary to consider a relation between the pattern size and the resolution of the sensor(s) used.

<Seventh Embodiment>

Figure 25:
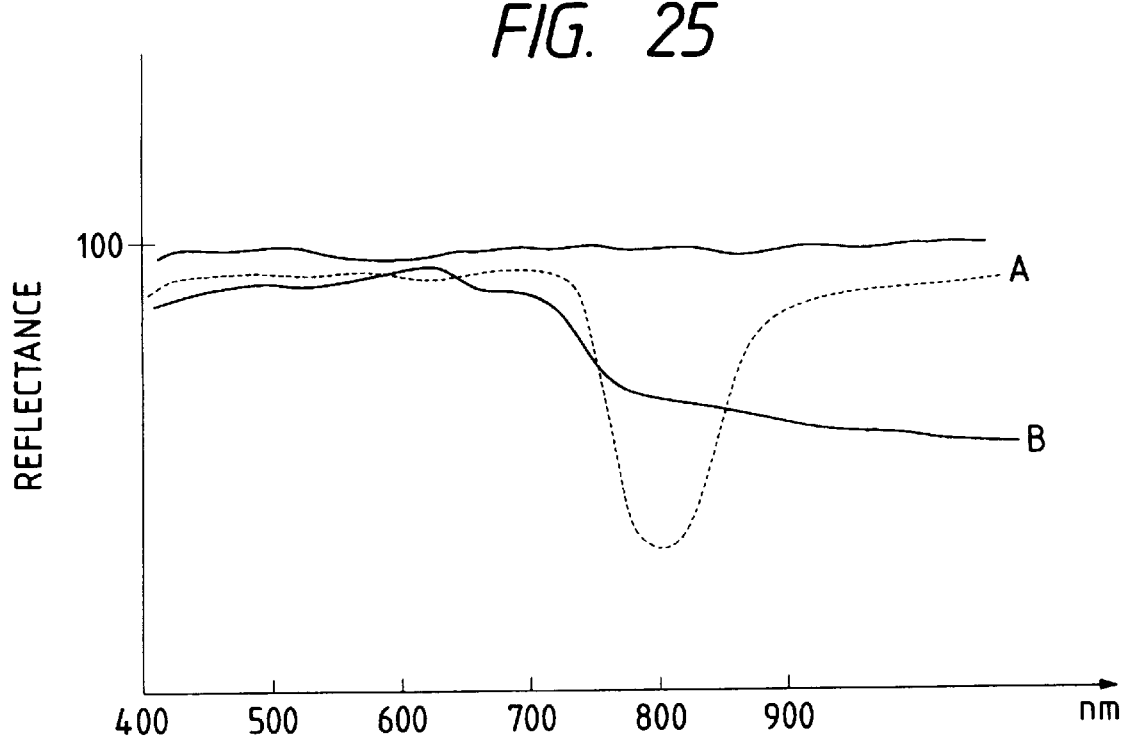
FIG. 25 shows reflectance of an ink used in the embodiment of the present invention.

FIG. 25 shows the reflectance of the ink with being printed on a paper that is to be detected in this embodiment. The ink appears transparent in the visible region while has the infrared absorbing characteristic in the infrared region. For example, the characteristic curve A is for the ink representative of SIR-159 (sold by Mitsui Toatsu Chemicals Inc.) which exhibits sufficient absorbing characteristic at and around 800 nm. An ink B of the similar kind is less absorbent to the infrared radiation, so that the ink A can be discriminated from the ink B by means of detecting the reflected light at and around 800 nm.

FIG. 26 illustrates an example where the inks A and B are printed concentrically on a paper. It will be invisible at all when being printed at about 1 mm in diameter on a portion of a common valuable securities where no other print is made. It is noted that typical papers reflect the light with this wavelength entirety (about 100%), so that the difference in the reflectance between the inks A and B can readily be detected.

In FIG. 26, (a-1), (b-1) and (c-1) show examples where the infrared absorbing inks A and B are concentrically printed on the paper of ground color having a 100% reflectance. The patterns are read as the change of one-dimensional reflectance of being illustrated in (a-2), (b-2) and (c-2), respectively, when the scan line, passing through the center of the pattern as depicted by an arrow, is read.

The apparatus according to this embodiment is similar in structure to those illustrated in FIG. 21, so that further detailed description will be omitted.

Figure 27:
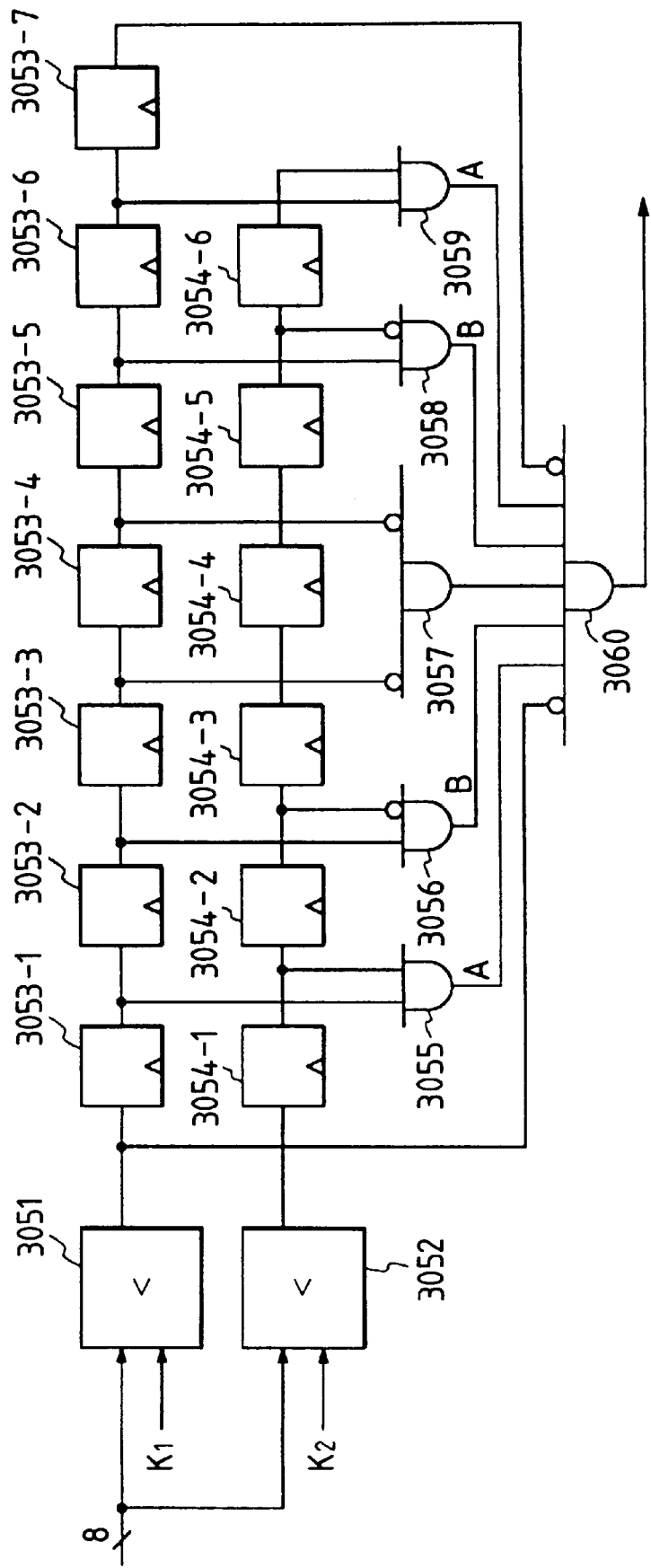
FIG. 27 is a block diagram showing a structure of the judgment unit 2005 according to the embodiment of the present invention.

An embodiment of the judgment unit 2005 is described using (b-1) in FIG. 26 as an example. In FIG. 27, a sensor signal is quantized and coded into an 8-bit infrared reading signal. This reading signal is supplied to comparators 3051 and 3052 where it is digitized with constants K1 and K2 (K2<K1) as thresholds, that is:

when IR>K1, the read portion corresponds to the ground color, when K2≦IR 23 K1, the read portion corresponds to the ink B, and when IR<K2, the read portion corresponds to the ink A.

When the output of the comparator 3051 is "0", the read portion corresponds to the ground color. When the output of the comparator 3051 is "1" while that of the comparator 3052 is "0", the read portion corresponds to the ink B. When the outputs of the comparators 3051 and 3052 are "1", the read portion corresponds to the ink A. The output signals of the comparators are delayed by one pixel by flip-flops (FFs) 3053-1 through 3053-7 and FFs 3054-1 through 3054-6 to detect the pattern b shown in FIG. 26 in a one-dimensional manner from the reflected light. More particularly, the read portion is judged as the ink A when an AND gate 3055 detects that the outputs of the FFs 3053-1 and 3054-1 are both "1" and an output terminal thereof is supplied with a signal of logic "1". Likewise, when the output of the F/F 3053-2 is "1" and that of the F/F 3054-2 is "0", an AND gate 3056 produces an output of logic "1" and the read portion is judged as the ink B. It is found that the ground color is present in two adjacent pixels when the outputs of the F/F 3053-3 and 4 are "0".

Accordingly, when the output of an gate circuit 3060 is "1", detected is the infrared pattern of "ground color", "ink A," "ink B", "ground color", "ground color", "ink B", "ink A" and "ground color".

While the output of the infrared sensor is judged with the fixed threshold values, it is apparent that the output is corrected (shading correction) before judgment by using the light illuminating the standard plate at every time when the image is scanned as in the case of typical copying machines.

While this embodiment has thus been described on the assumption that the transparent ink used is reflective at approximately 100% in the visible region, a similar pattern and detection thereof may be provided with a plurality of inks that appear same color to the human eye and that have different reflecting characteristics to the light with a specific wavelength in the infrared region.

In addition, while this embodiment has thus been described in conjunction with a pattern printed with two divergent inks A and B, the possibility of erroneous judgment can be reduced without complicating the pattern by means of using three or more inks together.

The pattern is not limited to the concentric shape and any one of adequate shapes can be selected that is suitable for the pattern matching.

Depending on the pattern, a two-dimensional pattern matching technique can be used.

<Modification>

While the above embodiment has thus been described in conjunction that the recording signal is controlled to control the recording after detection of the specific pattern, an image scanner or the like for supplying images into a computer or the like is applicable to control in various ways. For example, the scanner may be used for controlling the reading signal, interrupting the reading or deleting the signal already picked up.

As mentioned above, there is an effect that the possibility of the incorrect judgment can be reduced for normal originals by means of reading at a plurality of levels the pattern formed of a plurality of inks having different reflectance to the light with the infrared wavelength, thereby specifying the pattern according to the level and the shape.

<Eighth Embodiment>

(Characteristics of an Original)

This embodiment makes it possible to discriminate images of higher accuracy by using, as a specific image, color materials formed of a color having substantially no absorbance to the infrared radiation in which infrared absorbing substances are contained.

Figure 28:
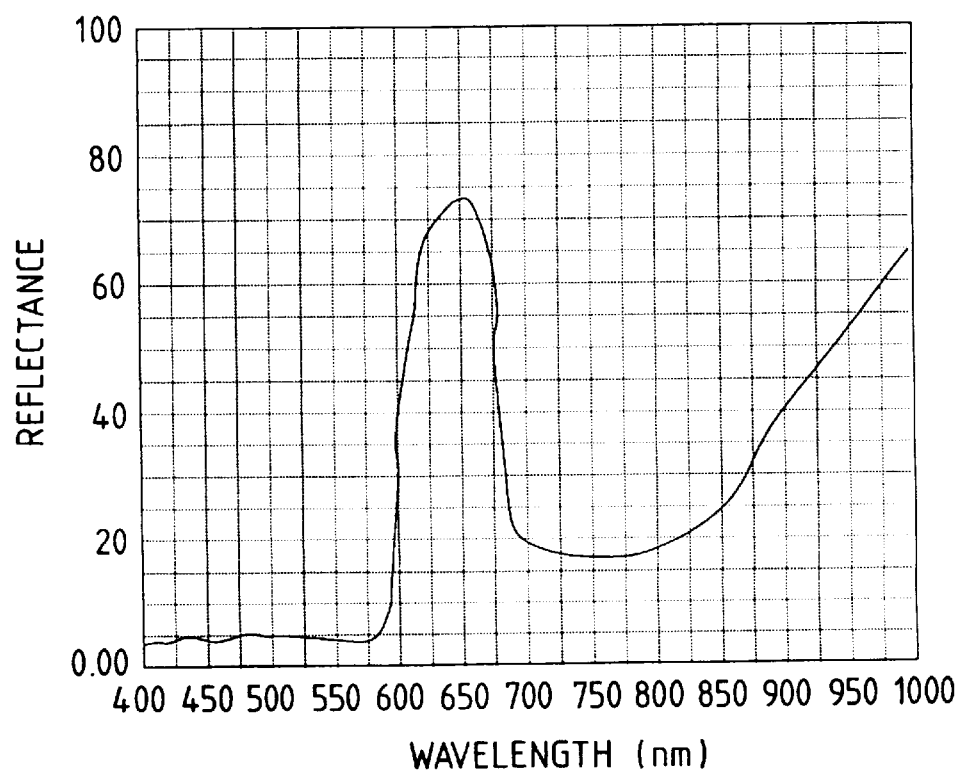
FIG. 28 shows spectral reflectance of a color material having infrared absorption characteristics which is used in the embodiment of the present invention.

FIG. 28 shows the spectral reflective characteristic of the color material used in the present invention.

This color material is highly reflective to the light with the wavelength of from 600 nm to 700 nm. It absorbs the light with the wavelength of from 700 nm to 900 nm.

To provide such characteristic, incorporated in a typical red material is a substance (in this embodiment, SIR-175 available from Mitsui Toatsu Chemicals Inc.) that appears transparent in the visible region while absorbs the light in the near-infrared region.

The present inventor had studied and investigated spectral reflective characteristics of about 1000 different print inks at the wavelengths of 300 nm to 1100 nm.

In particular, the inventor had focused on the near-infrared region of between 700 nm and 900 nm. As a result, it has revealed that the absorption of the light with the near-infrared wavelengths shows the following tendencies.

1. Some color materials of high thickness and low saturation have absorption to the light with the near-infrared wavelengths.
2. Some greenish materials having high saturation have absorption to the light with the near-infrared wavelengths.

In addition, the color materials had also studied on reflection to the infrared radiation. As a result, it has revealed that there is no reddish material absorptive to the infrared.

Accordingly, it is understood that to use a color material having the infrared absorbing characteristic which appears red or reddish in the visible region is a safety method to discriminate a specific original.

Figure 35:
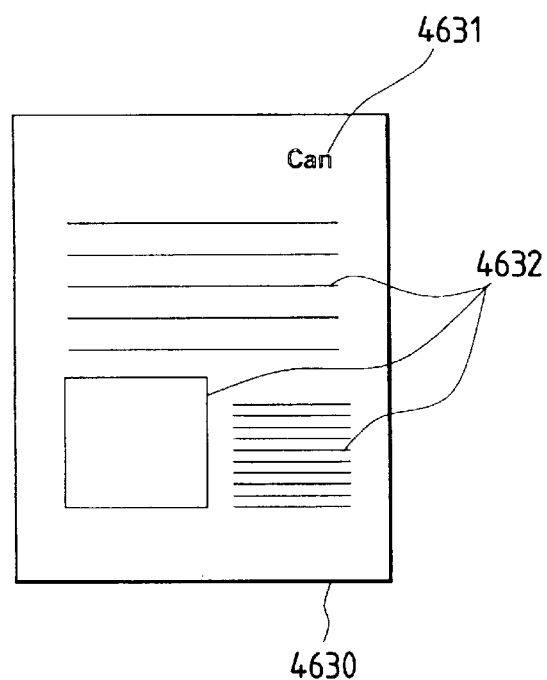
FIG. 35 shows an example of an original.

An example of an original that should not be copied is shown in FIG. 35. Illustrated is a copy prohibited original (hereinafter, merely referred to as an original) 4630 on which a pattern 4631 is printed with a paint that appears red and has the infrared absorbing characteristic.

The original 4630 contains, other than the pattern 4631, secret information and an image 4632 printed thereon with a common ink.

Figure 30:
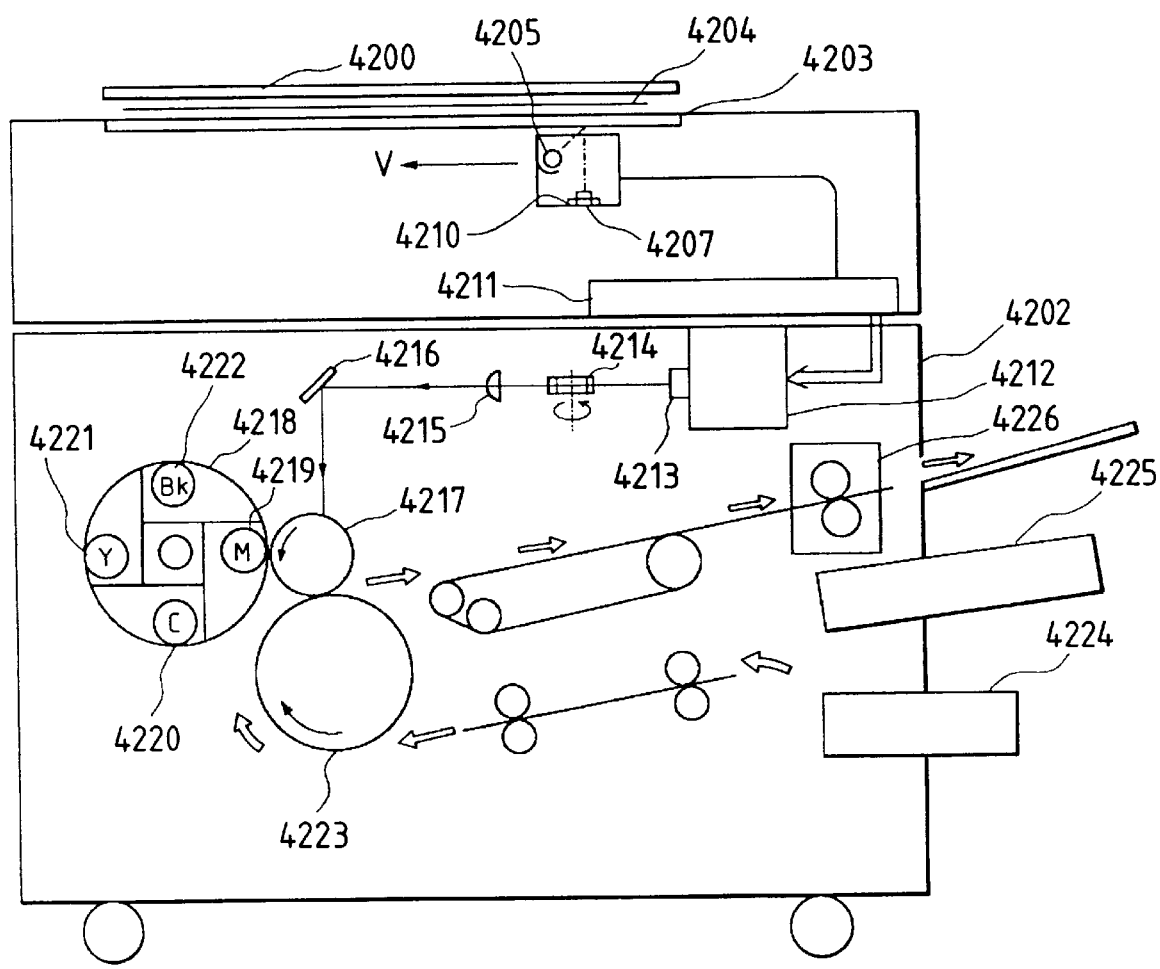
FIG. 30 is a schematic view showing a structure of a copying machine according to the embodiment of the present invention.

FIG. 30 is an outside view of an apparatus according to this embodiment of the present invention.

In FIG. 30, the apparatus comprises an image scanner unit 4201 and a printer unit 4202. The image scanner unit 4201 is for picking up an original image and digitizes it into an electrical signal. The printer unit 4202 is for printing on a paper a full-color image corresponding to the original image picked up by the image scanner unit 4201.

The image scanner unit 4201 comprises a mirror-faced pressing plate 4200. An original 4204 carried on an original carrier glass plate (hereinafter, referred to as a platen) 4203 is illuminated with light produced by a halogen lamp 4205. The light reflected from the surface of the original is focused by a lens 4209 on a color sensor (hereinafter, referred to as a CCD) 4210. The CCD 4210 separates colors of the optical information obtained from the original. The separated colors are supplied to a signal processing unit 4211 as full-color information consisting of red (R), green (G) and blue (B) components and an infrared (IR) component. The entire area of the original is scanned by mechanical movement of a reading unit 4207 at a velocity v in a direction perpendicular (hereinafter, referred to as a sub scan direction) to the electrical scanning direction (hereinafter, referred to as a main scan direction) of the color sensor.

The signal processing unit 4211 electrically processes the signals obtained by the scanning operation to separate it into components of magenta (M), cyan (C), yellow (Y) and black (BK), which are sent to the printer unit 4202.

(Structure of the Printer Unit)

The image signals representing the respective components M, C, Y and BK supplied from the image scanner unit 4201 are sent to a laser driver 4212. The laser driver 4212 drives a semiconductor laser 4213 in response to the image signal supplied from the image scanner unit 4201. The semiconductor laser 4213 emits a laser beam and the emitted beam scans a photosensitive drum 4217 through a polygon mirror 4214, an f-θ lens 4215, and a mirror 4216.

A developing unit 4218 is composed of a magenta developing station 4219, a cyan developing station 4220, a yellow developing station 4221 and a black developing station 4222. These four developing stations are successively brought into contact with the photosensitive drum 4217, thereby developing electrostatic latent images of M, C, Y and BK formed on the photosensitive drum 4217 with toners corresponding to the respective colors.

A sheet fed from a sheet cassette 4224 or 4225 is wound on a transfer drum 4223, and receives the transfer of the image developed on the photosensitive drum 4217.

After completion of transferring each of four color images of M, C, Y and BK, the sheet is discharged through a fixing unit 4226.

That's all for the description of the scanner and printer units, the major components of the apparatus.

Next, the image scanner unit 4210 is described more in detail.

FIGS. 29A and 29B show structures of the CCD 4210. FIGS. 29A and 29B show a top plan view and a sectional view, respectively, of the CCD 4210.

The CCD 4210 is formed of a first pixel train 4100 and a second pixel train 4101. The first pixel train comprises filters alternatively arranged with each other to produce serial visible information. More specifically, R filters 4102, G filters 4103 and B filters 4104 are deposited alternatively in order of R, G, B, R, G, B . . . to form a minimum reading system with one pixel 4105 or a set of three pixels R, G and B being used as a minimum reading area.

Figure 31:
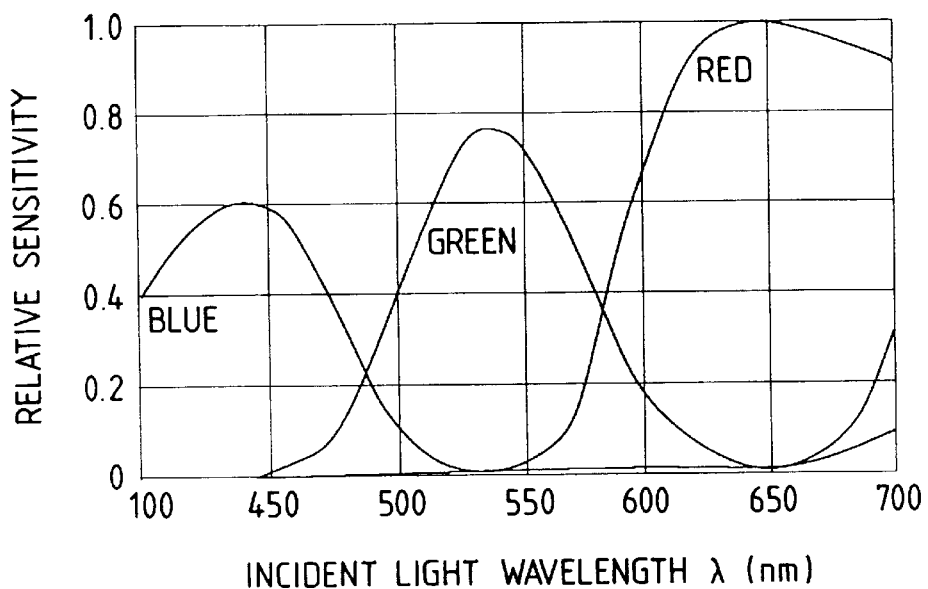
FIG. 31 shows spectral response of an RGB filter.
Figure 32:
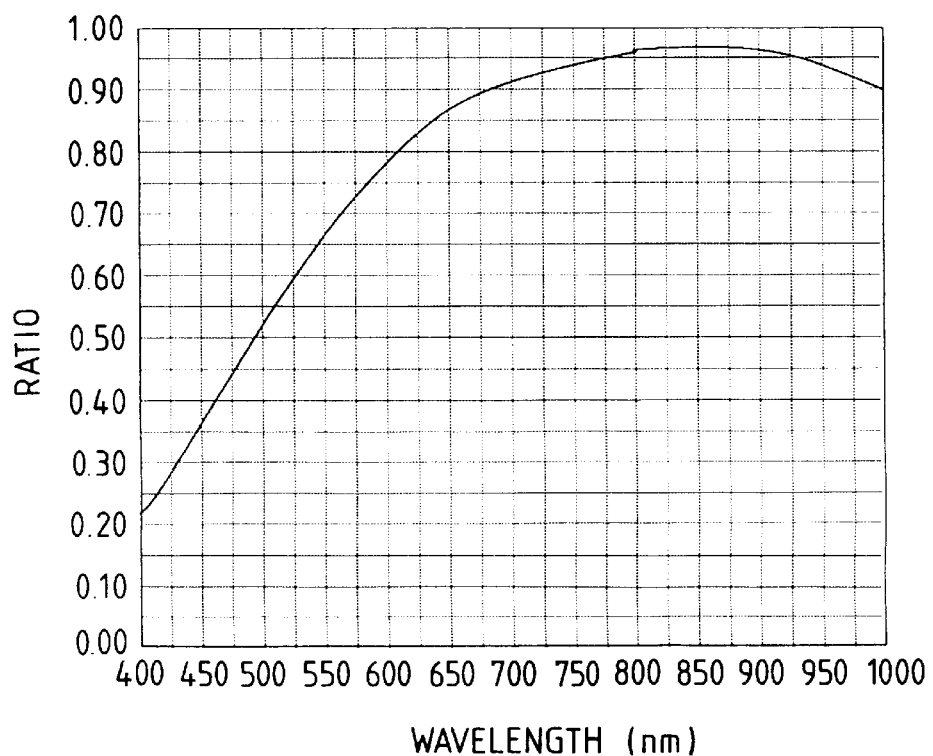
FIG. 32 shows emission distribution of a halogen lamp.

FIG. 31 shows the spectral characteristic of the filters deposited for each pixel while FIG. 32 shows the emission spectral characteristic of the halogen lamp 4205.

Figure 33:
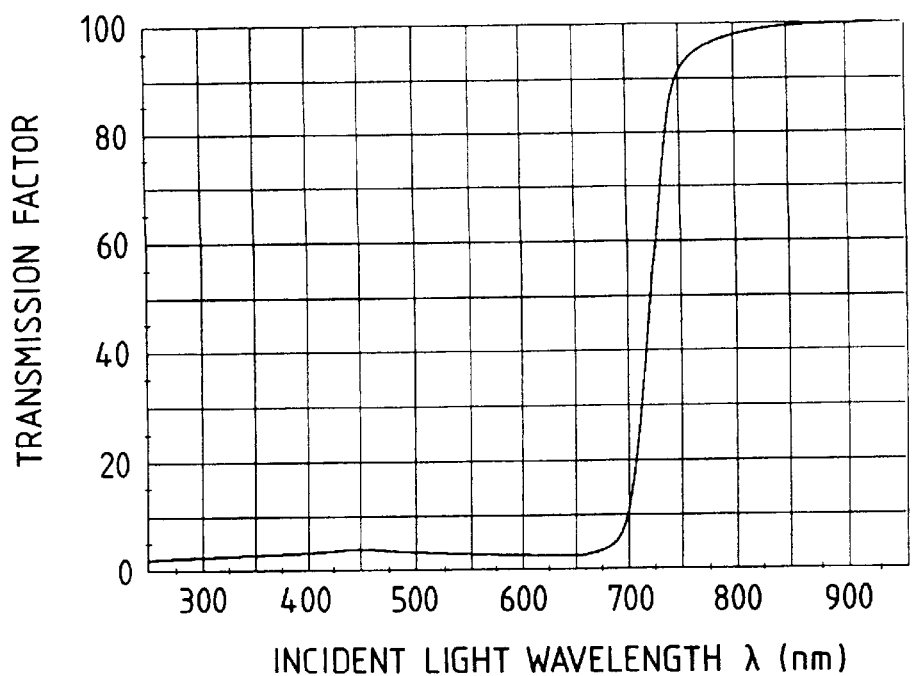
FIG. 33 shows spectral response of a visible light cutoff filter.

The second pixel train 4101 comprises pixels aligned at a pitch three times larger than that in the first pixel train 4100. More particularly, the second pixel pitch is equal to the pixel pitch in the first pixel train 4100. The second pixel train 4101 is provided with a visible light cutoff filter deposited thereon that has the characteristic shown in FIG. 33. Accordingly, the light with the wavelengths not longer than 700 nm is cutoff by the pixel train 4101 and only the infrared components can be read.

As apparent from FIG. 29B, the second pixel train 4101 is shifted by 300 μm as a step d to elongate the optical path therefor. This is because the focal distance of the optical system depends on the wavelength and the infrared radiation required longer optical path, otherwise the image will be out of focus.

Figure 34:
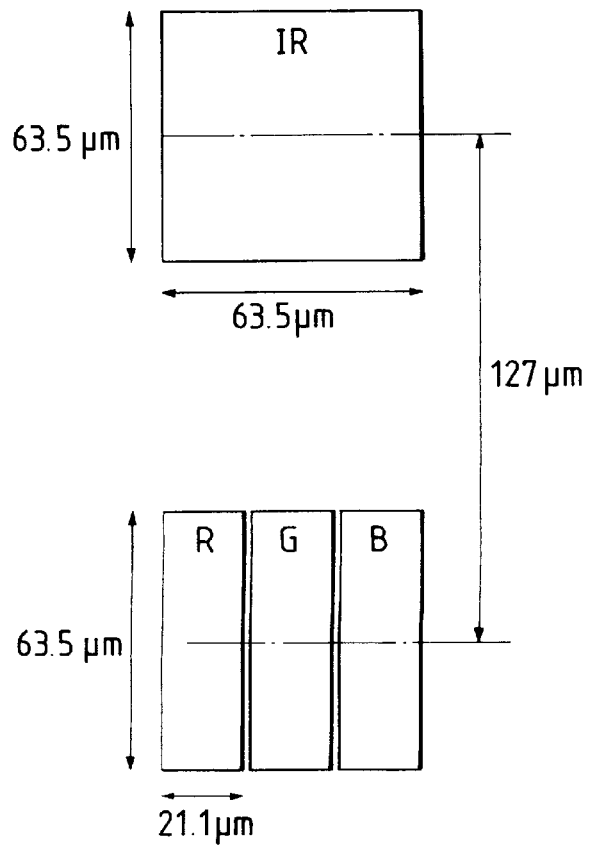
FIG. 34 illustrates dimensions of pixels obtained by a color sensor applied to the present invention.

FIG. 34 shows dimensions of the first and the second pixel trains 4100 and 4101 as well as the positional relation therebetween. In this event, the reading unit is assumed to have the resolution of 400 dpi. In addition, for the purpose of clarifying the description, the optical system used is assumed to be a one-power optical system.

To realize the resolution of 400 dpi, the minimum reading area is 63.5 μm×63.5 μm in dimension. Thus, each of the R pixel 4102, the G pixel 4103 and the B pixel 4104 in FIG. 34 is 21.1 μm×63.5 μm in dimension while the IR pixel is 63.5 μm×63.5 μm in dimension. The distance between the pixel trains 4100 and 4101 is set to 127 μm in this embodiment. In other words, the pixel trains are away from each other by an amount equal to two pixel trains. The reading signals obtained by the pixel trains 4100 and 4101 are supplied to the signal processing unit 4211.

Next, a sequence of the pattern recognition is described in order.

In this embodiment, description is made in conjunction with a copy prohibited original (such as a secret document) as an example of an original directed to counterfeit prohibition. However, the present invention is not limited to those particularly described and illustrated embodiment, and is also applicable to bills, notes, valuable securities or the like.
(Pre-scanning)

The image scanner unit 4201 performs a pre-scanning operation as a pre-processing for copying an original 4630. This Pre-scanning is described.

First, the lamp 4205 illuminates a white shading plate 4640 attached to a portion of the platen 4203. An reflected image from the white shading plate 4640 is focused on the CCD 4210 through the lens 4209. The image from the white shading plate 4640 is read by the pixel trains 4100 and 4101 in the CCD 4210. The read image is subjected to signal processing in the signal processing unit 4211 to create correction data for correcting uneven illumination of the lamp 4205 as well as non-uniformly sensitivity of the pixel trains 4100 and 4101 in the CCD 4210. The correction data is stored for every pixel train.

Figure 36:
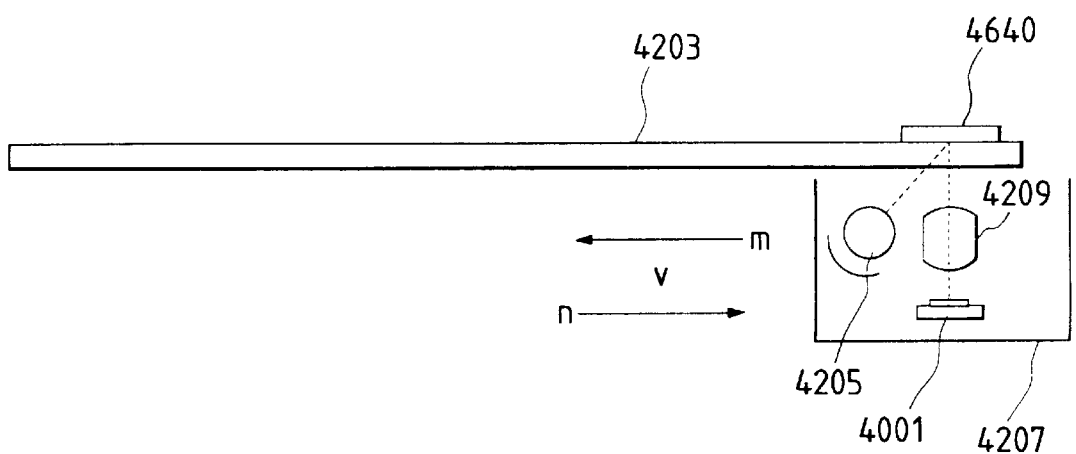
FIG. 36 is a view for use in describing operation of shading correction.

Next, the reading unit 4207 moves mechanically through a driving system (not shown) at a velocity v in a direction depicted by an arrow m, thereby scanning the entire surface of the original. In this event, the image on the original 4630, read by the pixel train 4100 in the CCD 4210, is sampled on the minimum and maximum values of the depth of the original. A print depth set value for a copy is then calculated according to the sampled values. Subsequently, the reading unit 4207 moves mechanically to an initial position or a home position through a driving system (not shown) at the velocity v in a direction depicted by an arrow n in FIG. 36.
(Copy of Original and Pattern Sensing)

After completion of the above mentioned shading correction data creation, the reading unit 4207 turns back to the home position to initiate reading of the original 4630. Simultaneously, the reading unit 4207 detects whether the pattern 4631 is present on the original 4630.

The presence and absence of the pattern is determined according to the reading information obtained by the pixel train 4100 in the CCD 4210 and to a comparison result obtained by comparing the reading information. Pixel reading for reproducing the image is performed by the pixel train 4100 while image reading for detecting the pattern 4631 is performed by the pixel train 4101.

Described below is the signal processing unit 4211 for processing the read signal.

Figure 37:
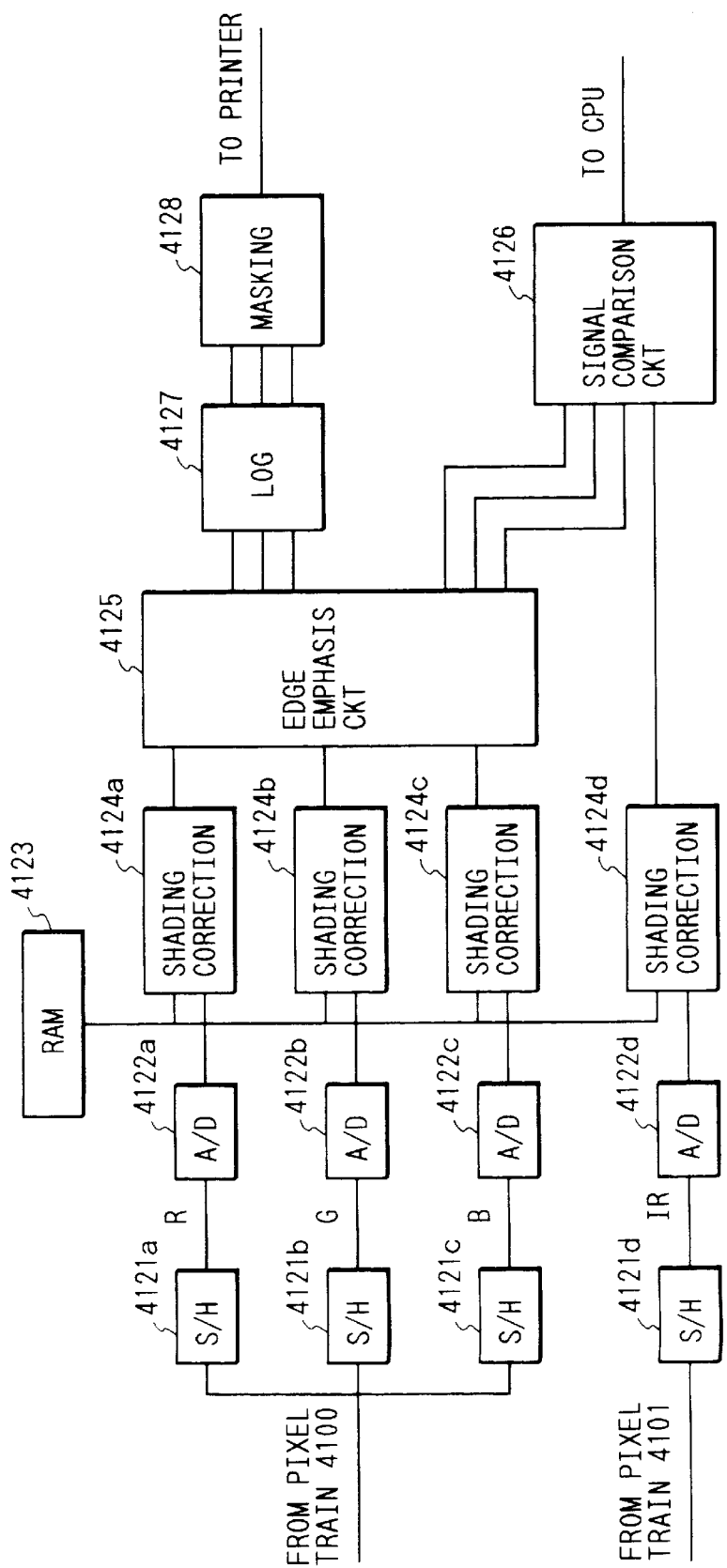
FIG. 37 is a block diagram of a signal processing unit 4211.

FIG. 37 shows a block diagram of the signal processing unit 4211.

First, a signal processing system of the pixel train 4100 is described. Analog image signals are supplied from the pixel train 4100 in order of R, G and B in synchronism with the driving signal for CCD 4210. The image signals are supplied simultaneously to three sample and hold circuits 4121a through 4121c. The sample and hold circuit 4121a generates a sampling signal at a same timing as the R signal is received. The sample and hold circuit 4121a holds the analog level of the sampled signal until the subsequent R signal is received. Likewise, the sample and hold circuit 4121b generates a sampling signal at a same timing as the G signal is received while the sample and hold circuit 4121c generates a sampling signal at a same timing as the B signal is received.

As a result, the sample and hold circuits 4121a, 4121b and 4121c produce R, G and B signals, respectively. These signals are, as shown in the figure, supplied to the respective A/D converters 4122a through 4122c where the analog image signals are converted into digital image signals, each having eight bits. These digital signals are supplied to the respective shading correction circuits 4124a through 4124c where they are subjected to shading correction.

The shading correction is correction processing described in the above mentioned "Pre-scanning" section. The generated correction data are held in an RAM 4123 for each of the R, G and B data.

In reading the image, the correction data, each of which corresponding to one pixel, are successively supplied to the shading correction circuits 4124a through 4124c to correct the data. The image signals supplied from the shading correction circuits 4124a through 4124c are sent to a five-by-five edge emphasis circuit 4125. The five-by-five edge emphasis circuit (hereinafter, merely referred to as the edge emphasis circuit) 4125 is a circuit for emphasizing the outline or configuration of the read image and is realized by the following.

Figure 38:
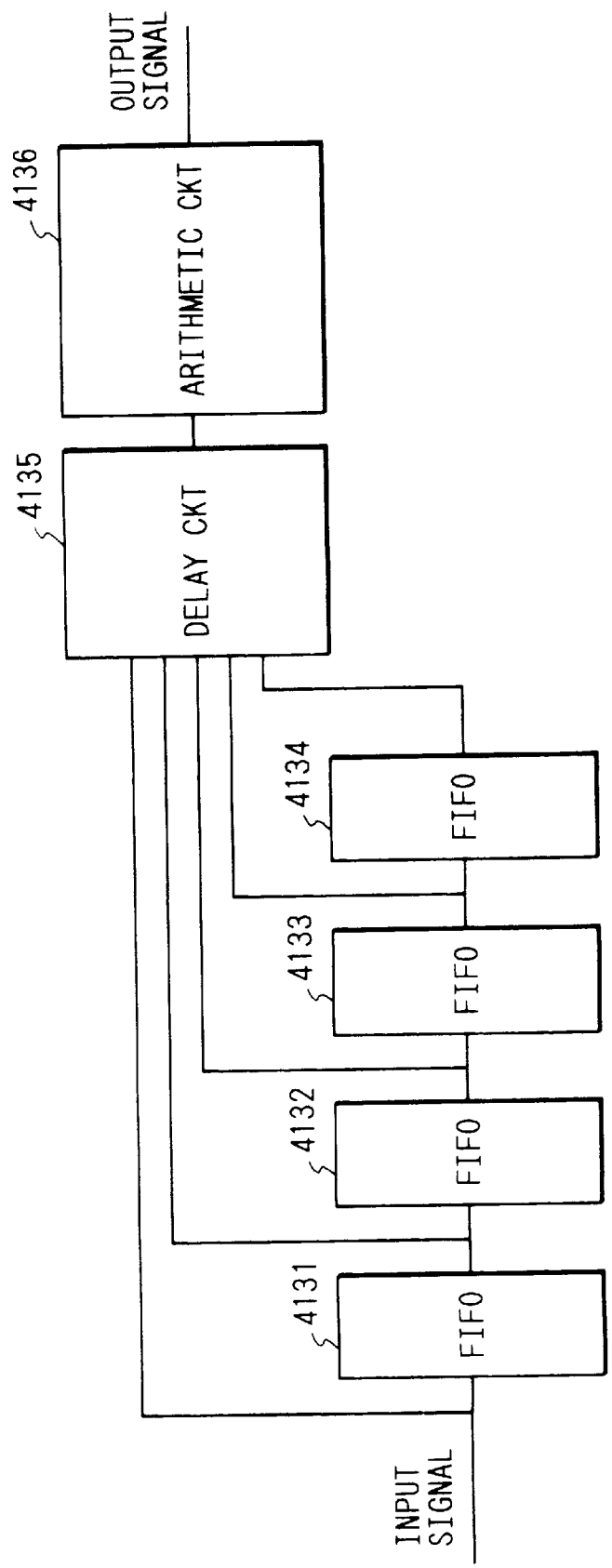
FIG. 38 is a block diagram of an edge emphasis circuit.

FIG. 38 shows a structure of the edge emphasis circuit 4125. The edge emphasis circuit 4125 is provided for each color though only one of them is illustrated in FIG. 38. It is noted the edge emphasis circuit for the remaining two colors are equal in structure and operation to the one illustrated in the figure.

In FIG. 38, reference numerals 4131 through 4134 are FIFOs capable of holding data for one line of the pixel train 4100 in the CCD 4210. Connection among four FIFOs are as shown in the figure. When a pixel train data regarding to the n-th line is supplied to the FIFO 4131, the FIFOs 4131, 4132, 4133 and 4134 produce data regarding to the (n--1)-th, (n–2)-th, (n–3)-th and (n–4)-th lines, respectively. An input signal and the outputs signal supplied from the FIFOs 4131 through 4134 are sent to a delay circuit 4135. The delay circuit 4135 comprises pixel delay circuits of a few stages for the m-th pixel signal received. The delay circuit 4135 supplies the m-th, (m−1)-th, (m−2)-th, (m−3)-th and (m−4)-th pixel data to an arithmetic circuit 4136. Thus, the arithmetic circuit 4136 is supplied with the data for twenty-five pixels in total.

Figure 39:
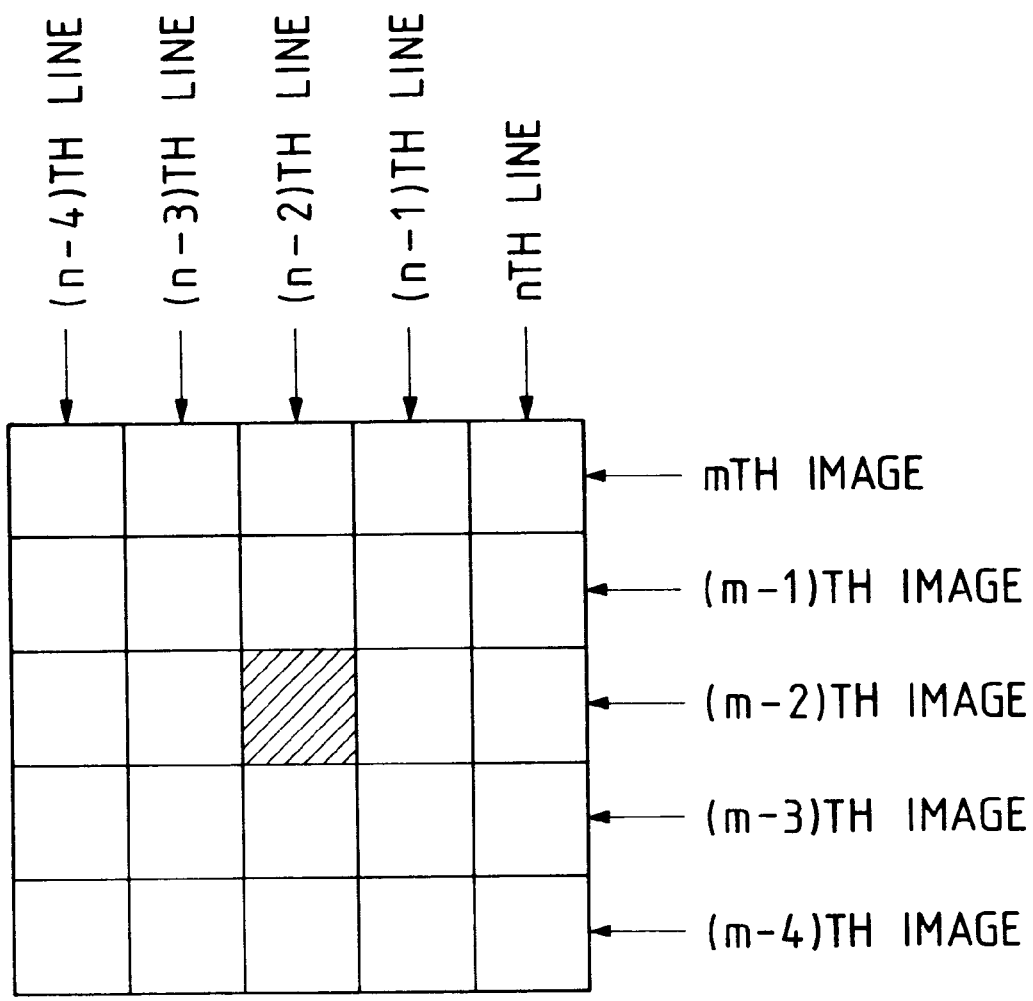
FIG. 39 is a graphical representation of pixel data.

A map of the data supplied is shown in FIG. 39.

The data of twenty-four peripheral pixels are supplied to the arithmetic circuit 4136 relative to the cross-hatched notable pixel. The arithmetic circuit 4136 multiplies the notable pixel by twenty-five to obtain data of 25-fold of the notable pixel, from which the data about the twenty-four peripheral pixels is subtracted. When the data of the notable pixel is larger than that of the peripheral pixels, then the notable data becomes larger. Likewise, when the data of the notable pixel is smaller than that of the peripheral pixels, then the notable data becomes smaller.

Such processing makes a sharp contrast along the configuration of the image, emphasizing the contrast of the reproduced image. The image data subjected to the edge emphasizing is supplied to the printer unit through a logarithmic conversion unit 4127 and a masking conversion unit 4128. The logarithmic conversion unit 4127 is for light-to-density conversion while the masking conversion unit 4128 is for the optimum correlated color correction.

That's all for the description of signal processing unit of the pixel train 4100.

Next, a signal processing system of the pixel train 4101 is described. This signal processing system is essentially similar to those of the pixel train 4100 except that it has no edge emphasis circuit because reproduction of the image is not a goal of this system.

The data supplied from a shading correction circuit 4124b is sent to a signal comparison circuit 4126. Other inputs of the signal comparison circuit 4126 are connected to the edge emphasis circuit 4125. It is noted that, as apparent from FIG. 39, the notable pixel in the edge emphasis circuit 4125 corresponds to the data of the (n−2)-th line. To compare the data of the pixel train 4100 with that of the pixel train 4101, a line buffer is required to compensate distance between them by two lines as shown in FIG. 34. However, the edge emphasis is made on the pixel train 4100, so that the reading data for the same portion on the original are provided.

The signal comparison circuit 4126 compares the pixel data of the pixel train 4100 with that of the pixel train 4101 to supply the comparison result to the CPU (which is not shown in this figure).

In comparing the signals, calculated is a sum of the number of the pixels satisfying:

$IR-R<k1,$ $R>G,$ and $R>B,$ where k1 is a constant. When the calculation result exceeds the predetermined number of the pixels, the CPU controls to interrupt immediately copying of the original.

<Ninth Embodiment>

Figure 40:
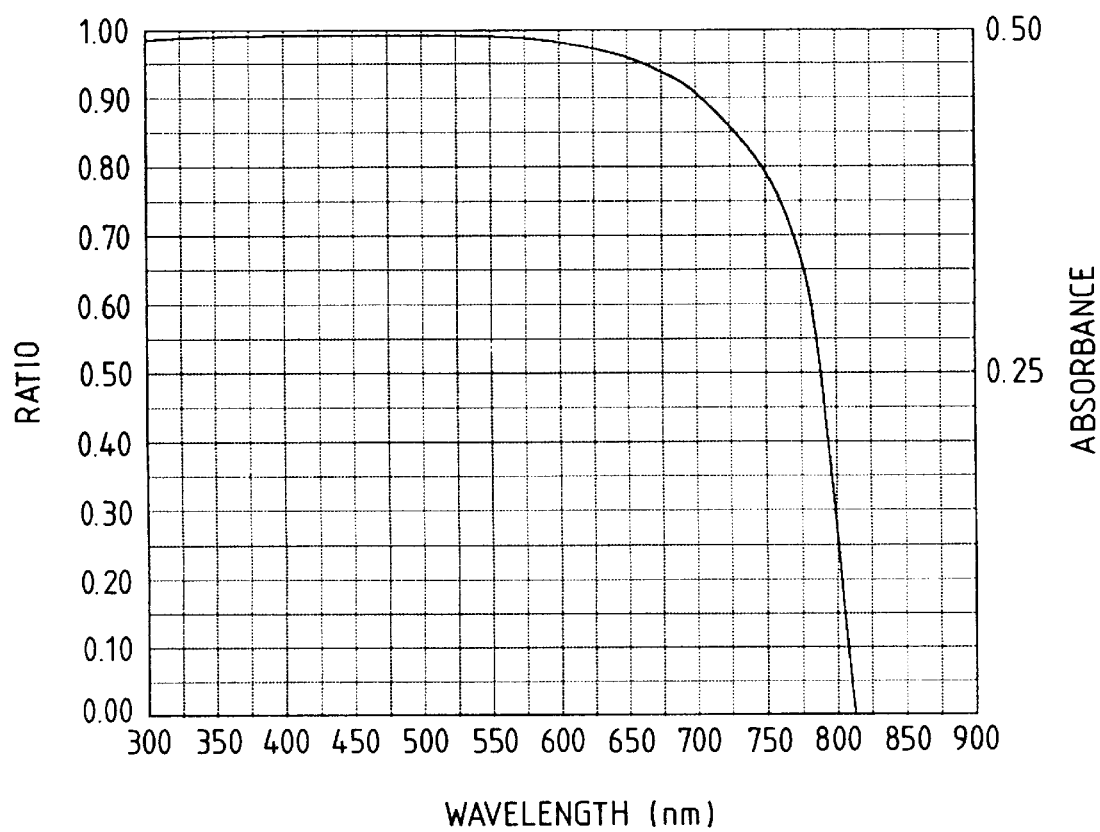
FIG. 40 shows spectral response of a far infrared cutoff filter.

According to this embodiment, the wavelengths to be read by the pixel train 4101 is 700 nm or longer. However, as shown in FIG. 28, the spectral distribution of an infrared absorbing painting exhibits gradually increased reflectance at or longer than 900 nm. Depending on the light source used, the spectral energy may spread to the region with the wavelengths of 1000 nm or longer. To use the light source of the type described makes it difficult to determine absorption due to the unnecessary energy at the region with the wavelengths of 900 nm or longer. With this respect, the pixel train 4101 is preferable to have a far-infrared cutoff filter that has the characteristic as shown in FIG. 40.

For the pixel train 4100, the far-infrared cutoff filter may be arranged at any adequate location within the optical path because the far-infrared radiation has already cut off by the filters deposited on the surface of the pixels. For example, the far-infrared cutoff filter may be advantageously arranged in front of and back of the lens 4209. With such arrangement, the filter can be replaced or changed readily when the fluorescent characteristic of a fluorescent paint printed later on the original.

<Tenth Embodiment>

While the this embodiment has thus been described in conjunction that the line positions of the pixel trains 4100 and 4101 are corrected by using the FIFO applied to the five-by-five edge emphasis circuit, this embodiment is applies alternative design. For example, the FIFO may be replaced with an image processing circuit implementing an FIFO for error diffusion processing or so on. The FIFO may be provided only for the line position correction.

<Eleventh Embodiment>

According to this embodiment, judgment of the pattern is made only by means of signal comparison by the signal comparison circuit. However, the pattern matching may be made on the basis of a shape of the image extracted as a result of signal comparison, thereby to control copying of the original. In such a case, a pattern matching circuit becomes large and complex but it is possible to determine type of the original according to the shape of it. Accordingly, alternative or selectable control can be provided allowing to copy, for example, a company document using a pass-word while prohibiting to copy the valuable securities or the like.

A solid image pick-up device may be, other than the above mentioned charged coupled device (CCD), MOS or amplifying device where a capacity load (electrode) is connected to the emitter of a photo-transistor as disclosed in U.S. Pat. No. 4,791,469 to Tadahiro OHMI and Nobuyoshi TANAKA.

As mentioned above, it is possible to detect formed patterns in a high accuracy by means of forming on the copy prohibited original a predetermined pattern with the color material obtained by applying the infrared absorbing characteristic to color having no infrared absorbing characteristic, thereby reading the original by the device comprising infrared radiation reading means in the copying machine.

<Twelfth Embodiment>

In Japanese Patent Application No. 5-15095, assigned to the same applicant as the present invention, a device is suggested that refers a specific mark and the ground portion therearound to discriminate the specific mark under the condition where the mark and the ground are substantially same in color to each other while are significantly different from each other about the signal values regarding to the infrared information reading.

In addition, Japanese Patent Application No. 5-6978, assigned to the same applicant as the present invention, discloses formation of a mark of which relative configuration with respect to a certain reference point is not changed when the original on which the mark is printed is rotated. For example, the mark may be circular in shape that is not affected by the mounting angle of the original relative to the glass carrying it thereon.

A specific mark and the ground are printed with different inks when the mark is printed on the face of a paper under the condition where the mark and the ground are substantially same in color to each other while are significantly different from each other about the signal values regarding to the infrared information reading. In other words, the mark and the ground are printed on the paper with an ink A transmitting the infrared radiation and an ink B absorbance to the infrared radiation, respectively, both of which appear specific color.

The inks A and B should appear same color in the visible region.

The carbon black is generally known as a material having the infrared absorbing characteristic. In addition, some greenish material also have the infrared absorbing characteristic. These materials appear black or green in the visible spectrum. Accordingly, it is difficult to make the color of the inks A and B same in spite of much effort to obtain, with the infrared absorbing materials, the ink B that is substantially equal in color to the ink A having arbitrary color of the ground.

In addition, SIR-159 available from Mitsui Toatsu Chemicals Inc. or the like is known as the infrared absorbing material that appears color closer to transparent in the visible spectrum. However, it has a color close to gray and thus it is difficult to prepare the inks A and B appearing the same color.

With this respect, the inks A and B for the ground portion and the mark portion, respectively, may be detected in the visible region as the same color though their colors are slightly different from each other. This technique requires the apparatus to detect different colors as the same one and, in turn, increases the possibility of incorrect judgment of information in a general printed matter as the specific mark.

Further, to print a mark of which relative configuration with respect to a certain reference point is not changed when the original on which the mark is printed is rotated results in enlargement of the mark itself. As a result, printing method for the original such as the banknotes should be changed, notifying the presence of the mark of common people. This affects on the secrecy of the original.

This embodiment is directed to detect, with respect to the above problem, a specific mark upon reading thereof by means of obtaining contrasts between the visible reading signals and between the invisible reading signals upon to discriminate the specific mart according to the correlation between the visible and invisible contrasts.

In addition, this embodiment is directed to determine whether the original is the specific one by means of detecting a mark printed on the original with the infrared absorbing ink in the form of a donut as a completely symmetric mark.

This embodiment is now described in detail. An apparatus according to this embodiment is similar in structure to those described in conjunction with FIG. 2, thus further description thereof will be omitted.

The image scanner 201 is described in detail.

The halogen lamp 205, which serves as the light source, is commonly used for visible and infrared information readings. It produces light composed of a band of frequencies required for these readings. Such common source of light contributes to effective illumination of light with different wavelengths to the original which are required for visible and infrared information readings.

Figure 51A:
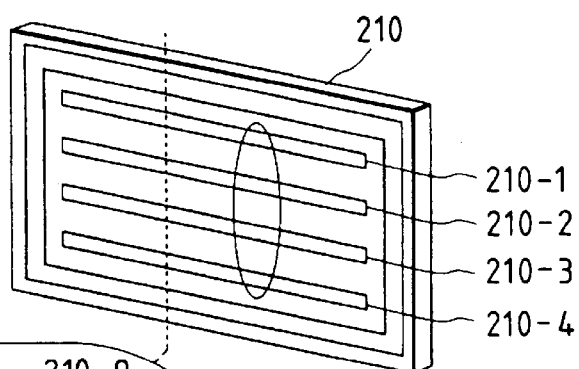
FIGS. 51A to 51C are views for use in describing a structure of a four-line color sensor.
Figure 51C:
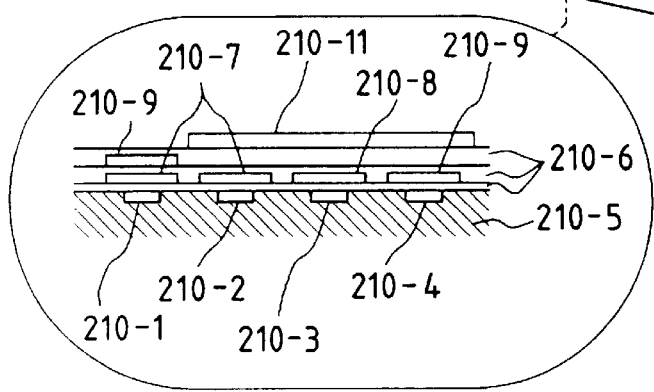
Figure 51B:
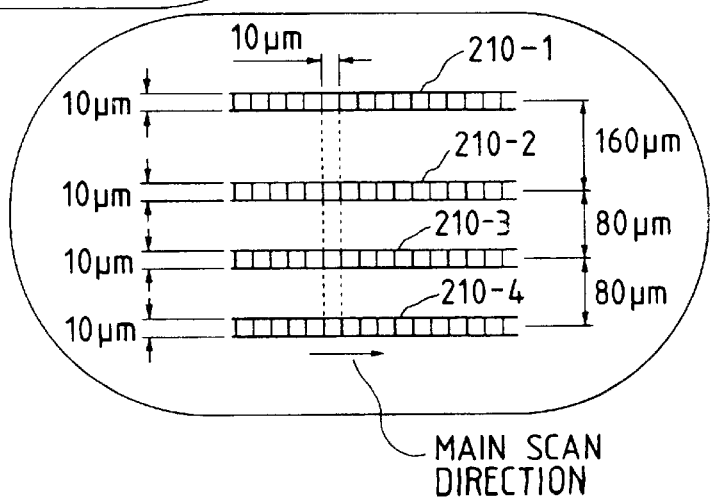

FIGS. 51A and 51B illustrate the CCD 210 applied to the present embodiment.

The infrared sensor 210-1 is the photosensitive element line (CCD line sensor) used for sensing infrared radiation. The photosensitive element lines 210-2, 210-3, and 210-4 are for sensing the R, G, and B waveform components (visible spectra), respectively. Each of the IR, R, G and B sensors 210-1 through 210-4 has openings of 10 $\mu$m in width and in length along the main and sub scan directions, respectively. These photosensitive element lines are different in optical characteristics from each other and are arranged monolithically on a single silicon chip such that the IR, R, G and B sensors are arranged in parallel to each other to sense the same line on the original.

The above mentioned structure of the CCD allows common usage of the optical system such as a lens for visible and infrared readings.

This makes it possible to improve the accuracy of optical adjustment or the like and facilitate the adjustment as well.

A sectional view taken on the dotted line in FIG. 51A is shown in FIG. 51B.

Mounted on a silicon substrate 210-5 are a photo sensor 210-1 for IR reading and photo sensors 210-2, 210-3 and 210-4 for reading visible information of R, G and B, respectively. The R-photo sensor 210-2 is provided with an R-filter 210-7 adapted to transmit red component of the visible light. Likewise, the sensor 210-3 is provided with a G-filter 210-8 and the sensor 210-4 is provided with a B-filter 210-9.

Referring to FIG. 9, described is a filter spectral characteristic of each of the line sensors IR, R, G and B in the CCD 210.

The characteristic indicated by R is an output characteristic of a sensor obtained by the R-filter 210-7 having sensitivity to light of red and infrared spectra. Likewise, characteristic indicated by G is an output characteristic of a sensor obtained by the G-filter 210-8 having sensitivity to light of green and infrared spectra. The characteristic indicated by B is an output characteristic of a sensor obtained by the B-filter 210-9 having sensitivity to light of blue and infrared spectra. The IR sensor 210-1 is provided with the red filter 210-7 and the blue filter 210-9 with being overlapped to each other and is thus sensitive only to the infrared radiation corresponding to the region represented by cross-hatched portion in FIG. 9.

As apparent from the figure, the R, G and B filters 210-7 through 210-9 are sensitive to the infrared radiation having a wavelength of 700 nm or more. With this respect, the infrared cutoff filter 210-11 is provided for the R, G and B photo sensors. This infrared cutoff filter 210-11 is formed of laminated deposition films of $SiO_2$ and $TiO_2$ and has the characteristic illustrated in FIG. 10. A reference numeral 210-6 represents an equalized layer formed of transparent organic films.

FIG. 8 shows spectral response of an infrared absorber SIR-159 (sold by Mitsui Toatsu Chemicals Inc., Chiyoda-ku, Tokyo, Japan) used in this embodiment as a infrared absorbing material for a detected mark on a specific original. In this embodiment, the IR sensor 210-1 is directed to sense the infrared with wavelength ranging between 750 and 850 nm to detect presence of this infrared absorber. To this end, the lens 208 is provided with a far infrared cutoff filter 231 formed of a dichroic mirror having spectral response as illustrated in FIG. 52a.

As a result, the spectral sensitivity of the IR sensor 210-1 is given as the spectral characteristic obtained by combining or multiplying the characteristics of the cross-hatched range in FIG. 9 and the characteristic shown in a in FIG. 52. As apparent from this characteristic shown in b in FIG. 52, IR represents the light with infrared wavelengths primarily in the 710 to 850 nm.

This filter 231 is harmless for the R, G and B sensors 210-2 through 210-4 as well as for the IR sensor 210-1, so that it is provided with a common lens unit, the lens 208.

This allows a design for the filter provided for the lens 209 to be determined only by the consideration of the far infrared cutoff characteristic. As a result, superior far infrared cutoff characteristic can be achieved with a simple interference fringe structure.

FIG. 51B is an enlarged illustration of the photosensitive elements. Each sensor is 10 μm in length for every one pixel along the main scan direction. Five thousand sensors are aligned along the main scan direction for each CCD line sensor to read the width (297 mm) of an A3-paper at a resolution of 400 dpi. In addition, the R, G and B line sensors are away from each other at a distance of 80 μm, which corresponds to an eight-line distance relative to a sub scan resolution of 400 lpi (line per inch). The IR sensor 210-1 is away from the R sensor 210-2 at a distance of 160 μm (16 lines), a double of other line distance.

A block diagram for use in describing flow of the image signals in the image scanner unit 201 is similar to that illustrated in FIGS. 14A and 14B.

Figure 42:
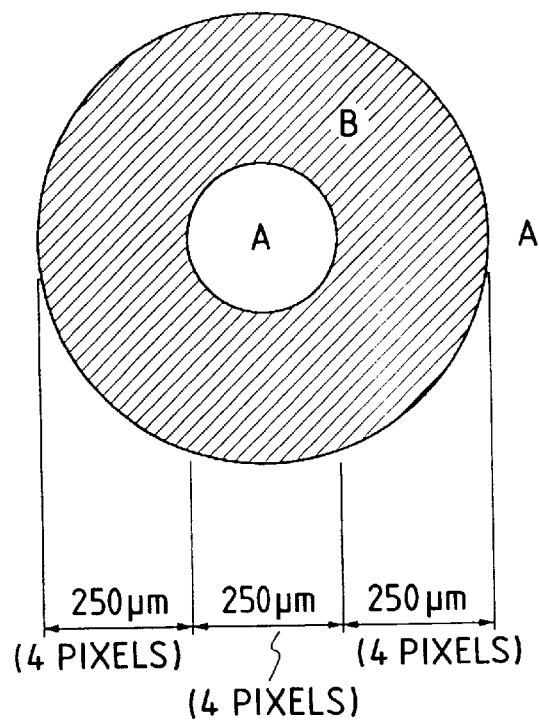
FIG. 42 illustrates dimensions of a specific pattern.

Referring now to FIG. 42, described is an image pattern to be detected in the present invention. A donut-shaped pattern shown in FIG. 42 is a specific mark to be detected in this embodiment. The ink B, having the infrared absorbing characteristic as shown in FIG. 8, is printed in the donut shape on the ground of the ink A absorbing no infrared radiation. This ink B having the infrared absorbing characteristic is prepared by incorporating infrared absorbing materials into the ink A transmitting the infrared radiation. As the infrared absorbing material, the color material SIR-159 are used that appears substantially transparent in the visible region and has a characteristic of absorbing the light in the infrared region. The SIR-159 has a color closer to gray in the visible region, so that mere incorporation of the SIR-159 into the ink A results in the ink B darker than the ink A. With this respect, the ink B is prepared by incorporating the infrared absorbing material, SIR-159, into an ink having higher saturation than the ink A. As a result, the inks A and B are substantially same in color in the visible region. The pattern b is thus indistinguishable by the human eye, but is clearly discriminated in the infrared region.

As shown in FIG. 42, the linear width of the donut portion printed with the ink B is 250 μm, which corresponds to about four pixels when being read at the resolution of 400 dpi.

Since the ink A differs from the ink B, displacement of registration is caused upon being printed. The amount of displacement may sometimes correspond to the amount of one pixel at the resolution of 400 dpi.

Figure 43:
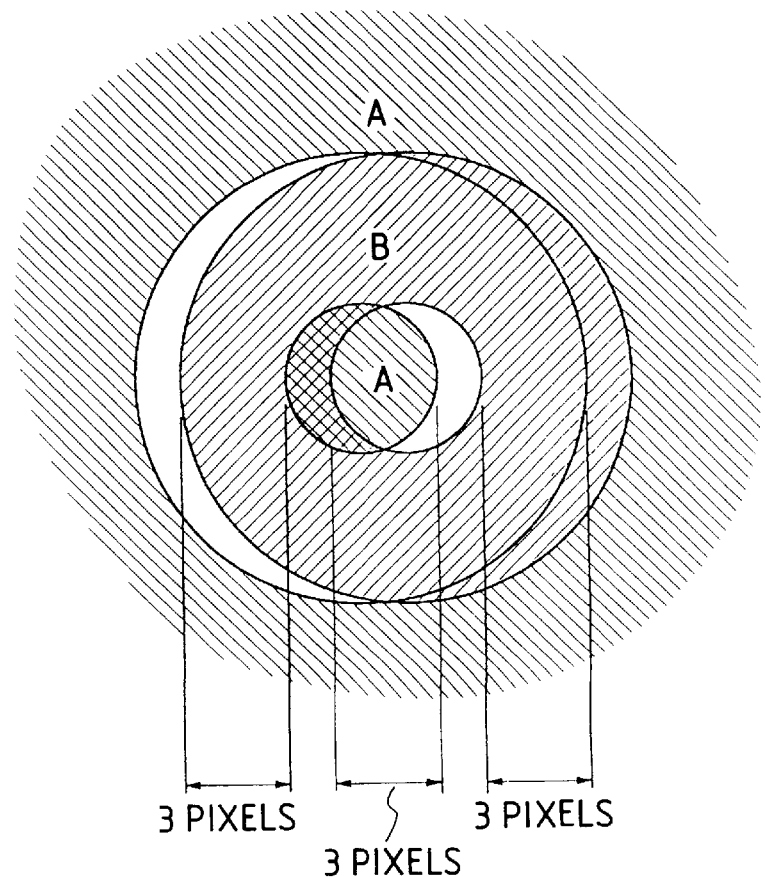
FIG. 43 is a view for use in describing registration displacement generated upon printing.

FIG. 43 shows the printed result with a displacement corresponding to the amount of one pixel. As apparent from the figure, the linear width of the donut portion printed with the ink B corresponds to the amount of three pixel while the center portion of the donut printed with the ink A also corresponds to the amount of three pixel. In addition, a phase shift between the digitizing phase upon reading and the phase of the original is basically equal in amount to one pixel. With the displacement upon printing and the phase shift upon reading between the CCD and the mark taken into consideration, a valid reading section of 2 pixels is ensured in the mark having four-pixel linear width.

In this embodiment, a noise component upon reading is eliminated by means of taking an average of the adjacent two pixels and then the mark is detected. In this manner, to use the mark having the minimum area of four-pixel size allows reading of the mark less affected by the registration and the noise.

An advantage of forming the donut portion using the infrared absorbing ink B is described below. The same circular marks can be formed into a circular pattern.

The donut-shaped pattern is the simplest one of the circular patterns. When the infrared absorbing ink B is printed on the central portion of the circular mark as shown in (1) in FIG. 44, the central portion is surrounded by the ink A, a common printing ink. This is a mere isolated dot as it is. Such dot-like circle cannot be discriminated from a dirty spot or dot information in the halftone dot printing and thus is not suitable for the specific mark. An effort to form the specific mark with a multiple circle rather than the donut in (1) in FIG. 44 will results in a triple circular mark as shown in (2) in FIG. 44 because the ground itself is the ink A. Such pattern is not practical because it requires enlarged judgment circuit and a large area for printing the pattern. With this respect, the present embodiment applies the double circle formed of the infrared absorbing ink B printed around the common ink reflective to the infrared radiation. As a result, it becomes possible to form a specific mark, that is less possible to be contained in the printing, in a minimum printing area and to make the mark not to be recognized by the human eye. In addition, the scale of the judgment circuit can be reduced into minimum.

It is noted that the pattern is not limited to those described and illustrated above, it may be a predetermined pattern arranged along the periphery of a circle (FIG. 44; (3)) or may be a pattern of which ring is different in thickness (FIG. 44; (4)).

<Outline of Mark Detection>

As mentioned above, this embodiment detects the specific mark formed as a donut with the infrared absorbing ink B and the infrared reflecting ink A, both of which appear substantially same color in the visible region. There are two major methods for detecting the pattern:

1. a difference between visible color signals is small and a difference between infrared signals is large; and
2. a pattern has a donut-shape.

Figure 45A:
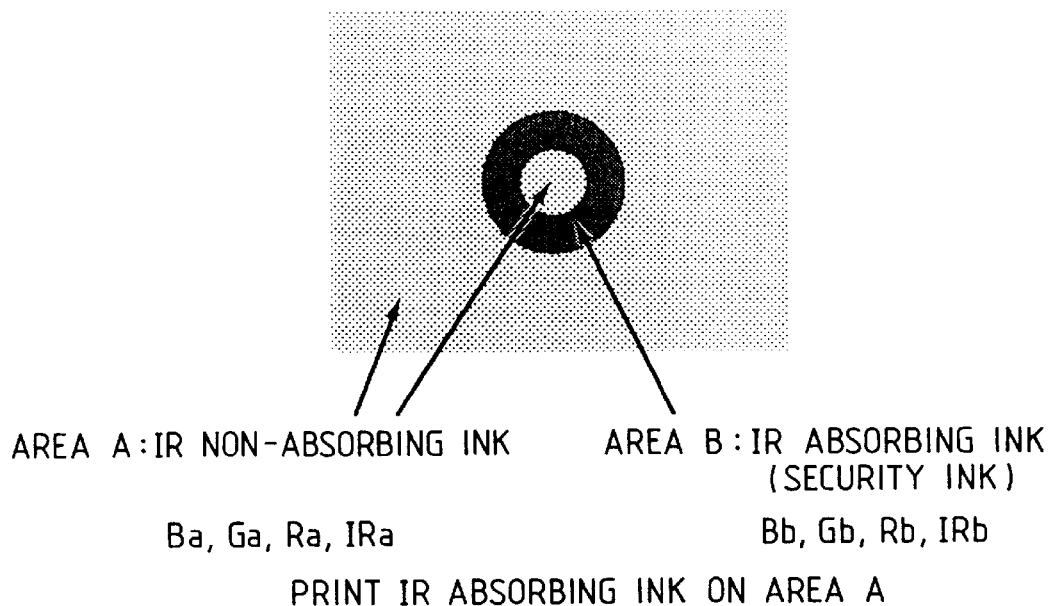
FIGS. 45A and 45B illustrate differences in infrared read data obtained at a specific pattern and at around the same.
Figure 45B:
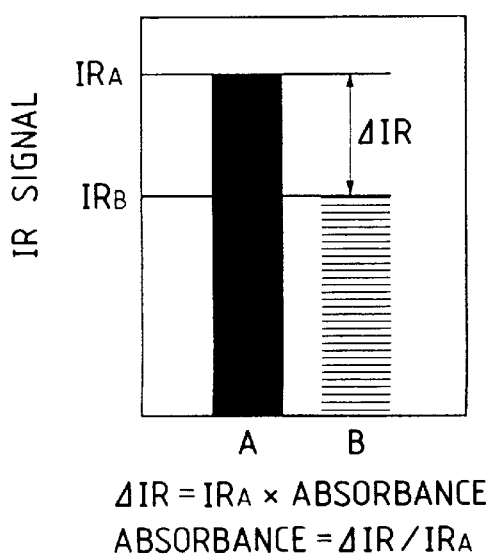

Described with reference to FIGS. 45A and 45B is an outline of detection of the difference between the visible color signals and the difference between the infrared signals.

FIG. 45A shows a donut mark printed with the infrared absorbing ink (Security Ink) B indicated by an area B on the ground of the infrared transmitting ink A indicated by an area A. The color separation signals for the R, G and B visible lights, obtained from the area A, are represented by Ra, Ga and Ba, respectively, and an infrared light-amount signal is represented by IRa. Likewise, the color separation signals for the R, G and B visible lights, obtained from the area B, are represented by Rb, Gb and Bb, respectively, and an infrared light-amount signal is represented by IRb. It is assumed that the infrared absorbing ink B is prepared by blending the infrared absorbing material with the infrared transmitting ink A. As shown in FIG. 45B, with the infrared absorbance of the mixed infrared absorbing material being defined, then a difference ΔIR between the infrared signal values of IRa and IRb is given as follows:

$$\Delta IR = IRa \times (\text{Absorbance}).$$

According to this equation, the infrared absorbance of the incorporated infrared absorbing material can be given by:

$$(\text{Absorbance}) = \Delta IR / IRa.$$

The ΔIR/IRa is generally called a contrast of the IR signal. More particularly, the infrared absorbance not depending on the absolute values of IRa and IRb can be obtained by means of calculating the contrast IR.

In the same manner, to obtain a difference among visible colors, this embodiment calculates a contrast R, a contrast G and a contrast B according to the following equation. Absolute values are used for calculating the R, G and B contrasts because which reading values for the ink A and the ink B is not necessarily determined.

Contrast $R=|Ra-Rb|/Ra=\Delta R/Ra$,

Contrast $G=|Ga-Gb|/Ga=\Delta G/Ga$,

Contrast $B=|Ba-Bb|/Ba=\Delta B/Ba$, and

Contrast $IR=(IRa-IRb)/IRa=\Delta IR/IRa$.

It is determined whether the above mentioned "1. a difference between visible color signals is small and a difference between infrared signals is large" is satisfied.

Figure 46:
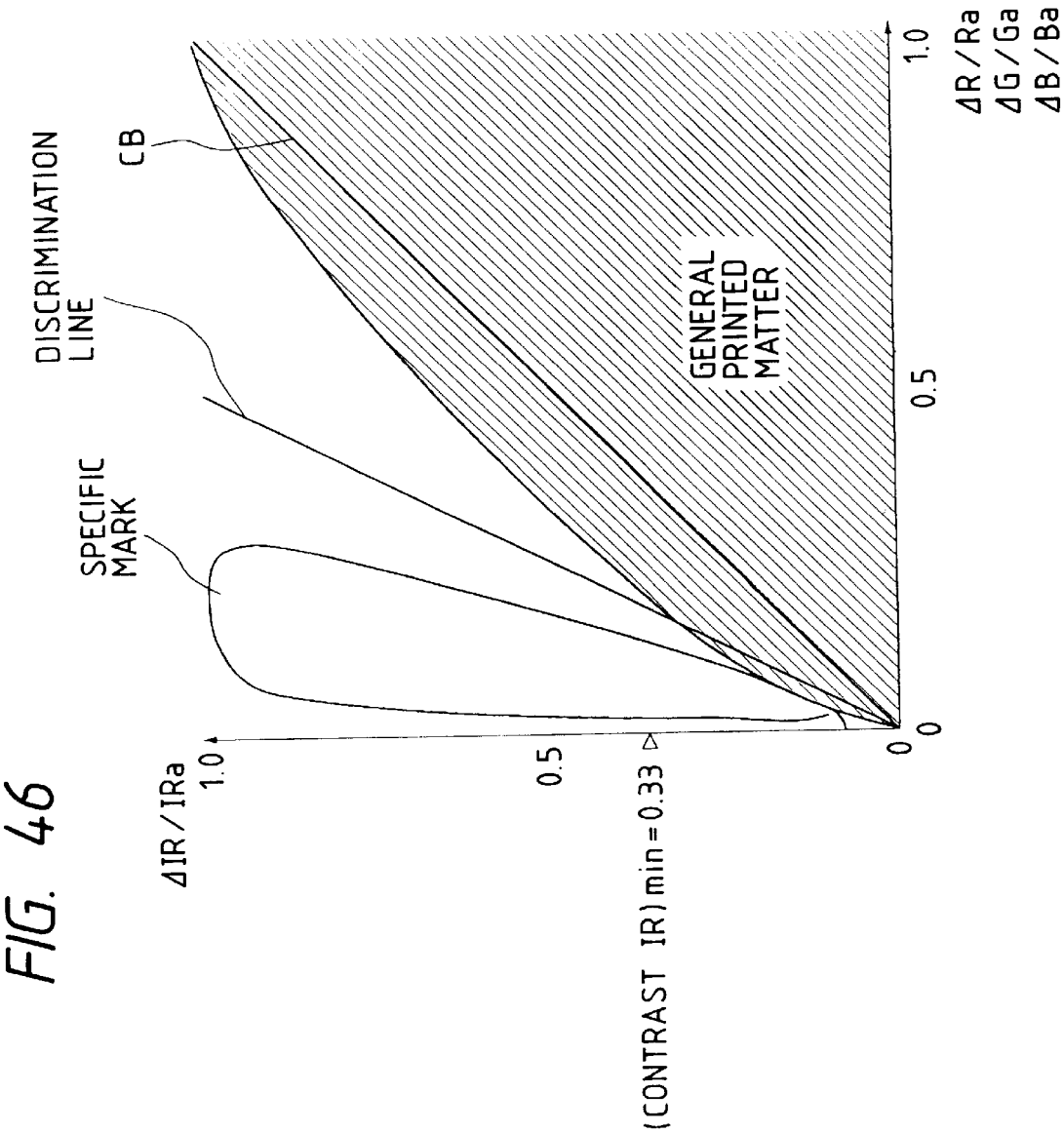
FIG. 46 shows data characteristics of a visible light reading data and an infrared read data on a specific mark and a general printed matter.

In FIG. 46, an abscissa represents the contrast of the visible color separation signals while an ordinate represents the contrast of the infrared signal.

In FIGS. 45A and 45B, smaller difference between the visible color signals in the areas A and B indicates that the contrast of the visible color separation signals is small. On the contrary, larger difference between the visible color signals in the areas A and B indicates that the contrast of the visible color separation signals is large. In this way, the specific mark according to this embodiment can be plotted on the area close to the ordinate.

In FIG. 46, a straight line CB inclined at an angle of 45° relative to the horizon is the characteristic curve of the carbon black when it is used as the infrared absorbing material. When the ink B is prepared by incorporating the carbon black into the ink A, the contrasts between the ink A and the ink B are approximately similar in the visible and infrared regions because the carbon black has a uniform light absorbing characteristic to the light with the wavelengths in the range of from the ultraviolet to the infrared. This means that, in considering an effect of the carbon black that is widely used in printed matters, the cross-hatched area corresponds to the characteristic expected to be obtained in a general printed matter. The cross-hatched area extends above the CB line because of the back-through characteristic of a general printed matter.

Figure 47A:
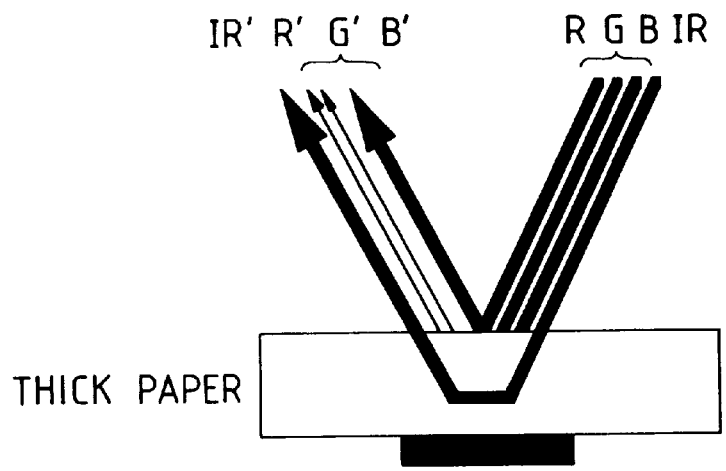
FIGS. 47A and 47B are views for use in describing optical characteristics of the infrared directed to a back-through original.
Figure 47B:
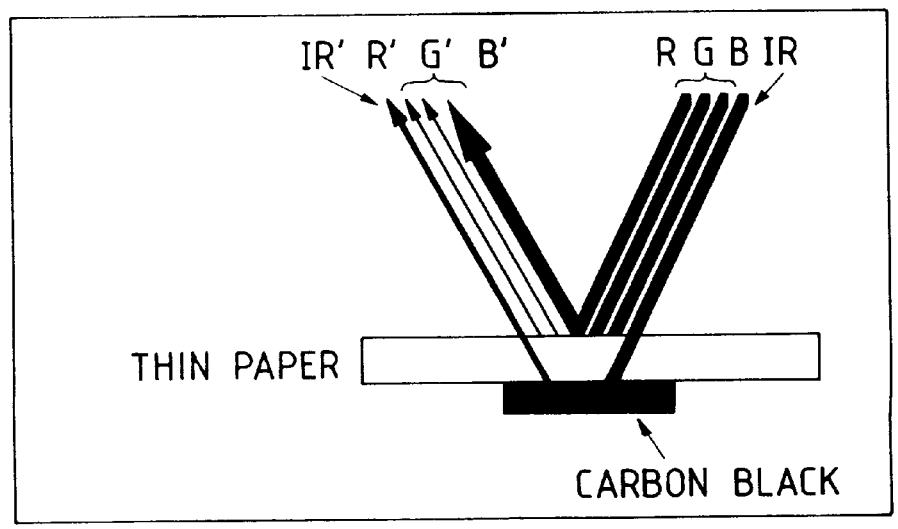

FIG. 47A illustrates back-through of a relatively thick paper having the carbon black printed on the back thereof. The infrared information reaches the deep inside of the paper because it involves wavelengths longer than those of visible light. As a result of this, the infrared radiation reaches to the back of the paper if the paper used is relatively thin. The infrared is absorbed by the carbon black laid on the back of the paper, causing less light being reflected from the back. In this event, no visible light reaches to the back of the paper. Accordingly, the visible light is not affected by the carbon black. The back-through is responsible for the phenomenon that the contrast of the visible information is small though the contrast of the infrared information is large. As a result, the characteristic of the general printed matter extends above the CP line in FIG. 46.

In this embodiment, the read wavelength for the infrared is restricted to 850 nm by the far-infrared cutoff filter 231 and thus an affect of the back-through can be reduced or even eliminated.

In this embodiment, a judgment line is so determined that the inclination angle thereof is as double as that of the CB line to detect the specific mark. This means that a pattern causing the contrast of the visible signals that is large to some extent will be determined as the specific mark when the contrast of the infrared signal is much larger than that. This makes it possible to provide the specific mark by means of setting the large contrast of the infrared signal even when the visible color signals of the inks A and B are not substantially equal to each other.

By detecting the specific mark according to the ratio of the contrast of the visible information and the invisible (such as infrared) information, it becomes possible to allow to a certain degree the difference between colors of the inks A and B upon being printed. Consequently, the yields of the printed matter can be improved in printing the specific mark on the valuable securities or the banknotes.

As apparent from FIG. 46, a region where the infrared contrast is small contains a region where the discrimination line of the specific mark crosses the general printed matter. In this embodiment, the minimum value of the infrared contrast is set into 0.33 to eliminate the latter region. The infrared contrast smaller than 0.33 is not determined as the specific mark.

To calculate the visible contrast, the differential signals $\Delta R$, $\Delta G$ and $\Delta B$ are divided by the values of the R, G and B reading signals. In this event, the smaller the absolute values of the R, G and B signal values are, the larger a contrast error obtained by the division becomes. With this respect, when the absolute value of any one of the Ra, Ga and Ba reading' signals is equal to or smaller than a predetermined value, then the contrast is not applied for the color signal in question. Instead, judgment for that color is made visibly by using the difference between the inks A and B. In this embodiment, one-third of the maximum range (255) of the reading signal is used to determine that the reading signal value of Ra, Ga and Ba that is equal to or smaller than eighty-four levels differs from the ink B by eight level or smaller.

In addition, when the reading signal values of Ra, Ga and Ba all read a mark close to black that is equal to or smaller than a predetermined value of eighty-four levels, evaluation using the contrast is impossible and thus the case will be out of the judgment.

The above mentioned conditions of judgment are shown in Table in FIG. 48.

In FIG. 48, a condition 1 is the one where either one of the Ra, Ga and Ba signal values is larger than the eighty-four levels; a condition 2 is the one where the infrared contrast is equal to or larger than 0.33; conditions 3, 4 and 5 are judgment conditions using the infrared contrast according to the R, G and B signal values, respectively. When all of the first through fifth conditions are satisfied, then the above mentioned "1. a difference between visible color signals is small and a difference between infrared signals is large" is determined.

An example of a specific judgment circuit is described below along with the description about "2. a pattern has a donut-shape."

<Explanation of Specific Mark-Detection Means>

Figure 41:
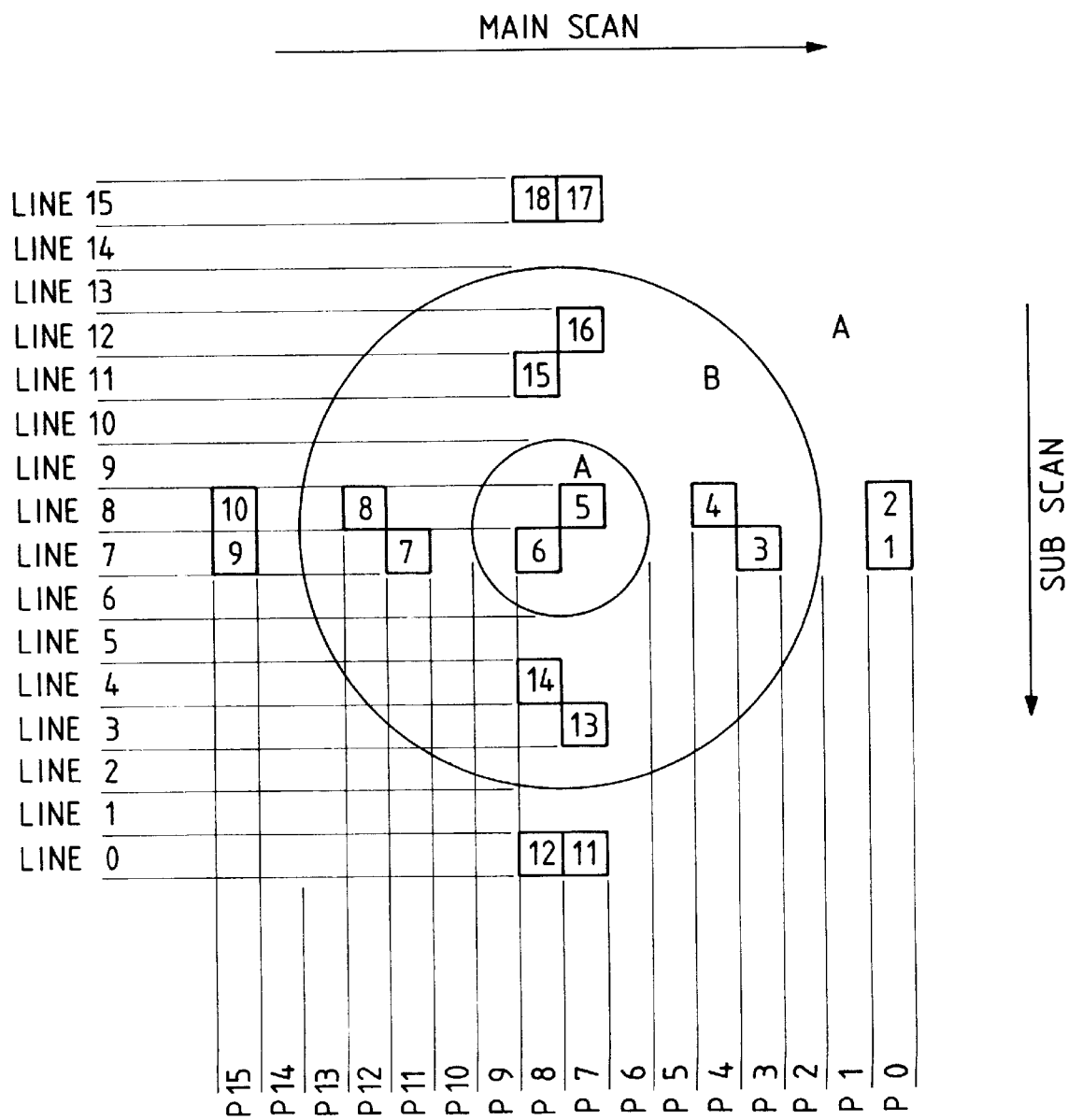
FIG. 41 is a view showing pixels near and around a specific pattern.

FIG. 41 shows a donut-shaped mark of four-pixel linear width and pixel groups looked up for detecting the mark. In this embodiment, the specific donut-shaped mark is discriminated in the range of 16 pixels and 16 lines for the main and sub scan operations, respectively, including the periphery of the donut-shaped mark, 12 pixels by 12 pixels (about 750 $\mu$m×750 $\mu$m). In the figure, numbers P0 to P15 are applied to the main scan direction, in which the smaller number corresponds to the newer data. In addition, line numbers 1 to 15 are applied to the sub scan direction, in which the smaller number corresponds to the newer read line.

For the main scan direction or the direction of alignment of the CCD pixels, the pixels depicted by numerals 1 to 10 are looked up by using information of two lines, i.e., lines 7 and 8. Then averages value of the adjacent two pixels (1 and 2, 3 and 4, 5 and 6, 7 and 8, 9 and 10) are calculated for every one reading signal of R, G, B and IR to remove any noise components upon reading. In addition, for the sub scan direction perpendicular to the pixel alignment direction of the CCD, the pixels depicted by numerals 11 to 18 are looked up by using information of two pixels, i.e., P7 and P8. Then averages value of the adjacent two pixels (11 and 12, 13 and 14, 15 and 16, 17 and 18) are calculated for every one reading signal of R, G, B and IR to remove any noise components upon reading.

Figures 54, 54A:
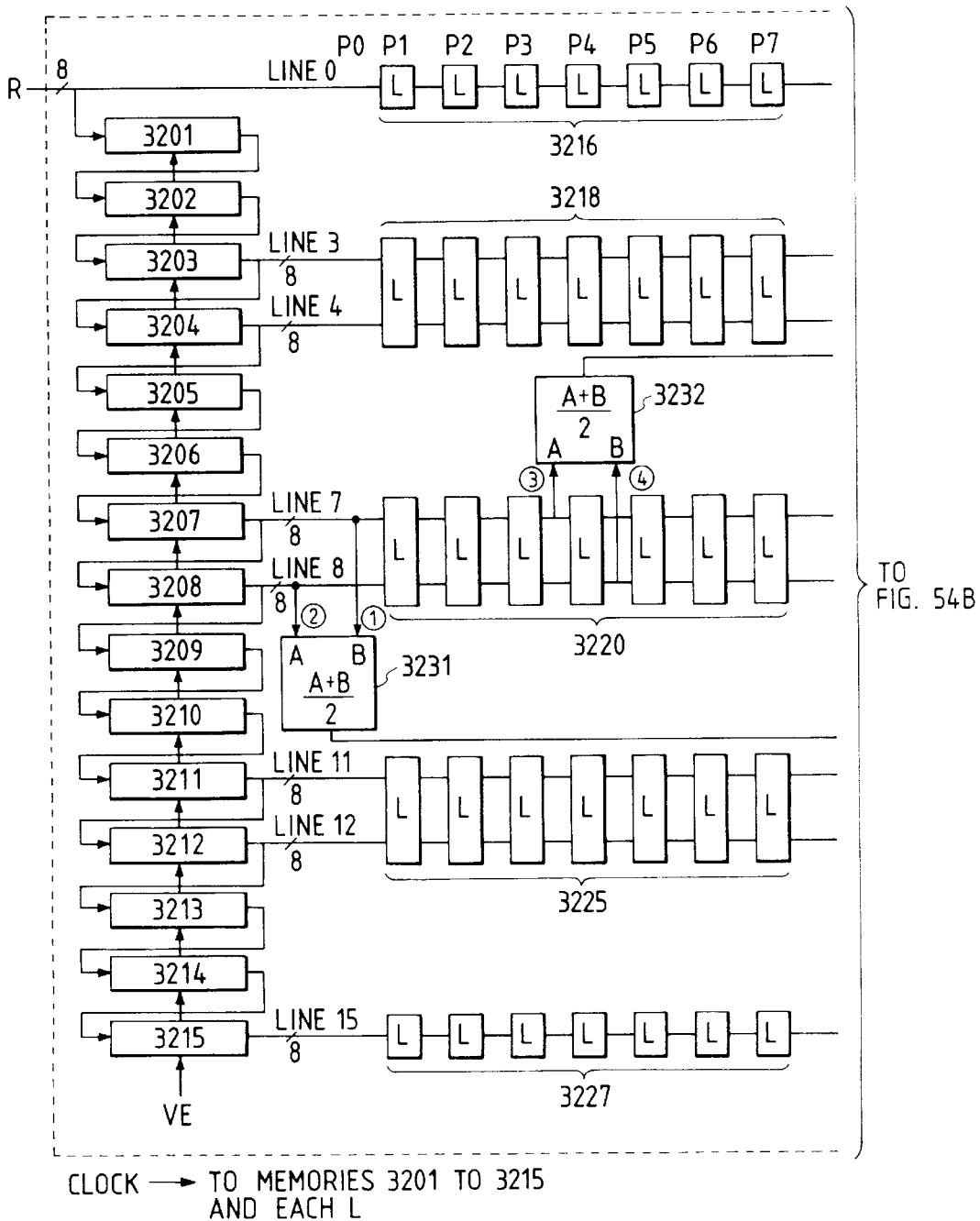
FIG. 54 is comprised of FIGS. 54A and 54B showing a block diagram showing a discrimination unit.
Figure 54B:
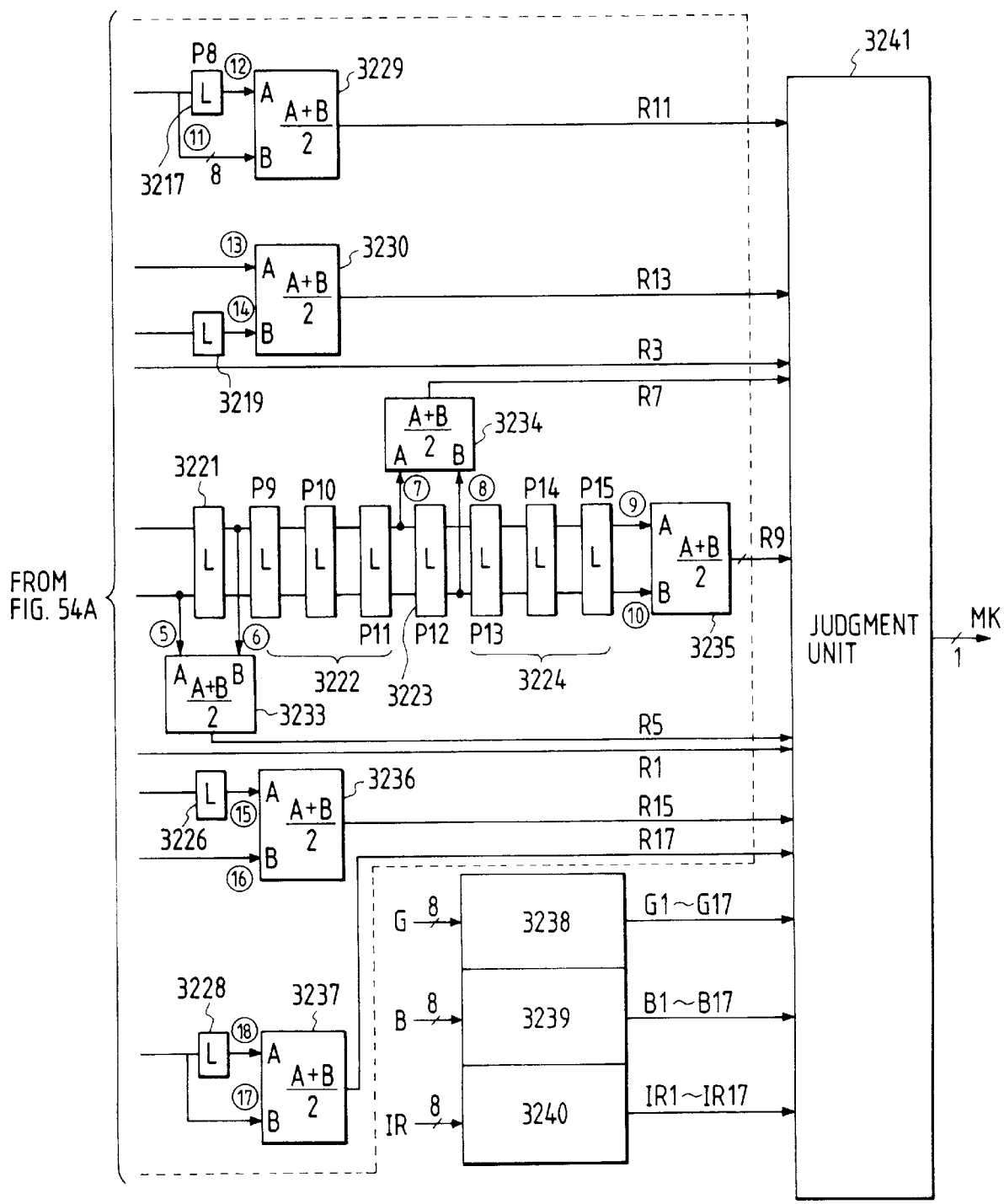

Details of the circuit for obtaining the average from the two-dimensional signal alignment and the judgment unit comprising the discrimination unit 3 according to the judgment conditions shown in FIG. 48 are shown in FIGS. 54A and 54B.

In FIGS. 54A and 54B, reference numerals 3201 through 3215 represent image data line delaying units for the R signal each of which is composed of FIFO memories. Each of the image data line delaying units initialize an address pointer of write/read at the low level section of the image valid section signal VE in the main scan direction. Each of the image data line delaying units also write/read data for every one pixel in response to the CLOCK signal. As a result, the R signal is delayed by one line in each FIFO memory.

When the R signal supplied to the discrimination unit 3 in FIGS. 14A and 14B corresponds to the line 0, a signal corresponding to the line 3, obtained by delaying the original signal by three lines, is read out of the FIFO 3203. Likewise, an image data corresponding to the line 4 is read out of the FIFO 3204 and image data corresponding to the lines 7, 8, 11, 12 and 15 are read out of the FIFO 3207, 3208, 3211, 3212 and 3215, respectively. The image signals simultaneously read out of the FIFO correspond to the same pixel in the main scan direction in FIG. 41.

The signal line 0 supplied to the discrimination unit 3 is sent to a latch group 3216. The latch group 3216 consists of latches of seven stages. The data latched in each latch is delayed by the amount corresponding to one pixel in response to the CLOCK signal. Accordingly, the output of the latch group 3216 is the pixel depicted by the number 11 (line 0, pixel position P7) in FIG. 41. The output of the latch group 3216 is supplied to a latch 3217 which, in turn, produces the pixel data having the number 12 in FIG. 41. The image data of the numbers 11 and 12 are supplied to an arithmetic unit 3229. The arithmetic unit 3229 produces an average value R11 of the received data. Likewise, outputs of the FIFO 3203 and FIFO 3204 are supplied to a latch group 3218 which, in turn produces the pixel having the number 13 in FIG. 41 and, through a latch 3219, the pixel having the number 14. The image data of the numbers 13 and 14 are supplied to an arithmetic unit 3230 where an average thereof is calculated to produce an average value R13. In addition, the pixel data having the numbers 1 and 2 are supplied from the FIFO 3207 and 3208, respectively, to an arithmetic unit 3231 where an average of the pixel data having the numbers 1 and 2 is calculated to produce an average value R1. An average value R3 of the pixels having the numbers 3 and 4, extracted from the halfway of the latch group 3220, is produced from an arithmetic unit 3232. An average value R5 of the pixels having the numbers 5 and 6, supplied from the latch group 3220 and from the latch 3221, respectively, is produced from an arithmetic unit 3233. An average value R7 of the pixels having the numbers 7 and 8, supplied from the latch group 3222 and from the latch 3223, respectively, is produced from an arithmetic unit 3234. An average value R9 of the pixels having the numbers 9 and 10, supplied from the latch group 3224, is produced from an arithmetic unit 3235. An average value R15 of the pixels having the numbers 16 and 15, supplied from the latch group 3225 and from the latch 3226, respectively, is produced from an arithmetic unit 3236. An average value R17 of the pixels having the numbers 17 and 18, supplied from the latch group 3227 and from the latch 3228, respectively, is produced from an arithmetic unit 3237.

An average of them are supplied to a judgment unit 3241.

Similar processing is repeated for the G signal, the B signal and the IR signal. More particularly, circuits 3238 through 3240 are similar in structure to those enclosed by a dotted line. Accordingly, the circuit 3238 produces average values G1, G3, G5, G7, G9, G11, G13, G15 and G17 for the G signal. The circuit 3239 produces average values B1, B3, B5, B7, B9, B11, B13, B15 and B17 for the B signal. The circuit 3240 produces average values IR1, IR3, IR5, IR7, IR9, IR11, IR13, IR15 and IR17 for the IR signal. These averages are supplied to the judgment unit 3241 and used for detection and discrimination of the specific mark.

Before describing an operation of the judgment unit 3241, reflection of the visible and infrared lights at and around the specific mark is described with reference to the drawing.

FIG. 53 is a view showing geometry of visible and infrared radiation reflected from various originals and corresponding states of infrared reading signals. FIG. 53 is a cross-section of the specific original identification pattern shown in FIG. 42. An infrared absorbing ink 2802 is on the face of a paper 2801. The incident light from the halogen lamp 205 is reflected from the infrared absorption pattern and its peripheral portion. In FIG. 53, (a-1), R1, G1, B1, IRI1, R1', G1', B1' and IRI1' are values obtained by means of sensing the reflected light by the R, G, B and IR sensors and converting these analog signal to the digital ones, following which the shading correction and line delay processings are made.

These read values are given, for the R, G and B visible information, as the spectral characteristics corresponding to a combination of characteristics of the R, G and B sensors in FIG. 9 and the infrared cutoff filter in FIG. 10. In this event, R represents the light with wavelengths primarily in the 590 to 620 nm range, G represents the light with wavelengths primarily in the 500 to 580 nm range and B represents the light with wavelengths primarily in the 400 to 480 nm range.

The infrared information, IR, is given as the spectral characteristic obtained by combining or multiplying the characteristics of R, B (the cross-hatched range in FIG. 9) and the far infrared cutoff characteristics shown in FIG. 52. More specifically, IR represents the light with wavelengths primarily in the 710 to 850 nm.

The light in each of the wavelength ranges R, G, B and IR is corrected independently, during the shading correction, in sensitivity by using the standard white plate having a uniform reflectance to each wavelength in FIG. 7. In this embodiment, the light is corrected in sensitivity such that the R, G, B and IR reading values are equal to each other to the original having a relatively uniform spectral characteristic as the standard white plate as shown in FIG. 7.

In FIG. 53, (a-2) is a graphical representation of the reading signal values obtained for the infrared absorption pattern and the peripheral portion thereof after the shading correction of the R, G, B and IR.

The specific pattern in this embodiment has substantially same color in the visible region as shown in FIG. 53 and the signal values of the visible R, G, and B become equal accordingly.

The concentration of the infrared absorbing substances contained in the infrared absorbing ink is so adjusted that the infrared reading signal IR 2 obtained from the infrared absorption pattern is smaller than the minimum values of the visible information R2, G2 and B2 for the same infrared absorption pattern. The visible color of the specific original identification pattern consists of colors which are relatively high in saturation. This means that the minimum values of the visible color separation signals R, G and B for the identification pattern become relatively small.

When the infrared absorbing ink does not satisfy the above mentioned conditions, the gain constant used for the shading correction on the above mentioned IR reading signal may be decreased, ensuring that the IR 2 signal obtained from the infrared identification pattern to be detected is smaller than the minimum values of R2, G2 and B2.

Turning back to FIGS. 54A and 54B, the operation of the judgment circuit 3241 is described with the judgment conditions shown in FIG. 48 being taken into consideration.

Figure 49:
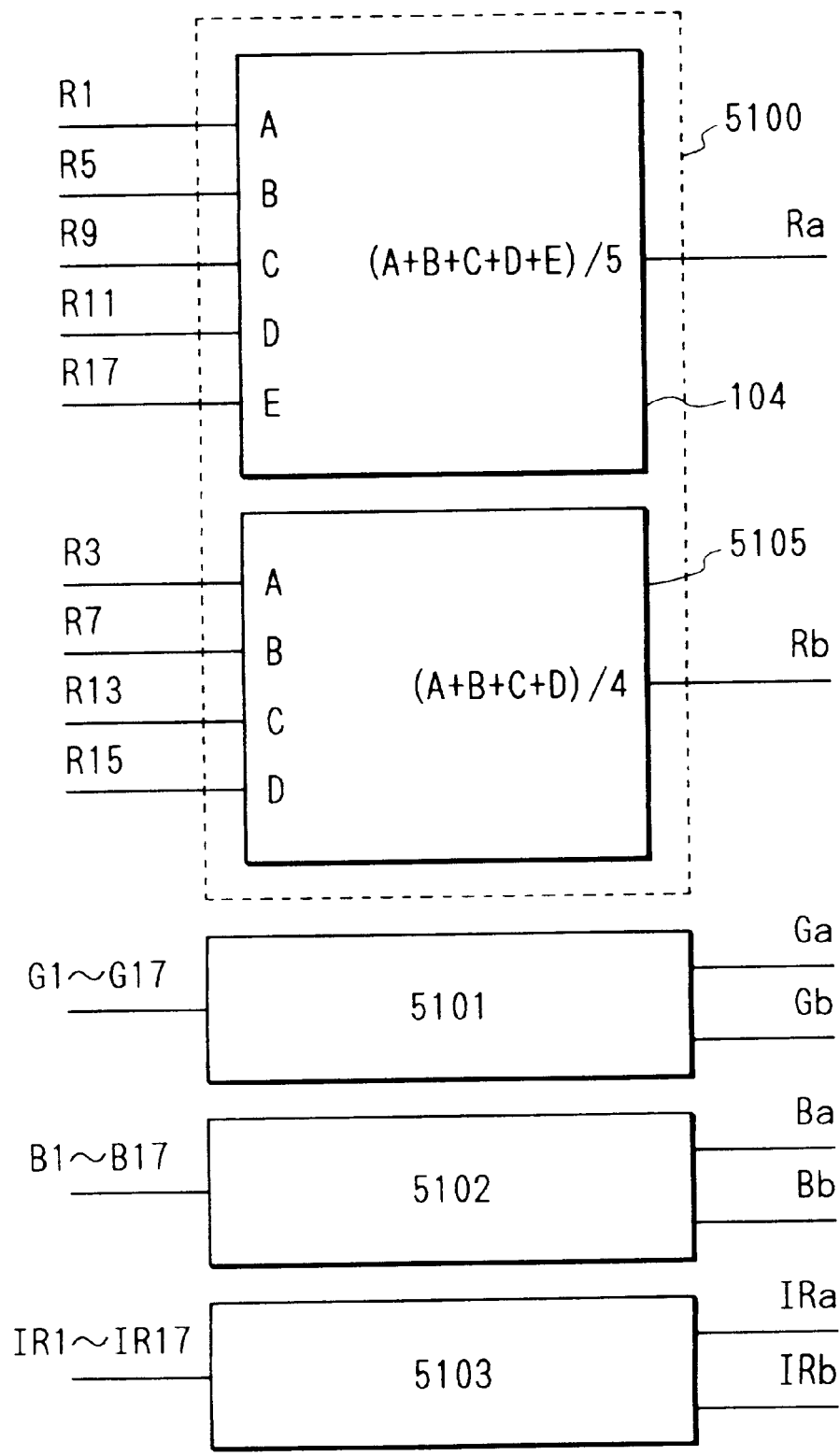
FIG. 49 is a block diagram of an equalizing circuit.
Figure 50:
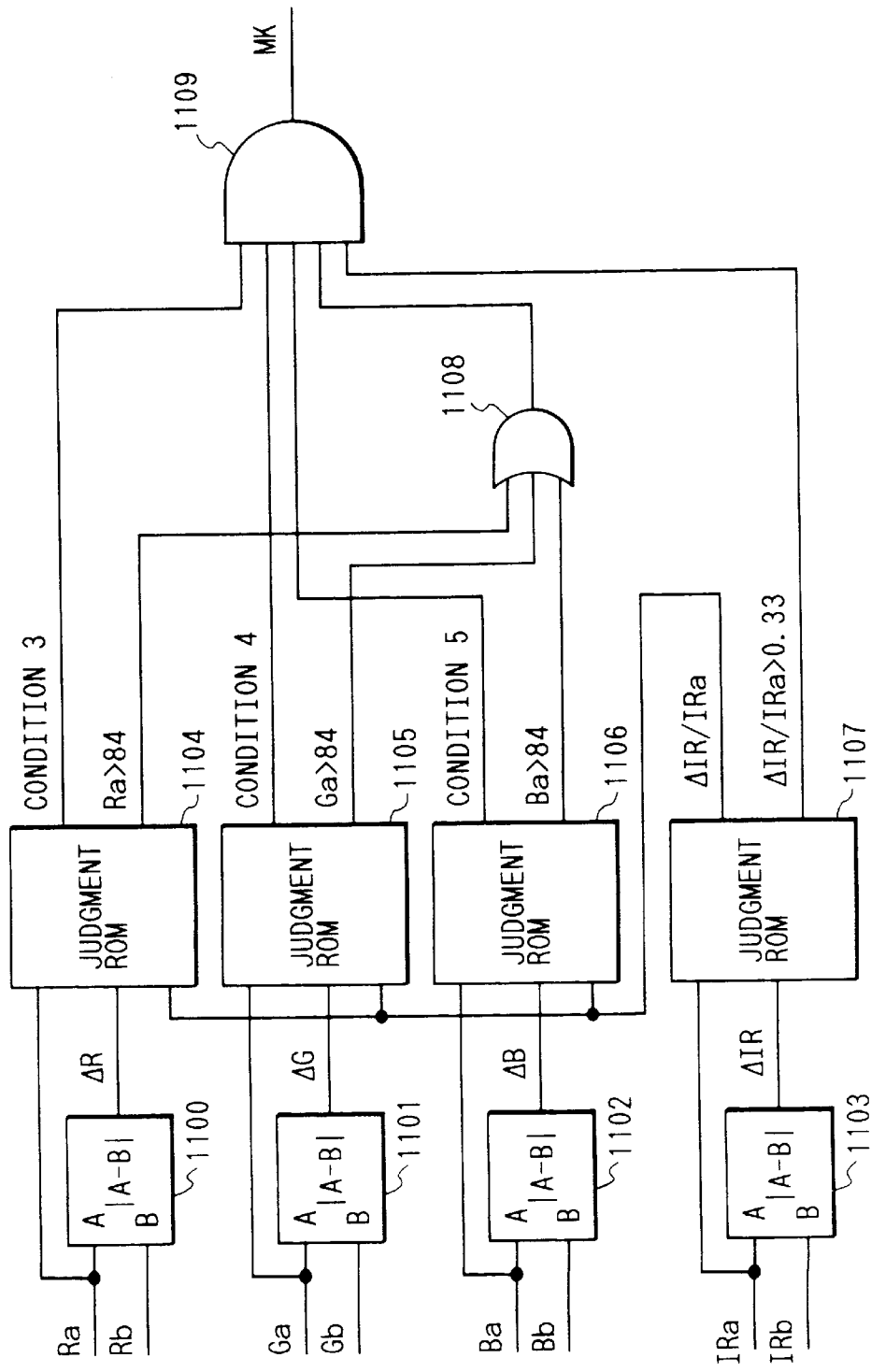
FIG. 50 is a block diagram of a specific mark judgment circuit.

The judgment unit 3241 comprises an average value calculation circuit shown in FIG. 49 and a circuit shown in FIG. 50. In FIG. 49, a circuit 5100 comprises average circuits 5104 and 5105. The average circuit 5104 receives the average values R1, R5, R9, R11 and R17 of the R signal for the area A in FIG. 41 obtained by the circuit shown in FIGS. 54A and 54B. The average circuit 5104 produces the average value R. In FIG. 49, circuits 5101 through 5103 are similar in structure to the circuit 5100. Accordingly, the circuit 5101 produces the average value Ga for the area A and the average value Gb for the area B of the G signal. The circuit 5102 produces the average value Ba for the area A and the average value Bb for the area B of the B signal. The circuit 5103 produces the average value IRa for the area A and the average value IRb for the area B of the IR signal. These average values are supplied to the judgment circuit shown in FIG. 50. In FIG. 50, circuits 1100 through 1103 are arithmetic circuits for calculating an absolute value of the difference of the received two signals. More particularly, the outputs of the circuits 1100 through 1103 correspond to ΔR, ΔG, ΔB and ΔIR, respectively, shown in FIG. 48. A judgment ROM 1107 receives the signal IRa and the signal ΔIR to produce a judgment result of the calculation result ΔIR/IRa and ΔIR/IRa>0.33. As a result, a signal "1" of one bit is produced when ΔIR/IRa>0.33 and otherwise, a signal "0" is produced. In this way, it is possible to avoid incorrect judgment by means of excluding the region where the IR contrast is small out of the object of the mark detection. The calculation result ΔIR/IRa obtained by the judgment ROM 1107 is supplied to judgment ROMs 1104 through 1106. The judgment ROM 1104 receives ΔIR/IRa, Ra and ΔIR to carry out judgment. The judgment ROM 1104 produces a signal "1" of one bit when the condition 3 shown in FIG. 48 is satisfied and otherwise, produces a signal "0". On the other hand, the judgment ROM 1104 produces a signal "1" of one bit when Ra is received Ra>84 and otherwise, produces a signal "0." The judgment ROMs 1105 and 1106 are similar in operation to the judgment ROM 1104 to produce the respective judgment results. A reference numeral 1108 represents an OR gate. An output of the OR gate 1108 matches to the judgment result of the condition 1 in FIG. 48. In addition, a reference numeral 1109 represents an AND gate. The output MK of the AND gate 1109 indicates "1" when all of the conditions 1 to 5 in FIG. 48 are satisfied, indicating that the specific mark is detected.

While the above mentioned embodiment has thus been described in conjunction that, for example, the signal Ra is introduced with the average of R1, R5, R9, R11 and R17 supplied to the circuit 5104, the accuracy of judgment can be improved by means of adding a processing circuit that is capable of determining the signal levels of the five signals are approximated and invalidating the specific mark detection signal MK when approximation is not obtained. It is also true for the circuit 5205 and preferably, similar processing is made in the circuits 5101 through 5103.

That's all for the description of the judgment unit 3241.

The result of the judgment, MK, is supplied to the latch 3022 in FIGS. 14A and 14B. The output of the latch is supplied to the input port P10 of the CPU 3018. In response to this, the CPU recognizes that the specific mark is detected. The CPU clears the latch 3022 by using the output port P9 signal before initiation of the copy sequence and is ready for the subsequent pattern detection.

Normal copying operation and the n identification mark judging operation accompanying thereto carried out under control by the CPU 3018 are similar to those described in conjunction with FIG. 16.

The above mentioned embodiments are equally applicable to a case where a first region is recorded using a first recording agent having a first characteristic in an invisible region; a second region peripheral to the first region is recorded using a second recording agent having a second characteristic different from the first characteristic in the invisible region; and a third region peripheral to the second region is recorded using the first recording agent in the invisible region. In such a case, similar operation can be applied to detect a pattern to those described above. In addition, the pattern may have other suitable shapes including symmetric and concentric patterns.

<Modifications>

While the above embodiments have thus been described in conjunction with detection of a specific mark, the present invention is also applicable to detection of a mark having an infrared reflecting characteristic provided on a base having an infrared absorbing characteristic.

In addition, the present invention is not limited to discrimination of a particular infrared mark. It can also be applied to detect a mark having an absorbing or reflecting characteristic to the ultraviolet radiation.

Further, a mark having a fluorescent characteristic to other wavelength regions other than the visible region may also used instead of using the one having the absorbing or reflecting characteristic. In such a case, the invisible reading signal may be compared with the visible reading signal.

As mentioned above, according to the embodiments of the present invention, the contrast of the visible reading signals supplied from the mark and ground portions and the contrast of the invisible reading signal are obtained upon reading and detecting the specific mark, thereby detecting the specific mark according to the correlation between the visible and the invisible contrasts. As a result, it becomes possible to detect the specific mark without causing incorrect judgment of the printed information present in a general printed matter as the specific mark. In addition, the specific mark has a donut-shape and thus it is possible to avoid the specific mark to be out of the detection due to biased positioning of the original.

As mentioned above, according to the present invention, it is possible to detect a specific pattern in a higher accuracy by an image processing device and to provide a pattern readily to be detected in a high accuracy.

The above mentioned concepts of the present invention may be applied to any other devices and method in a single or a combined form.

The judgment ROMs described above may be replaced with RAMs, gate arrays or softwares of the CPU to carry out equivalent judgment operation. In addition, the invisible information may be any one of infrared and ultraviolet radiation. The visible information is not limited to the RGB signal and may be other colors such as Lab and YIQ.

It should be understood that the present invention is not limited to the particular embodiment shown and described above, and various changes and modifications may be made without departing from the spirit and scope of the appended claims.

What is claimed is:

1. An image processing apparatus comprising:
    first reading means for obtaining a first signal corresponding to visible information on an original;
    second reading means for obtaining a second signal corresponding to invisible information on the original; and
    comparing means for performing a comparison by using the first and second signals in order to discriminate a predetermined pattern,
    wherein said comparing means judges whether said second signal is based on the information obtained from the face of the original or on the information obtained from the back of the original.

2. An image processing apparatus comprising:
    first reading means for obtaining a first signal corresponding to visible information on an original;
    second reading means for obtaining a second signal corresponding to invisible information on the original; and
    comparing means for performing a comparison by using the first and second signals in order to discriminate a predetermined pattern,
    wherein said comparing means outputs a correlation between a signal ratio of the invisible information of a first region and a second region on the original and a signal ratio of the visible information of said first and second regions.

3. An apparatus according to claim 2, wherein said comparing means compares the signal ratio of the invisible information with a predetermined value to determine whether the signal ratio of the invisible information is larger than the predetermined value.

4. An image processing apparatus comprising:
    input means for inputting signals of plural components according to an image;
    detection means for detecting, by using the signals of the plural components inputted by said input means, presence or absence of a specific pattern of a color which is visibly and substantially the same as a background color of the image and which has characteristic information on a concentric circle; and
    output means for outputting a signal to control a recording process, in accordance with the detection of the specific pattern.

5. An apparatus according to claim 4, wherein the signals of the plural components are signals which have been signal corrected.

6. An apparatus according to claim 4, wherein the detection of said detection means is performed by pattern matching.

7. An apparatus according to claim 4, wherein said image processing apparatus is a judgment circuit.

8. An apparatus according to claim 4, wherein said image processing apparatus is a color copy machine.

9. An image processing method comprising:
    an input step of inputting signals of plural components according to an image;
    a detection step of detecting, by using the signals of the plural components inputted in said input step, presence or absence of a specific pattern of a color which is visibly and substantially the same as a background color of the image and which has characteristic information on a concentric circle; and
    an output step of outputting a signal to control a recording process, in accordance with the detection of the specific pattern.

10. A method according to claim 9, wherein the signals of the plural components are signals which have been signal corrected.

11. A method according to claim 9, wherein the detection in said detection step is performed by pattern matching.

12. A method according to claim 9, wherein said image processing method is performed by a judgment circuit.

13. A method according to claim 9, wherein said image processing method is performed by a color copy machine.

14. An image processing apparatus comprising:
    input means for inputting signals of plural components according to an image;
    detection means for detecting, by using the signals of the plural components inputted by said input means, presence or absence of a specific pattern of a color which has characteristic information on a plurality of circles; and
    output means for outputting a signal to control a recording process, in accordance with the detection of the specific pattern.

15. An apparatus according to claim 14, wherein the signals of the plural components are signals which have been signal corrected.

16. An apparatus according to claim 14, wherein the detection performed by said detection means is performed by pattern matching.

17. An apparatus according to claim 14, wherein said image processing apparatus is a judgment circuit.

18. An apparatus according to claim 14, wherein said image processing apparatus is a color copying machine.

19. An apparatus according to claim 14, wherein said detection means detects colors and patterns.

20. An apparatus according to claim 14, wherein said input means inputs the signals of plural components read by an image scanner.

21. An apparatus according to claim 14, wherein the recording process is color printing.

22. An apparatus according to claim 14, further comprising control means for controlling a color printing process of the signals of plural components in accordance with the signal outputting of said output means.

23. An apparatus according to claim 22, wherein said control means inhibits normal color printing.

24. An apparatus according to claim 22, wherein said control means controls any of a solid painting process, a hatching process, stop of the printing, and power off of said image processing apparatus.

25. An image processing apparatus comprising:
    input means for inputting signals of plural components according to an image;
    detection means for detecting, by using the signals of the plural components inputted by said input means, presence or absence of a specific pattern of a color, wherein, in the specific pattern, a predetermined pattern is visibly arranged along a predetermined-shape periphery; and output means for outputting a signal to control a recording process, in accordance with the detection of the specific pattern.

26. An apparatus according to claim 25, wherein the signals of the plural components are signals which have been signal corrected.

27. An apparatus according to claim 25, wherein the detection performed by said detection means is performed by pattern matching.

28. An apparatus according to claim 25, wherein said image processing apparatus is a judgment circuit.

29. An apparatus according to claim 25, wherein said image processing apparatus is a color copying machine.

30. An apparatus according to claim 25, wherein said detection means detects colors and patterns.

31. An apparatus according to claim 25, wherein said input means inputs the signals of plural components read by an image scanner.

32. An apparatus according to claim 25, wherein the recording process is color printing.

33. An apparatus according to claim 25, further comprising control means for controlling a color printing process of the signals of plural components in accordance with the signal outputting of said output means.

34. An apparatus according to claim 33, wherein said control means inhibits normal color printing.

35. An apparatus according to claim 33, wherein said control means controls any of a solid painting process, a hatching process, stop of the printing, and power off of said image processing apparatus.

36. An apparatus according to claim 25, wherein the predetermined shape is a circle.

37. An apparatus according to claim 25, wherein the predetermined pattern is a circular pattern.

38. An apparatus according to claim 25, wherein the specific pattern the plural predetermined patterns are arranged along the predetermined-shape periphery.

39. An image processing method for use in an image processing apparatus, said method comprising the steps of:
inputting signals of plural components according to an image;
detecting, by using the signals of the plural components inputted in said inputting step, presence or absence of a specific pattern of a color which has characteristic information on a plurality of circles; and
outputting a signal to control a recording process, in accordance with the detection of the specific pattern.

40. A method according to claim 39, wherein the signals of the plural components are signals which have been signal corrected.

41. A method according to claim 39, wherein said detecting step is performed by pattern matching.

42. A method according to claim 39, wherein the image processing apparatus is a judgment circuit.

43. A method according to claim 39, wherein the image processing apparatus is a color copying machine.

44. A method according to claim 39, wherein said detecting step includes detecting colors and patterns.

45. A method according to claim 39, wherein said inputting step includes inputting the signals of plural components read by an image scanner.

46. A method according to claim 39, wherein the recording process is color printing.

47. A method according to claim 39, further comprising the step of controlling a color printing process of the signals of plural components in accordance with the signal outputting in said outputting step.

48. A method according to claim 47, wherein said controlling step includes inhibiting normal color printing.

49. A method according to claim 47, wherein said controlling step includes controlling any of a solid painting process, a hatching process, a stopping of the printing, and power-off of the image processing apparatus.

50. An image processing method for use in an image processing apparatus, said method comprising the steps of:
inputting signals of plural components according to an image;
detecting, by using the signals of the plural components inputted in said inputting step, presence or absence of a specific pattern of a color, wherein, in the specific pattern, a predetermined pattern is visibly arranged along a predetermined-shape periphery; and
outputting a signal to control a recording process, in accordance with the detection of the specific pattern.

51. A method according to claim 50, wherein the signals of the plural components are signals which have been signal corrected.

52. A method according to claim 50, wherein said detecting step is performed by pattern matching.

53. A method according to claim 50, wherein the image processing apparatus is a judgment circuit.

54. A method according to claim 50, wherein the image processing apparatus is a color copying machine.

55. A method according to claim 50, wherein said detecting step include detecting colors and patterns.

56. A method according to claim 50, wherein said inputting step includes inputting the signals of plural components read by an image scanner.

57. A method according to claim 50, wherein the recording process is color printing.

58. A method according to claim 57, further comprising the step of controlling a color printing process of the signals of plural components in accordance with the signal outputting in said outputting step.

59. A method according to claim 58, wherein said controlling step inhibits normal color printing.

60. A method according to claim 58, wherein said controlling step includes controlling any of a solid painting process, a hatching process, a stopping of the printing, and power-off of the image processing apparatus.

61. A method according to claim 50, wherein the predetermined shape is a circle.

62. A method according to claim 50, wherein the predetermined pattern is a circular pattern.

63. A method according to claim 50, wherein, in the specific pattern, the plural predetermined patterns are arranged along the predetermined-shape periphery.

64. An image processing apparatus comprising:
an input unit;
a pattern-detector arranged to receive signals input via the input unit such as to detect presence or absence in those signals of a specific pattern of a color which has characteristic information on a plurality of circles; and
an output unit arranged to receive a signal from said pattern-detector, indicative of a result of a detection performed by said pattern-detector, and to output a signal to control a recording process, in accordance with the detection of the specific pattern.

65. An apparatus according to claim 64, wherein the input signals are signals which have been signal corrected.

66. An apparatus according to claim 64, wherein the detection performed by said pattern-detector is performed by pattern matching.

67. An apparatus according to claim 64, wherein said image processing apparatus is a judgment circuit.

68. An apparatus according to claim 64, wherein said image processing apparatus is a color copying machine.

69. An apparatus according to claim 64, wherein said pattern-detector detects colors and patterns.

70. An apparatus according to claim 64, wherein said input unit inputs signals read by an image scanner.

71. An apparatus according to claim 64, wherein the recording process is color printing.

72. An apparatus according to claim 64, further comprising control means for controlling a color printing process of the input signals in accordance with the signal outputting of said output unit.

73. An apparatus according to claim 72, wherein said control means inhibits normal color printing.

74. An apparatus according to claim 72, wherein said control means controls any of a solid painting process, a hatching process, stop of the printing, and power off of said image processing apparatus.

75. An image processing apparatus comprising:

an input unit;

a pattern-detector, arranged to receive signals of plural components inputted via said input unit such as to detect therein presence or absence of a specific pattern of a color, wherein, in the specific pattern, a predetermined pattern is visibly arranged along a predetermined-shape periphery; and an output unit arranged to output a signal indicative of a result of detection by said pattern-detector to control a recording process, in accordance with the detection of the specific pattern.

76. An apparatus according to claim 75, wherein the signals of the plural components are signals which have been signal corrected.

77. An apparatus according to claim 75, wherein the detection performed by said pattern-detector is performed by pattern matching.

78. An apparatus according to claim 75, wherein said image processing apparatus is a judgment circuit.

79. An apparatus according to claim 75, wherein said image processing apparatus is a color copying machine.

80. An apparatus according to claim 75, wherein said pattern-detector detects colors and patterns.

81. An apparatus according to claim 75, wherein said input unit inputs the signals of plural components read by an image scanner.

82. An apparatus according to claim 75, wherein the recording process is color printing.

83. An apparatus according to claim 75, further comprising control means for controlling a color printing process of the signals of plural components in accordance with the signal outputting of said output unit.

84. An apparatus according to claim 83, wherein said control means inhibits normal color printing.

85. An apparatus according to claim 83, wherein said control means controls any of a solid painting process, a hatching process, stop of the printing, and power off of said image processing apparatus.

86. An apparatus according to claim 75, wherein the predetermined shape is a circle.

87. An apparatus according to claim 75, wherein the predetermined pattern is a circular pattern.

\* \* \* \* \*

UNITED STATES PATENT AND TRADEMARK OFFICE
CERTIFICATE OF CORRECTION

PATENT NO.   : 6,201,616 B1
DATED        : March 13, 2001
INVENTOR(S)  : Nobuatsu Sasanuma et al.

It is certified that error appears in the above-identified patent and that said Letters Patent is hereby corrected as shown below:

Column 1,
Line 29, "patent application" should read -- Patent Application --.

Column 2,
Line 12, "this" should read -- these --;
Line 13, "is" should read -- are -- and "it is" should read -- they are --;
Line 33, "first" should read -- a first --; and
Line 34, "signals" should read -- signal --.

Column 6,
Line 16, "of" should read -- of an --;
Line 21, "thick." should read -- thickness. --
Line 41, "by" should read -- by a --; and
Line 58, "distance." should read -- distances. --.

Column 7,
Line 21, "to" should read -- to a --.

Column 8,
Line 27, "in" should read -- is --;
Line 29, "is" should read -- are --; and
Line 65, "signal" should read -- signals --.

Column 10,
Line 6, "back" should read -- back- --; and
Line 58, "$D_B$)" should read -- $D_B$), --.

Column 14,
Line 13, "$X_{IR<XL}$," should read -- $X_{IR}<XL$, --; and
Line 58, "detection" should read -- detecting --.

Column 16,
Line 2, "$Y_{IR}<min(Y_R Y_G Y_B)$" should read -- $Y_{IR}>max(Y_R Y_G Y_B)$, --; and
Line 61, "detection" should read -- detecting --.

UNITED STATES PATENT AND TRADEMARK OFFICE
CERTIFICATE OF CORRECTION

PATENT NO.    : 6,201,616 B1
DATED         : March 13, 2001
INVENTOR(S)   : Nobuatsu Sasanuma et al.

It is certified that error appears in the above-identified patent and that said Letters Patent is hereby corrected as shown below:

Column 17,
Line 6, "also" should read -- also be --;
Line 15, "is" should read -- it is --;
Line 21, "characteristic" should read -- characteristics --;
Line 22, "appeared" should read -- appearing --;
Line 27, "is" should read -- it is --;
Line 32, "appear" should read -- appear to be the --; and
Line 49, "criminate" should read -- criminating --.

Column 18,
Line 31, "$IR_2/IR_3$" should read -- $IR_2/IR_1$ --.

Column 19,
Line 59, "has." should read -- it has --.

Column 20,
Line 2, delete "at all";
Line 26, "23" should read -- $\leqq$ --; and
Line 62, "appear" should read -- appear to be the --.

Column 21,
Line 34, "such" should read -- such a --; and
Line 37, "while" should read -- while it --.

Column 23,
Line 37, "embodiment," should read -- embodiments, --; and
Line 51, "non-uniformly" should read -- non-uniform --.

Column 24,
Line 62, "(n- -1)-" should read -- (n-1)- --; and
Line 64, "outputs" should read -- output --.

Column 25,
Line 24, "of" (first occurrence) should read -- of the --.

UNITED STATES PATENT AND TRADEMARK OFFICE
CERTIFICATE OF CORRECTION

PATENT NO.      : 6,201,616 B1
DATED           : March 13, 2001
INVENTOR(S)     : Nobuatsu Sasanuma et al.

It is certified that error appears in the above-identified patent and that said Letters Patent is hereby corrected as shown below:

Column 26,
Line 11, "paint" should read -- paint is --;
Line 17, "is" should be deleted;
Line 30, "type" should read -- the type --; and
Line 54, "while" should read -- while they --.

Column 27,
Line 1, "same" should read -- the same -- and "while" should read -- while they --;
Line 6, "specific" should read -- specific in --;
Line 8, "same" should read -- the same --;
Line 12, "also" should read -- may also --;
Line 15, "same" should read -- the same --;
Line 23, "appearing" should read -- appearing as --;
Line 35, "printing" should read -- a printing --;
Line 42, "upon" should read -- upon which --; and
Line 43, "mart" should read -- mark --.

Column 29,
Line 15, "distance." should read -- distances. --;
Line 33, "ink B" should read -- ink B being --;
Line 50, "pixel" should read -- pixels --; and
Line 52, "pixel." should read -- pixels. --.

Column 30,
Line 10, "results" should read -- result --;
Line 11, "Such" should read -- Such a --;
Line 12, "requires" should read -- requires an --;
Line 31, "same" should read -- the same in --; and
Line 53, "AIR" should read -- $\Delta$IR --.

Column 31,
Line 21, "smaller" should read -- a smaller --; and
Line 24, "larger" should read -- a larger --.

Column 32,
Line 26, "reading'" should read -- reading --; and
Line 34, "level" should read -- levels --.

UNITED STATES PATENT AND TRADEMARK OFFICE
CERTIFICATE OF CORRECTION

PATENT NO.   : 6,201,616 B1
DATED        : March 13, 2001
INVENTOR(S)  : Nobuatsu Sasanuma et al.

It is certified that error appears in the above-identified patent and that said Letters Patent is hereby corrected as shown below:

Column 33,
Line 4, "averages value'" should read -- average values --; and
Line 11, "averages value" should read -- average values --.

Column 34,
Line 38, "signal" should read -- signals --; and
Line 55, "nm." should read -- nm range. --.

Column 35,
Line 2, "same" should read -- the same --.

Column 36,
Line 44, "also" should read -- also be --.

Column 37,
Line 3, "operation." should read -- operations. --; and
Line 67, "copy" should read -- copying --.

Column 38,
Line 20, "copy" should read -- copying --.

Column 39,
Line 34, "wherein the" should read -- wherein, in the --; and
Line 35, "pattern" should read -- pattern, --.

Column 40,
Line 28, "include" should read -- includes --.

Signed and Sealed this

Twenty-ninth Day of July, 2003

JAMES E. ROGAN
*Director of the United States Patent and Trademark Office*